United States Patent
Mun et al.

(10) Patent No.: US 12,098,862 B2
(45) Date of Patent: Sep. 24, 2024

(54) INDOOR UNIT OF AN AIR CONDITIONER

(71) Applicant: LG ELECTRONICS INC., Seoul (KR)

(72) Inventors: Seongkuk Mun, Seoul (KR); Junseok Bae, Seoul (KR); Sunggyu Choi, Seoul (KR); Heejun Cheon, Seoul (KR); Giyeong Gyeong, Seoul (KR); Yongmin Song, Seoul (KR); Shinhwi Lee, Seoul (KR); Jungwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 925 days.

(21) Appl. No.: 16/978,174

(22) PCT Filed: Mar. 7, 2019

(86) PCT No.: PCT/KR2019/002676
§ 371 (c)(1),
(2) Date: Sep. 3, 2020

(87) PCT Pub. No.: WO2019/172690
PCT Pub. Date: Sep. 12, 2019

(65) Prior Publication Data
US 2021/0041134 A1 Feb. 11, 2021

(30) Foreign Application Priority Data

Mar. 7, 2018 (KR) .................. 10-2018-0026954
Feb. 14, 2019 (KR) .................. 10-2019-0017487

(51) Int. Cl.
*F24F 13/20* (2006.01)
*E05F 15/665* (2015.01)
(Continued)

(52) U.S. Cl.
CPC ............ *F24F 13/20* (2013.01); *E05F 15/665* (2015.01); *F16H 1/28* (2013.01); *F16H 19/04* (2013.01);
(Continued)

(58) Field of Classification Search
CPC .......... F24F 13/20; F24F 1/0011; F24F 13/06; E05F 15/665; F16H 1/28; F16H 19/04;
(Continued)

(56) References Cited

U.S. PATENT DOCUMENTS 4,240,264 A 12/1980 Nakada et al.
5,461,875 A * 10/1995 Lee .................. G05D 3/125
454/324
(Continued)

FOREIGN PATENT DOCUMENTS

CN 1162725 A 10/1997
CN 101109562 1/2008
(Continued)

*Primary Examiner* — Avinash A Savani
*Assistant Examiner* — Ryan L Faulkner
(74) *Attorney, Agent, or Firm* — Bryan Cave Leighton Paisner LLP

(57) ABSTRACT

An indoor unit of an air conditioner, which when a door cover is inserted in the inner side of a front outlet, a door cover moving module moves the door cover in the front-rear direction by the operation of a door cover motor, and when the door cover is moved to the rear of the front outlet, a door housing moving module moves a door cover housing along with the door cover, and thus the door cover may be moved completely to the outside of the front outlet.

19 Claims, 38 Drawing Sheets

(51) Int. Cl.
  *F16H 1/28* (2006.01)
  *F16H 19/04* (2006.01)
  *F24F 1/0011* (2019.01)
  *F24F 13/06* (2006.01)

(52) U.S. Cl.
  CPC ........ *F24F 1/0011* (2013.01); *E05Y 2201/434* (2013.01); *E05Y 2201/604* (2013.01); *E05Y 2900/30* (2013.01); *F24F 13/06* (2013.01)

(58) Field of Classification Search
  CPC ......... E05Y 2201/434; E05Y 2201/604; E05Y 2900/30
  USPC ........................................................ 454/233
  See application file for complete search history.

(56) References Cited

U.S. PATENT DOCUMENTS

| | | | |
|---|---|---|---|
| 5,782,688 A * | 7/1998 | Baek | F24F 1/0011 454/324 |
| 6,305,765 B1 * | 10/2001 | Park | F24F 13/20 49/213 |
| 7,123,139 B2 | 10/2006 | Sweeney | |
| 9,353,965 B1 | 5/2016 | Goyal et al. | |
| 10,107,515 B2 | 10/2018 | Ableitner et al. | |
| 2013/0173064 A1 | 7/2013 | Fadell et al. | |
| 2014/0096941 A1 | 4/2014 | Yun et al. | |
| 2015/0338111 A1 | 11/2015 | Havard et al. | |
| 2018/0209687 A1 | 7/2018 | Chun et al. | |
| 2018/0216835 A1 | 8/2018 | Yun et al. | |
| 2018/0274813 A1 | 9/2018 | Chun et al. | |
| 2019/0037024 A1 | 1/2019 | Mighdoll et al. | |

FOREIGN PATENT DOCUMENTS

| | | | | |
|---|---|---|---|---|
| CN | 101178198 A | 5/2008 | | |
| CN | 102192577 A | 9/2011 | | |
| CN | 102338445 A | 2/2012 | | |
| CN | 202928018 U | 5/2013 | | |
| CN | 103574775 A | 2/2014 | | |
| CN | 103712282 | 4/2014 | | |
| CN | 203964297 U | 11/2014 | | |
| CN | 105805830 A | 7/2016 | | |
| CN | 105933189 A | 9/2016 | | |
| JP | H11-287651 A | 10/1999 | | |
| JP | 4720577 B2 | 7/2011 | | |
| KR | 10-0125750 B1 | 10/1997 | | |
| KR | 200125474 Y1 | 6/1998 | | |
| KR | 100156706 B1 | 7/1998 | | |
| KR | 100215045 B1 | 8/1999 | | |
| KR | 20040084281 A | 10/2004 | | |
| KR | 20090003873 A | 1/2009 | | |
| KR | 101476296 B1 | 12/2009 | | |
| KR | 101503282 B1 | 5/2010 | | |
| KR | 101507442 B1 | 5/2010 | | |
| KR | 10-2010-0086313 A | 7/2010 | | |
| KR | 10-2012-0064492 A | 6/2012 | | |
| KR | 20120117449 A | 10/2012 | | |
| KR | 20140012437 A | 2/2014 | | |
| KR | 20150055740 | 5/2015 | | |
| KR | 101668922 B1 | 7/2016 | | |
| KR | 10-2017-0009701 A | 1/2017 | | |
| KR | 10-2017-0010293 A | 1/2017 | | |
| KR | 20170010293 A | * | 1/2017 | ............... F24F 13/10 |
| KR | 102199375 B1 | 1/2021 | | |
| WO | 2017221326 A1 | 12/2017 | | |

* cited by examiner

3430

INDOOR UNIT OF AN AIR CONDITIONER

CROSS-REFERENCE TO RELATED APPLICATION

This application is a National Stage Application of International Application No. PCT/KR2019/002676, filed on Mar. 7, 2019, which claims benefit of and priority to Korean Patent Application Nos.: KR10-2018-0026954, filed on Mar. 7, 2018, and KR10-2019-0017487, filed on Feb. 14, 2019, all of which are hereby incorporated by reference in their entirety for all purposes as if fully set forth herein.

TECHNICAL FIELD

The present disclosure relates to an indoor unit of an air conditioner, and more particularly, to an indoor unit of an air conditioner including a door assembly capable of vertically moving a door cover to open and close a front discharge outlet.

BACKGROUND ART

A split-type air conditioner may include an indoor unit disposed in an indoor space and an outdoor unit disposed in an outdoor space and may cool, heat, or dehumidify indoor air through refrigerants circulating between the indoor unit and the outdoor unit.

Examples of an indoor unit of the split-type air conditioner include a stand-type indoor unit vertically installed on the indoor floor, a wall-mounted indoor unit mounted on the indoor wall, and a ceiling-type indoor unit mounted on the indoor ceiling.

The indoor unit of the split-type air conditioner in related art includes an indoor fan disposed inside a cabinet, but with this configuration there is a problem that conditioned air may not be remotely discharged.

According to Korean Patent No. 10-1191413, a circulator remotely flows air around the indoor unit.

According to Korean Patent No. 10-1191413, an air circulator is disposed in the indoor unit and may not directly flow the conditioned air and may remotely flow indoor air above the indoor unit.

As the air circulator does not directly flow the conditioned air a problem exists that the air circulator may not concentrately supply the conditioned air to a target area and may not selectively condition the target area where temperature imbalance is generated.

According to Korean Patent Publication No. 10-2017-0010293, a cabinet of an indoor unit defines an opening and includes a door unit to open and close the opening. According to Korean Patent Publication No. 10-2017-0010293, the door unit is movable in a forward and rearward direction, and when the indoor unit is not operated, the door unit closes the opening, and when the indoor unit is operated, the door unit is moved forward to open the opening.

However, according to Korean Patent Publication No. 10-2017-0010293, a door unit moves in a forward and rearward direction to open and close an opening, but as the door unit is disposed in front of the opened opening, it blocks the flow of air discharged through the opening. For example, according to Korean Patent Publication No. 10-2017-0010293, the opening opened by the door unit is not suitable for remotely flowing the air.

In addition, according to Korean Patent Publication No. 10-2017-0010293, the door is moved forward to open the opening, and as a blowing fan is disposed inside an exterior panel, the air flowed by the blowing fan is used to generate resistance to a structure inside the exterior panel, which causes a lot of flow loss to remotely flow the air.

SUMMARY

The present disclosure is directed to an indoor unit of an air conditioner in which, when a long-distance fan assembly is not operated, a door cover assembly closes a front discharge outlet, and when the long-distance fan assembly is operated, the door cover assembly is moved downward to open the front discharge outlet, and a fan housing assembly protrudes outside the door assembly through the open front discharge outlet.

The present disclosure is directed to an indoor unit of an air conditioner in which, when the long-distance fan assembly is not operated, the door cover assembly closes the front discharge outlet, and when the long-distance fan assembly is operated, the door cover assembly is moved downward to open the front discharge outlet.

The present disclosure is directed to an indoor unit of an air conditioner to prevent cold air of a cabinet assembly from leaking through the front discharge outlet.

The present disclosure is directed to an indoor unit of an air conditioner in which a door cover assembly to open and close the front discharge outlet may be vertically moved in a door assembly.

The present disclosure is directed to an indoor unit of an air conditioner in which a door cover of a door cover assembly provides a continuous surface with a front panel when the front discharge outlet is closed and the door cover of the door cover assembly is disposed on a rear surface of the door assembly when the front discharge outlet is opened.

The present disclosure is directed to an indoor unit of an air conditioner capable of minimizing operating noise occurring when the door cover assembly is vertically moved.

The present disclosure is directed to an indoor unit of an air conditioner capable of minimizing a thickness in a forward and rearward direction and weight of a door assembly.

The present disclosure is directed to an indoor unit of an air conditioner capable of preventing noise occurring due to collision of the door cover assembly with an upper structure or a lower structure when the door cover assembly vertically moves.

According to the present disclosure, a door cover moving module moves the door cover in a forward and rearward direction based on operation of a door cover motor when the door cover is inserted into a front discharge outlet and a door housing moving module moves the door cover housing with the door cover when the door cover is moved rearward the front discharge outlet to completely move the door cover out of the front discharge outlet.

According to the present disclosure, the door cover moving module moves the door cover rearward form an inside of the front discharge outlet to provide a first front opening.

According to the present disclosure, in the first front opening state, the door housing moving module moves the door cover below the front discharge outlet 201 from the rear side of the front discharge outlet and the front discharge outlet is not covered by the door cover to provide a second front opening.

When the door cover moving module is operated to move the door cover in the forward and rearward direction in the front discharge outlet to separate the door cover from the front discharge outlet, and when the door housing moving module is operated, the door cover moves out of the front discharge outlet to move the door cover out of a flow path of the discharged air. The door cover may be moved out of the flow path of the discharged air to prevent interference between the discharge air and the door cover.

The door cover may be inserted into the front discharge outlet and provides a continuous surface with a front surface of the front panel. When the air is not discharged through the front discharge outlet, the door cover may close the front discharge outlet.

When not in operation, the door cover closes the front discharge outlet to block leakage of conditioned air to outside through the front discharge outlet.

When not in operation, the door cover closes the front discharge outlet to block foreign substances from getting into the cabinet assembly.

When not in operation, the door cover closes the front discharge outlet to prevent safety accidents.

When the front discharge outlet is opened, the door cover is disposed below the front discharge outlet and at the rear side of the front panel to prevent the interference between the discharged air and the door cover.

The door cover moving module includes a door cover motor disposed at the rear side of the door cover in the door cover housing and comprising a door cover motor shaft in the forward and rearward direction; a sun gear coupled to the door cover motor shaft, disposed between the door cover and the door cover housing, and configured to rotate based on the operation of the door cover motor; a plurality of planetary gears engaged with the sun gear 1620 and radially disposed outside the sun gear; a cover guide disposed between the door cover housing and the door cover to be rotatable, engaged with the plurality of planetary gears, in which the plurality of planetary gears are disposed therein, and configured to rotate clockwise or counterclockwise when the planetary gears are rotated; and a mover disposed on the door cover, interfering with the cover guide when the cover guide is rotated clockwise or counterclockwise, and configured to receive a driving force to move the door cover forward or rearward through the engagement. The planetary gears and the sun gear are each disposed in the cover guide to minimize a thickness thereof in the forward and rearward direction and perform the movement of the mover in the forward and rearward direction.

The door cover motor, the sun gear, and the plurality of planetary gears are each disposed in the cover guide to minimize the thickness of the door cover assembly in the forward and rearward direction and minimize the thickness of the door assembly including the door cover assembly in the forward and rearward direction.

The cover guide includes a guide gear on an inner circumferential surface thereof and the guide gear may be engaged with each of the planetary gears to provide a compact structure.

The door cover motor, the sun gear, and the plurality of planetary gears are each inserted into the core opening of the door cover to minimize the thickness of the door cover assembly in the forward and rearward direction and minimize the thickness of the door assembly including the door cover assembly in the forward and rearward direction.

The cover guide and the mover are disposed in the moving module installation portion of the door cover housing to minimize the thickness of the door cover assembly in the forward and rearward direction.

When viewed from the front, the cover guide has a ring shape and includes a guideway on an inner circumferential surface or an outer circumferential surface of the cover guide, the guideway extends in a circumferential direction of the cover guide and is disposed in a forward and rearward direction. The mover further comprises a mover guide movably inserted into the guideway, and when the cover guide rotates, the mover guide interferes with the guideway and the mover guide is moved in the forward and rearward direction along the guideway by the engagement.

The mover guide may be moved along the guideway in the forward and rearward direction based on the rotation of the cover guide to minimize a length thereof in the forward and rearward direction for moving the mover in the forward and rearward direction.

The guideway penetrates an inner portion and an outer portion of the cover guide to be firmly coupled to the mover guide, thereby preventing the mover guide from being separated from the guideway.

The mover guide is inserted into an outer side of the cover guide from an inner side thereof or is inserted into the inner side of the cover guide from an outer side thereof to be firmly coupled to the mover guide when the cover guide is rotated and prevent the mover guide from being separated from the guideway.

The door housing moving module includes a left door housing moving module disposed at the left side of the door cover housing and a right door housing moving module disposed at the right side of the door cover housing and may uniformly move the both sides of the door cover housing upward based on the operation of the left door housing moving module and the right door housing moving module.

The left door housing moving module and the right door housing moving module support the door cover assembly by distributing the load of the door cover assembly to place the door cover assembly at a right position.

The left door housing moving module may be disposed in a length of the first front panel side in the forward and rearward direction and the right door housing moving module is disposed in a length of the second front panel side in the forward and rearward direction to minimize the thickness of the door assembly in the forward and rearward direction.

A rack teeth of the left rack faces a rack teeth of the right rack to pressurize both sides of the door cover housing by the left rack and the right rack and firmly support the vertically moving door cover housing.

The door cover housing may be disposed between the left rack and the right rack to prevent the door cover assembly from being separated rearward.

The gear assembly includes a plurality of gears and at least one of the plurality of gears uses a worm gear coupled to a motor shaft of the gear drive motor to minimize noise occurring when the gear drive motor is operated.

A position sensor portion includes an upper position sensor configured to detect an upper position of the door cover housing when the door cover housing is vertically moved; and a lower position sensor disposed in the panel module and configured to detect an upper position of the door cover housing, when the door cover housing is vertically moved to prevent excessive movement of the door cover assembly and collision noise occurring based on the excessive movement thereof.

Advantageous Effects

According to the present disclosure, an indoor unit of an air conditioner has one or more effects as follows.

First, according to the present disclosure, there is an advantage in that a door cover moving module moves the door cover in a forward and rearward direction based on operation of a door cover motor when the door cover is inserted into the front discharge outlet and a door housing moving module moves the door cover housing with the door cover when the door cover moves rearward the front discharge outlet to completely move the door cover out of the front discharge outlet.

Second, according to the present disclosure, there is an advantage in that the door cover moving module moves the door cover rearward from an inner side of the front discharge outlet to provide a first front opening, and in the first front opening state, the door housing moving module moves the door cover downward from rearward the front discharge outlet to provide a second front opening in which the front discharge outlet is not covered by the door cover.

Third, according to the present disclosure, there is an advantage in that, when the door cover moving module is operated, the door cover moves in the forward and rearward direction in the front discharge outlet to separate the door cover from the front discharge outlet, and when the door housing moving module is operated, the door cover moves out of the front discharge outlet to move the door cover out of a flow path of the discharge air, thereby preventing interference between the discharge air and the door cover.

Fourth, according to the present disclosure, there is an advantage in that the door cover is inserted into the front discharge outlet and provides a continuous surface with a front surface of the front panel to close the front discharge outlet when the air is not discharged through the front discharge outlet.

Fifth, according to the present disclosure, there is an advantage in that, when not in operation, the door cover closes the front discharge outlet to prevent leakage of the conditioned air to the outside through the front discharge outlet.

Sixth, according to the present disclosure, there is an advantage in that, when not in operation, the door cover closes the front discharge outlet to prevent foreign substances from getting into the cabinet assembly.

Seventh, according to the present disclosure, there is an advantage in that, when not in operation, the door cover closes the front discharge outlet to prevent safety accidents.

Eighth, according to the present disclosure, there is an advantage in that, when the front discharge outlet is opened, the door cover is disposed below the front discharge outlet and at the rear side of the front panel to prevent interference between the discharged air and the door cover.

Ninth, according to the present disclosure, there is an advantage in that the planetary gears and the sun gear are each disposed in the cover guide to minimize a thickness thereof in a forward and rearward direction and move the mover in the forward and rearward direction.

Tenth, there is an advantage that the door cover motor, the sun gear, and the plurality of planetary gears are each disposed in the cover guide to minimize the door cover assembly in the forward and rearward direction and minimize the thickness of the door assembly including the door cover assembly in the forward and rearward direction.

Eleventh, there is an advantage in that the cover guide includes a guide gear on an inner circumferential surface thereof and the guide gear is engaged with each of the planetary gears to provide a compact structure.

Twelfth, there is an advantage in that the door cover motor, the sun gear, and the plurality of planetary gears are each inserted into a core opening of the door cover to minimize the thickness of the door cover assembly in the forward and rearward direction and minimize the thickness of the door assembly including the door cover assembly in the forward and rearward direction.

Thirteenth, there is an advantage in that the cover guide and the mover are each disposed in a moving module installation portion of the door cover housing to minimize the thickness of the door cover assembly in the forward and rearward direction.

Fourteenth, there is an advantage in that the mover guide is moved in the forward and rearward direction along the guideway based on rotation of the cover guide to minimize a length thereof in the forward and rearward direction for moving the mover in the forward and rearward direction.

Fifteenth, there is an advantage in that the guideway penetrates an inner portion and an outer portion of the cover guide to be firmly coupled to the mover guide and prevent the mover guide from being separated from the guideway.

Sixteenth, there is an advantage in that the mover guide is inserted into an outer side of the cover guide from an inner side thereof or is inserted into the inner side of the cover guide from an outer side thereof to be firmly coupled to the mover guide when the cover guide is rotated and prevent the mover guide from being separated from the guideway.

Nineteenth, there is an advantage in that the door housing moving module includes a left door housing moving module disposed at the left side of the door cover housing and a right door housing moving module disposed at the right side of the door cover housing and may uniformly move both sides of the door cover housing upward based on the operation of the left door housing moving module and the right door housing moving module.

Twentieth, there is an advantage in that the left door housing moving module and the right door housing moving module support the door cover assembly by distributing the load of the door cover assembly to place the door cover assembly at a right position.

Twenty-first, there is an advantage in that the left door housing moving module is disposed in a length of the first front panel side in the forward and rearward direction and the right door housing moving module is disposed in a length of the second front panel side in the forward and rearward direction to minimize the thickness of the door assembly in the forward and rearward direction.

Twenty-second, there is an advantage in that a rack teeth of the left rack faces a rack teeth of the right rack to pressurize both sides of the door cover housing by the left rack and the right rack and firmly support the vertically moving door cover housing.

Twenty-third, there is an advantage in that the door cover housing is disposed between the left rack and the right rack to prevent the door cover assembly from being separated rearward.

Twenty-fourth, there is an advantage in that the gear assembly includes a plurality of gears and at least one of the plurality of gears uses a worm gear coupled to a motor shaft of the gear drive motor to minimize noise occurring when the gear drive motor is operated.

Twenty-fifth, there is an advantage in that a position sensor portion includes an upper position sensor configured to detect an upper position of the door cover housing when the door cover housing is vertically moved; and a lower position sensor disposed in the panel module and configured to detect an upper position of the door cover housing when the door cover housing is vertically moved, to prevent excessive movement of the door cover assembly and collision noise occurring based on the excessive movement thereof.

BRIEF DESCRIPTION OF DRAWINGS

The accompanying drawings constitute a part of this specification and illustrate one or more embodiments of the present disclosure and together with the specification, explain the present disclosure.

FIG. 13 is a plan cross-sectional view showing the door cover assembly in

FIG. 12.

DETAILED DESCRIPTION

Figure 1:
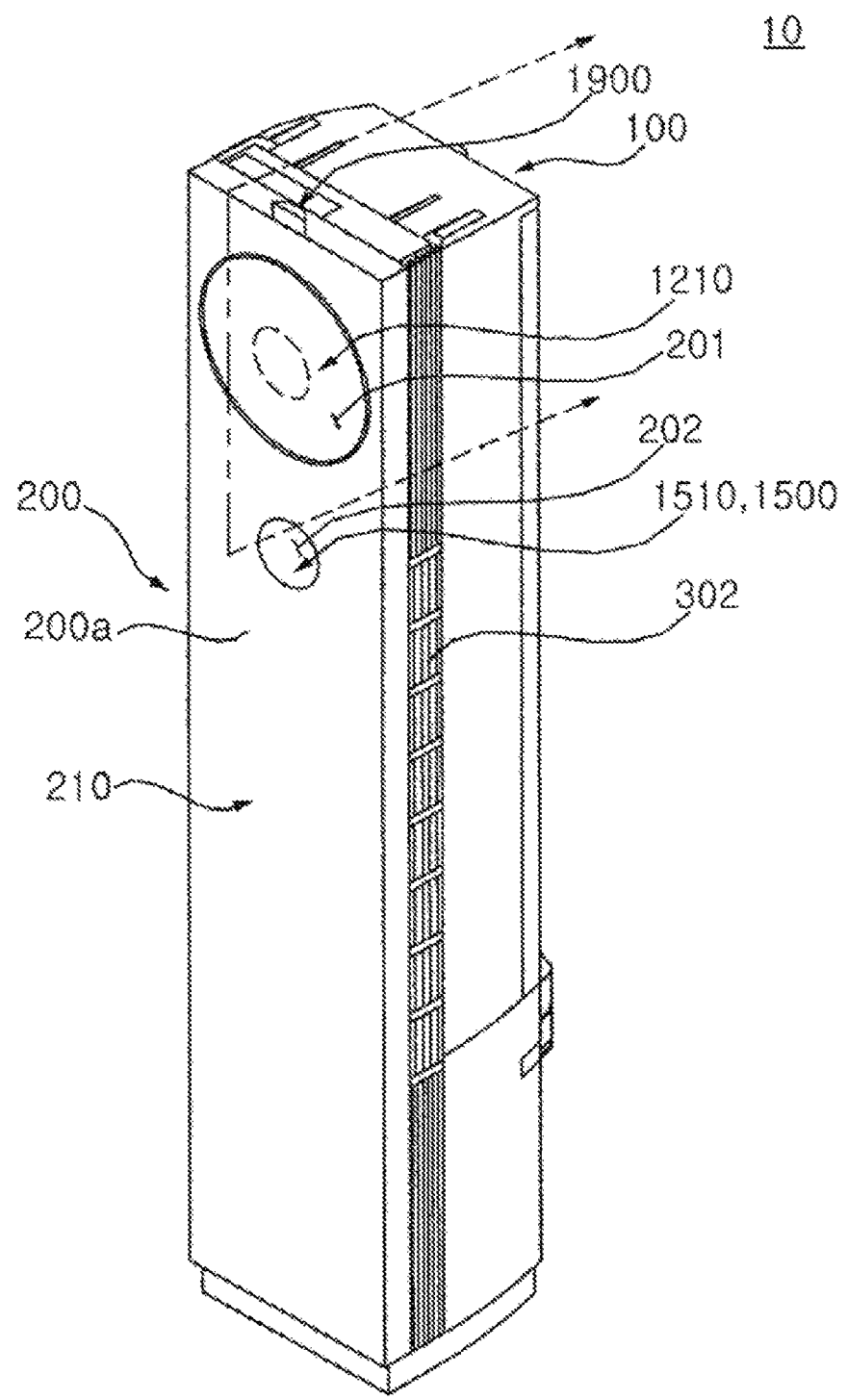
FIG. 1 is a perspective view showing an indoor unit of an air conditioner according to an embodiment of the present disclosure.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

As used herein, various singular forms "a," "an" and "the" are intended to include various plural forms as well, unless context clearly indicates otherwise. For example, a term "a" or "an" shall mean "one or more," even though a phrase "one or more" is also used herein. Use of the optional plural "(s)," "(es)," or "(ies)" means that one or more of the indicated feature is present.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, features described with respect to certain embodiments may be combined in or with various other embodiments in any permutational or combinatory manner. Different aspects or elements of example embodiments, as disclosed herein, may be combined in a similar manner.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Figure 2:
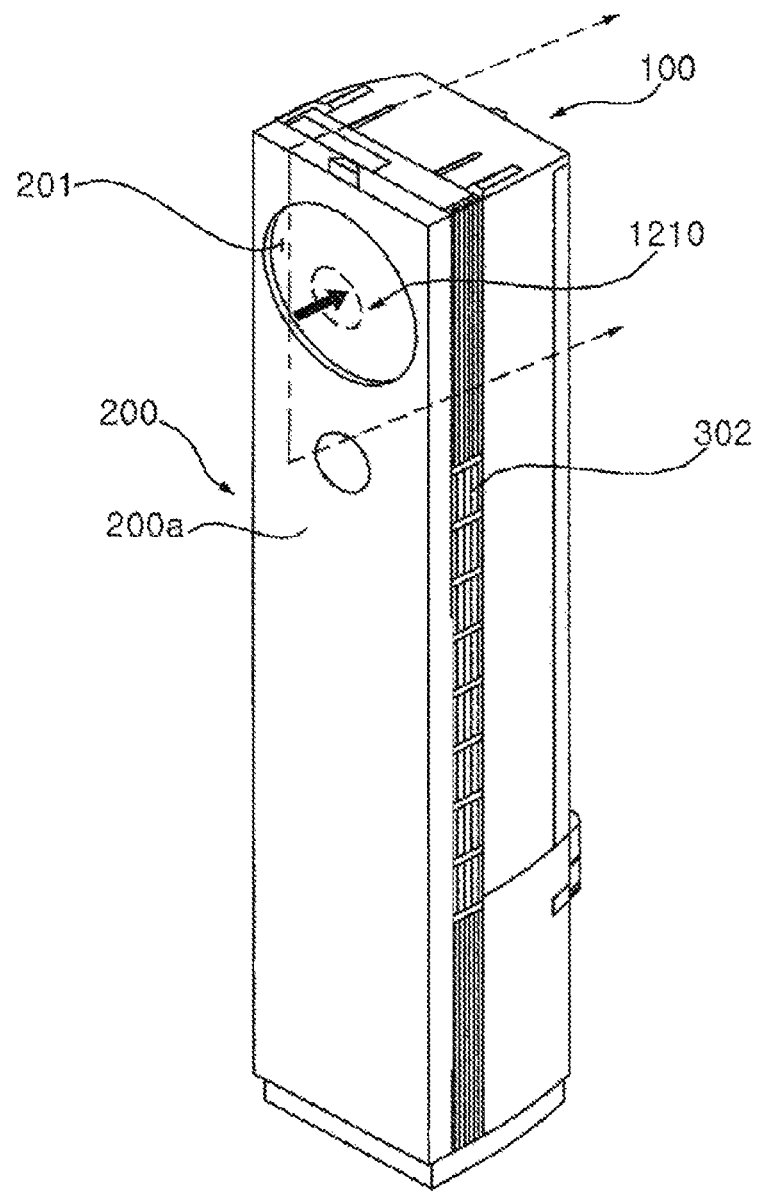
FIG. 2 is an exemplary view showing a door cover in FIG. 1 moving rearward.
Figure 3:
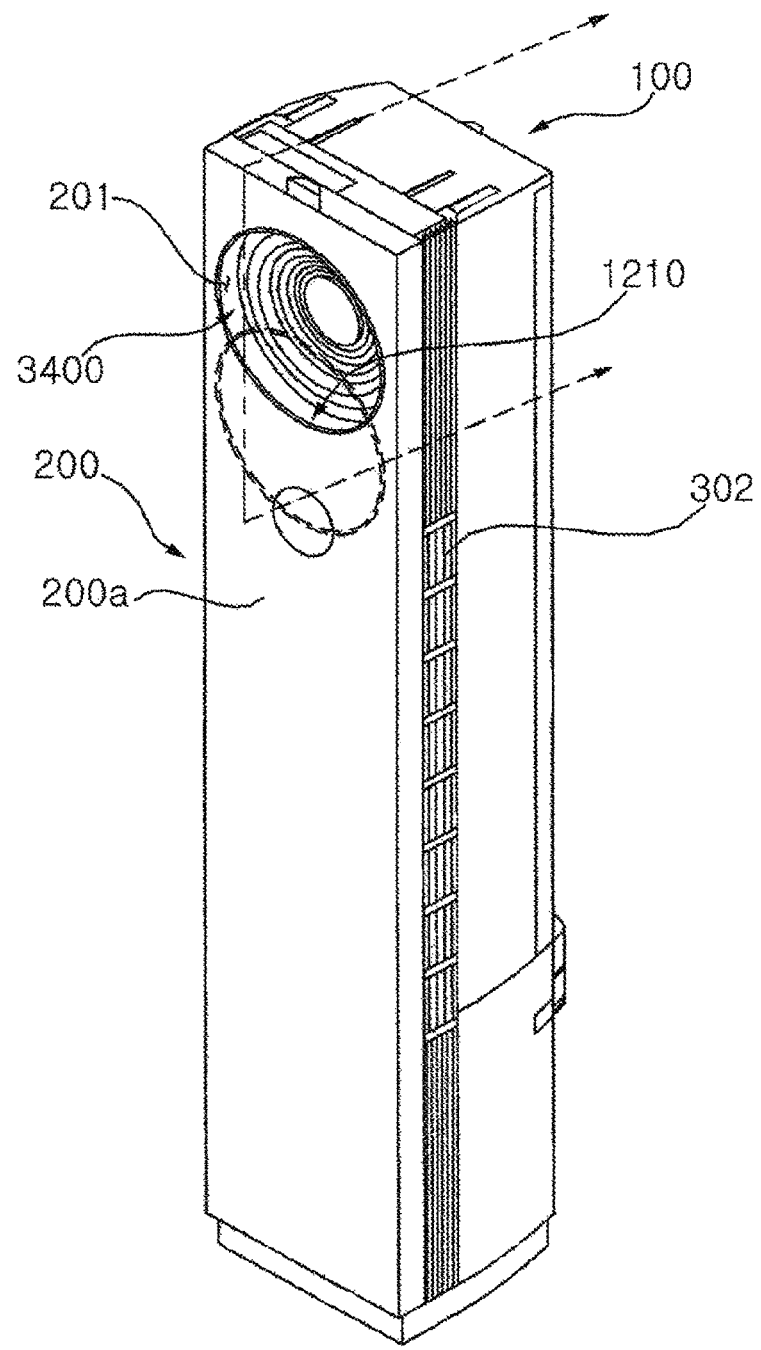
FIG. 3 is an exemplary view showing a door cover assembly in FIG. 2 moving downward.
Figure 4:
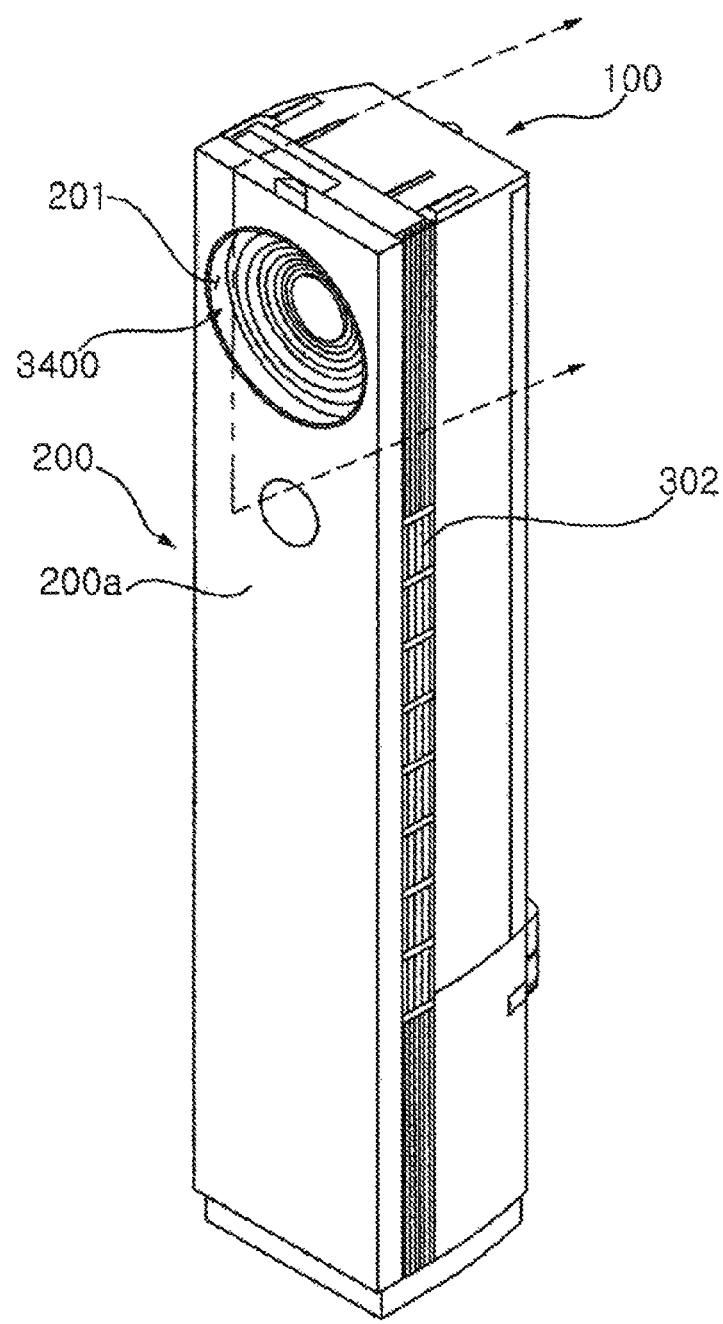
FIG. 4 is an exemplary view showing a front discharge outlet in FIG. 3 opened.
Figure 5:
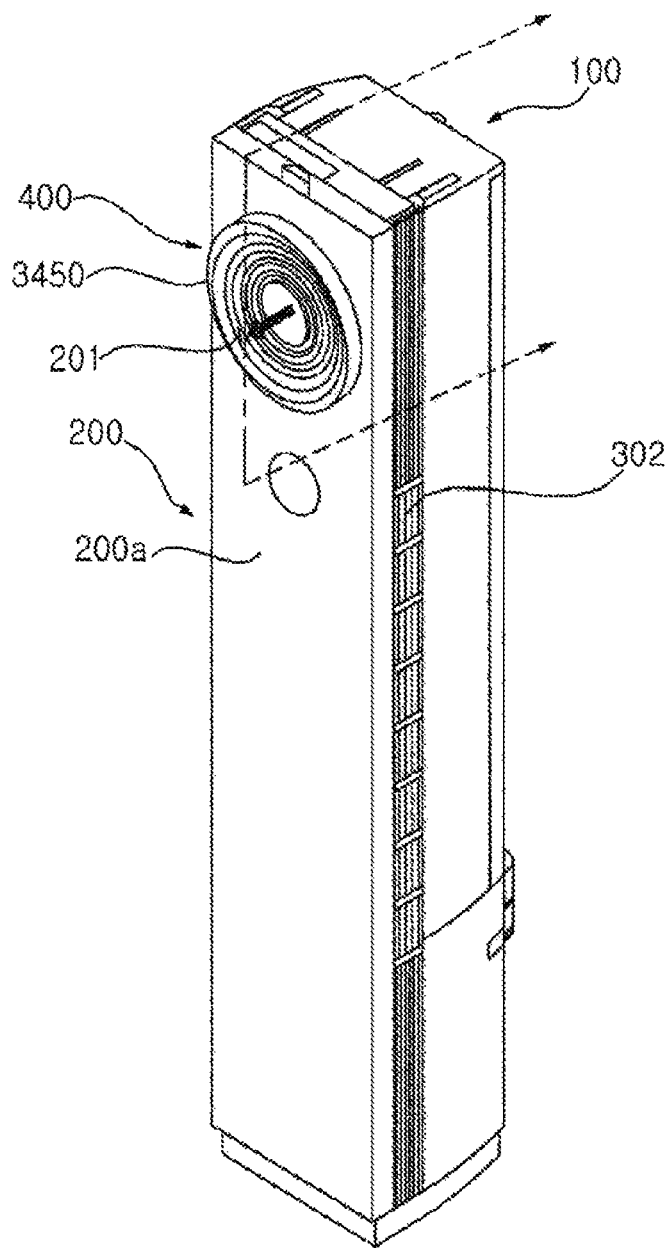
FIG. 5 is an exemplary view showing a fan housing assembly in FIG. 4 moving forward.
Figure 6:
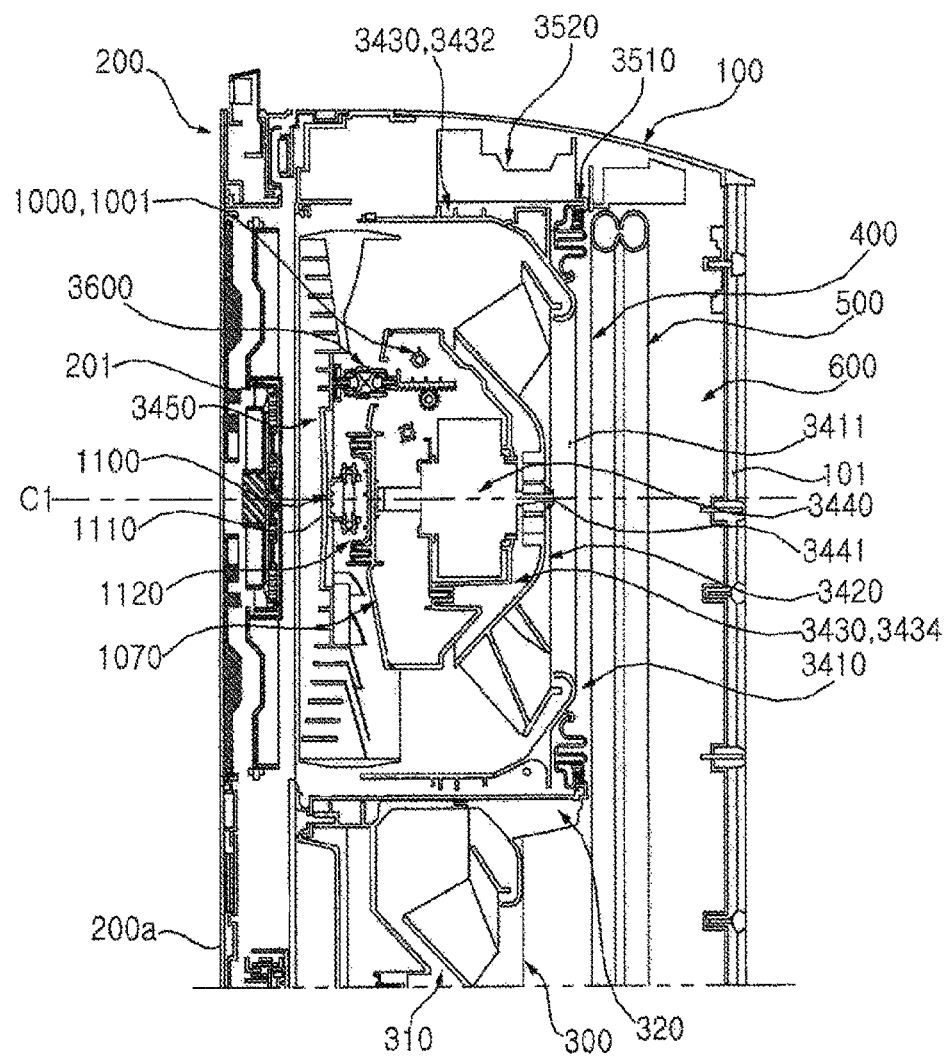
FIG. 6 is a right cross-sectional view showing a door cover assembly in FIG. 1.
Figure 7:
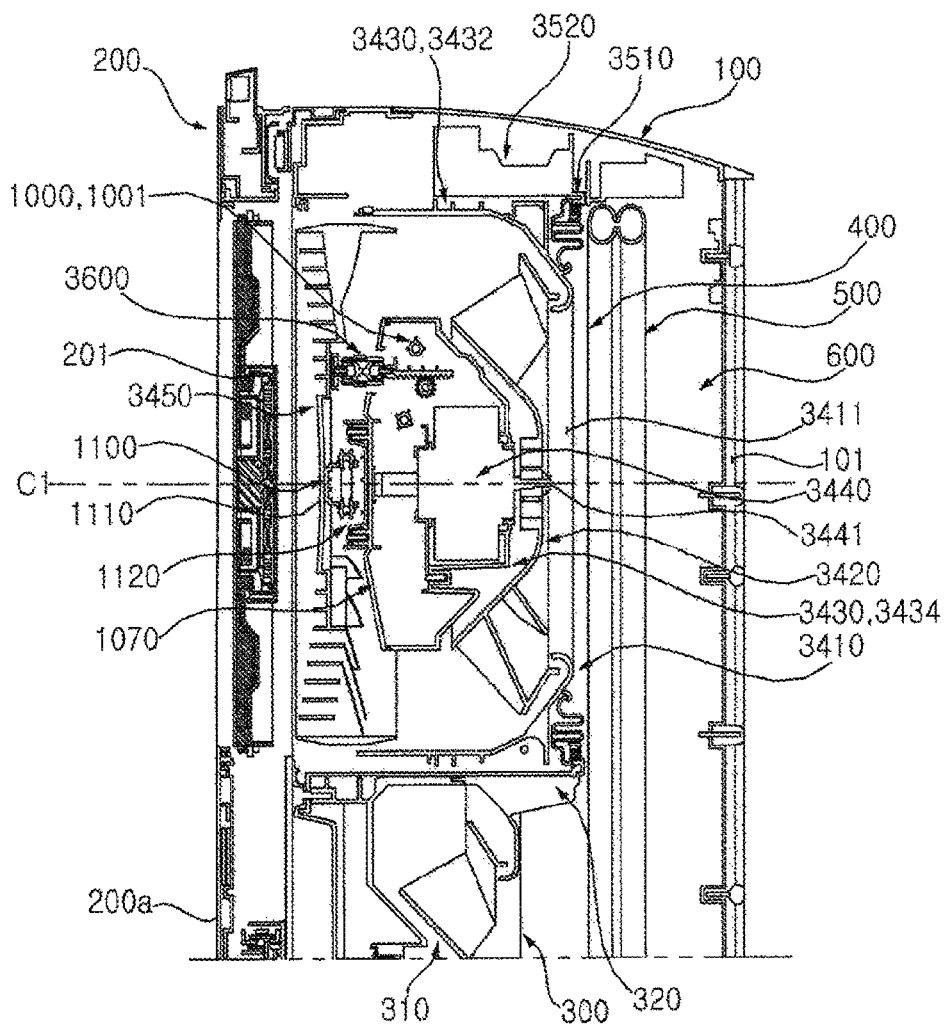
FIG. 7 is a right cross-sectional view showing a door cover assembly in FIG. 2.

FIG. 1 is a perspective view showing an indoor unit of an air conditioner according to an embodiment of the present disclosure. FIG. 2 is an exemplary view showing a door cover in FIG. 1 moving rearward. FIG. 3 is an exemplary view showing a door cover assembly in FIG. 2 moving down. FIG. 4 is an exemplary view showing a front discharge outlet in FIG. 3 that is open. FIG. 5 is an exemplary view showing a fan housing assembly in FIG. 4 moving forward. FIG. 6 is a right cross-sectional view showing a door cover assembly in FIG. 1. FIG. 7 is a right cross-sectional view showing a door cover assembly in FIG. 2.

According to one embodiment, the air conditioner includes an indoor unit 10 and an outdoor unit (not shown) connected to the indoor unit 10 through a refrigerant pipe to circulate refrigerant.

The outdoor unit includes a compressor (not shown) to compress a refrigerant, an outdoor heat exchanger (not shown) to receive refrigerant from the compressor and condense the refrigerant, an outdoor fan (not shown) to supply air to the outdoor heat exchanger, and an accumulator (not shown) to receive the refrigerant discharged by the indoor unit 10 and to provide only gas refrigerant to the compressor.

The outdoor unit may further include a four-way valve (not shown) to operate the indoor unit in a cooling mode or a heating mode. When the air conditioner is operated in the cooling mode, the indoor unit 10 evaporates the refrigerant and cools the indoor air. When the air conditioner is operated in the heating mode, the indoor unit 10 condenses the refrigerant to heat the indoor air.

<<Configuration of Indoor Unit>>

The indoor unit 10 includes a cabinet assembly 100 to define an opening at a front surface thereof, a suction inlet 101 at a rear surface thereof, a door assembly 200 assembled to the cabinet assembly 100, to cover a front surface of the cabinet assembly 100, and to open and close a front surface of the cabinet assembly 100, fan assemblies 300 and 400 disposed in the cabinet assembly 100 to discharge air in the inner space (S) to an indoor space, a heat exchange assembly 500 disposed between the fan assemblies 300, 400 and the cabinet assembly 100 and to heat-exchange the suctioned indoor air with refrigerant, a humidifying assembly 800 disposed in the cabinet assembly 100 to provide moisture to an indoor space, a filter assembly 600 disposed on a rear surface of the cabinet assembly 100 to filter air flowing through the suction inlet 101, and a moving cleaner 700 moved vertically along the filter assembly 600 to separate foreign substances on the filter assembly 600 and collect the foreign substances.

The indoor unit 10 includes the suction inlet 101 disposed on the rear surface of the cabinet assembly 100, a side discharge outlet 301 disposed at a side surface of the cabinet assembly 100, and a front discharge outlet 201 disposed on a front surface of the cabinet assembly 100.

The suction inlet 101 is disposed on the rear surface of the cabinet assembly 100.

The side discharge outlets 301 are disposed on the left side and the right side of the cabinet assembly 100.

The door assembly 200 includes the front discharge outlet 201 and a door cover assembly 1200 to automatically open and close the front discharge outlet 201.

The door cover assembly 1200 may be moved downward along the door assembly 200 after opening the front discharge outlet 201. The door cover assembly 1200 may be moved vertically with respect to the door assembly 200.

After the door cover assembly 1200 moves downward, the long-distance fan assembly 400 may move forward through the door assembly 200.

The fan assemblies 300 and 400 include a short-distance fan assembly 300 and a long-distance fan assembly 400. The heat exchange assembly 500 may be disposed behind each of the shot-distance fan assembly and the long-distance fan assembly 400.

The heat exchange assembly 500 is disposed in the cabinet assembly 100, may be disposed at an inner side thereof, may cover the suction inlet 101, and be vertically disposed.

The short-distance fan assembly 300 and the long-distance fan assembly 400 may each be disposed in front of the heat exchange assembly 500. The air suctioned to the suction inlet 101 passes through the heat exchange assembly 500 and flows to each of the short-distance fan assembly 300 and the long-distance fan assembly 400.

The heat exchange assembly 500 may be manufactured to have a length corresponding to a height of each of the short-distance fan assembly 300 and the long-distance fan assembly 400.

The short-distance fan assembly 300 and the long-distance fan assembly 400 may each be vertically stacked. In one embodiment, the long-distance fan assembly 400 is disposed above the short-distance fan assembly 300. The long-distance fan assembly 400 is disposed above to flow the discharged air to a remote indoor space.

The short-distance fan assembly 300 discharges laterally air with respect to the cabinet assembly 100. The short-distance fan assembly 300 may provide an indirect air movement to users. The short-distance fan assembly 300 simultaneously discharges air to the left side and the right side of the cabinet assembly 100.

The long-distance fan assembly 400 may be disposed above the short-distance fan assembly 300 and may be disposed in the cabinet assembly 100 at an upper portion thereof.

The long-distance fan assembly 400 discharges the air in the forward and rearward direction with respect to the cabinet assembly 100. The long-distance fan assembly 300 provides direct air movement to users. In addition, the long-distance fan assembly 300 discharges the air to the remote indoor space to improve indoor air circulation.

In one embodiment, the long-distance fan assembly 400 is exposed to users only when the long-distance fan assembly 400 is operated. When the long-distance fan assembly 400 is operated, the long-distance fan assembly 400 passes through the door assembly 200 and is exposed to users. When the long-distance fan assembly 400 is not operated, the long-distance fan assembly 400 is concealed inside the cabinet assembly 100.

The long-distance fan assembly 400 may control an air-discharging direction. The long-distance fan assembly 400 may discharge the air upward, downward, leftward, rightward, or diagonally with respect to the front of the cabinet assembly 100.

The door assembly 200 is disposed in the front of the cabinet assembly 100 and is assembled with the cabinet assembly 100.

The door assembly 200 is slidably movable in a horizontal direction with respect to the cabinet assembly 200 and may expose, to outside, a portion of a front surface of the cabinet assembly 200.

The door assembly 200 may be moved in at least one of a leftward direction or a rightward direction to open an inner space (S). In addition, the door assembly 200 is moved in the at least one of the leftward direction or the rightward direction to open only a portion of the inner space (S).

In one embodiment, the door assembly 200 is opened and closed with two steps.

A first-stage opening and closing of the door assembly 200 refers to a partial opening to supply water to the humidifying assembly 800 and only exposes an area of a water tank 810 of the humidifying assembly 800.

A two-stage opening and closing of the door assembly 200 refers to a full opening and is performed for installation and repair. In this example, the door assembly 200 includes a door stopper structure for limiting the second-stage opening and closing.

The filter assembly 600 is disposed on a rear side of the cabinet assembly 100. The filter assembly 600 may be rotated to the side of the cabinet assembly 100 when the filter assembly 600 is disposed on the rear side of the cabinet assembly 100. The user may separate only a filter from the filter assembly 600 moved to the side of the cabinet assembly 100.

In one embodiment, the filter assembly 600 includes two portions and each of the two portions thereof may be rotated leftward or rightward.

The moving cleaner 700 cleans the filter assembly 600. The moving cleaner 700 may move vertically to clean the filter assembly 600. The moving cleaner 700 may suction air while moving to separate foreign substances attached to the filter assembly 600, and the separated foreign substances are stored therein.

The moving cleaner 700 does not interfere with the filter assembly 600 when the filter assembly 600 rotates.

The humidifying assembly 800 provides moisture to the inner space (S) of the cabinet assembly 100 and the provided moisture may be discharged indoors by the fan assembly. The humidifying assembly 800 includes a detachable water tank 810.

In one embodiment, the humidifying assembly 800 is disposed at a lower portion thereof inside the cabinet assembly 100. The heat exchange assembly 500 and the fan assemblies 300 and 400 are each disposed above the humidifying assembly 800.

<<<Configuration of Short-Distance Fan Assembly>>>

The short-distance fan assembly 300 discharges air to a side discharge outlet 301 of the cabinet assembly 100. The short-distance fan assembly 300 discharges the air to the side discharge outlet 301 and provides indirect air movement to users.

The short-distance fan assembly 300 may be disposed in front of the heat exchange assembly 500. The short-distance fan assembly 300 includes a plurality of fans 310 vertically stacked. In one embodiment, the short-distance fan assembly 300 includes three fans 310 vertically stacked.

In one embodiment, the fan 310 uses a centrifugal mixed flow fan. The fan 310 suctions air in an axial direction and discharges the air in a circumferential direction.

The fan 310 suctions the air from the rear side thereof, discharges the air in the circumferential direction thereof, and the air discharged in the circumferential direction flows to the front side thereof.

The short-distance fan assembly 300 includes a fan casing 320 defining openings at a front side and a rear side thereof and coupled to the cabinet assembly 100 along with a plurality of fans 310 coupled to the fan casing 320 and disposed in the fan casing 320.

The fan casing 320 has a box shape and defines openings at a front surface and a rear surface thereof. The fan casing 320 is coupled to the cabinet assembly 100.

The front surface of the fan casing 320 faces the door assembly 200. The rear surface of the fan casing 320 faces the heat exchange assembly 500.

The front surface of the fan casing 320 contacts the door assembly 200 and is closed.

In one embodiment, a portion of the side surface of the fan casing 320 is exposed to an outside. The fan casing 320 exposed to the outside defines a side discharge outlet 301. A discharging vane is disposed in the side discharge outlet 302 to control an air discharge direction. The side discharge outlets 301 are disposed on the left side and the right side of the fan casing 320.

The fan 310 is disposed inside the fan casing 320. The plurality of fans 310 are disposed on the same plane and are vertically stacked in a row.

The fan 310 uses the centrifugal mixed flow fan to suction the air from the rear surface of the fan casing 320 and then discharge the air forward in the circumferential direction.

Figure 8:
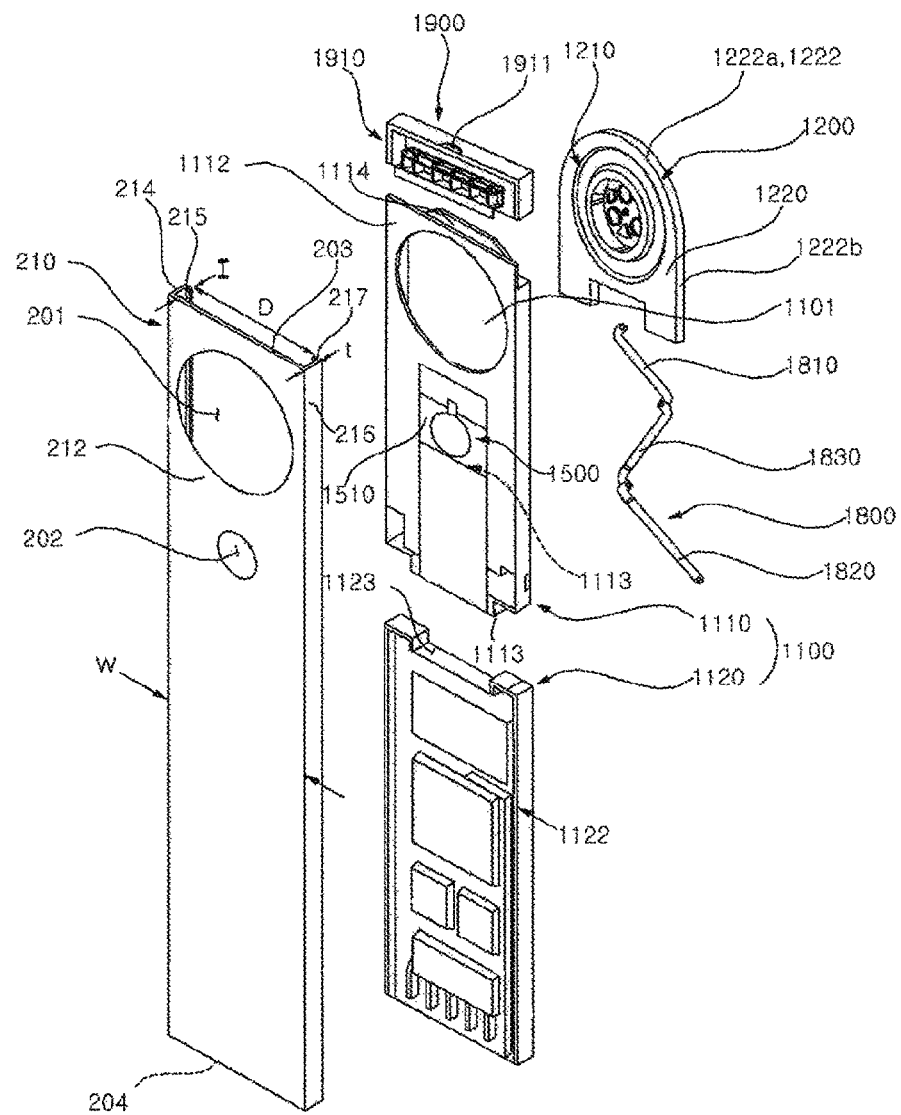
FIG. 8 is an exploded perspective view showing a door assembly in FIG. 1.

FIG. 8 is an exploded perspective view showing a door assembly in FIG. 1.

Figure 9:
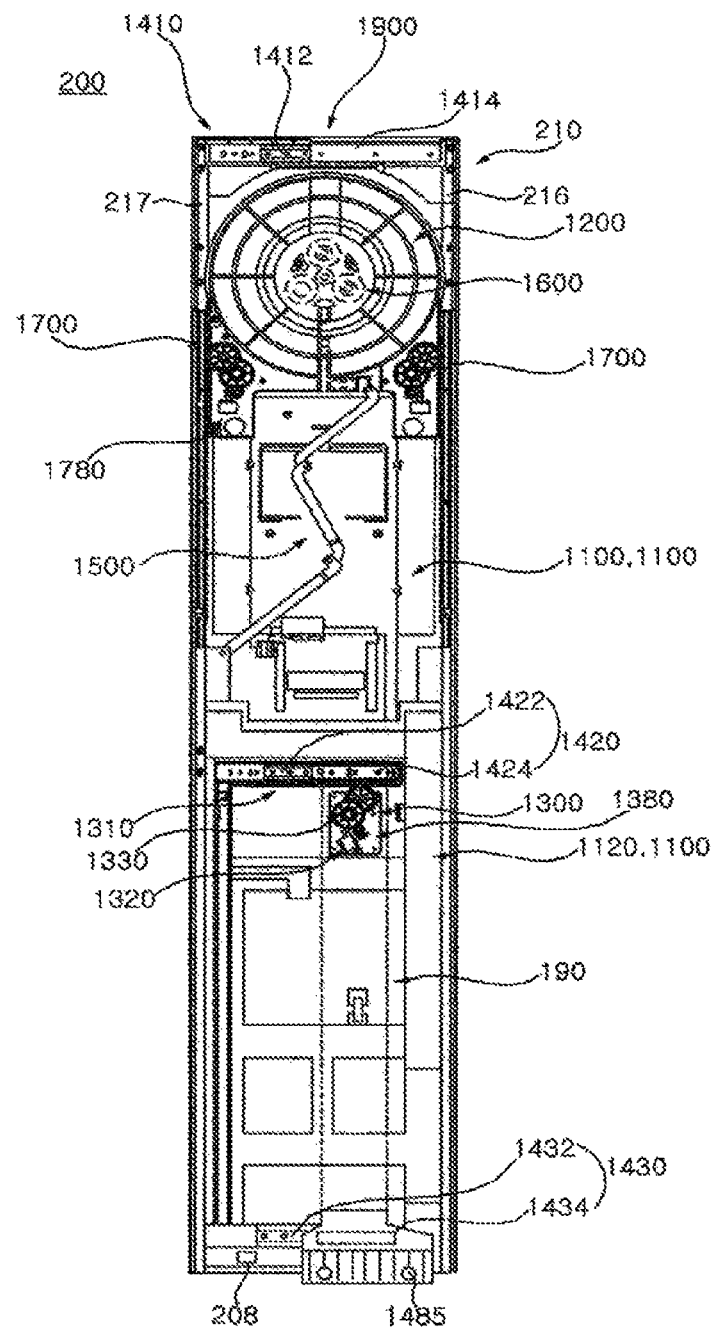
FIG. 9 is a rear view showing a door assembly in FIG. 1.
Figure 10:
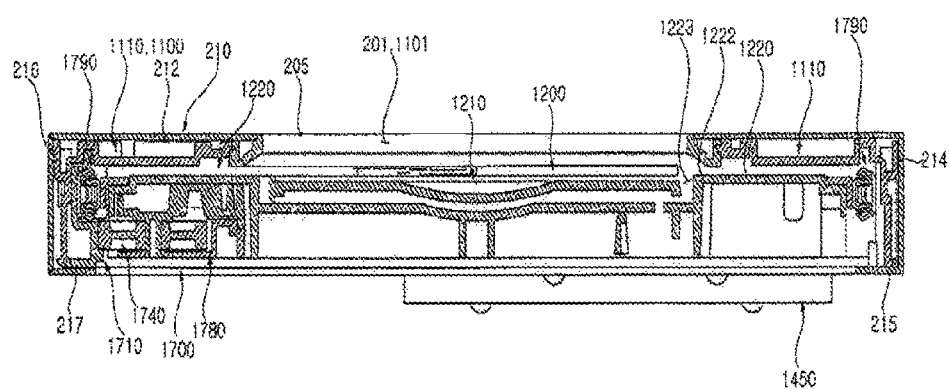
FIG. 10 is a plan cross-sectional view showing a door assembly in FIG. 2.
Figure 11:
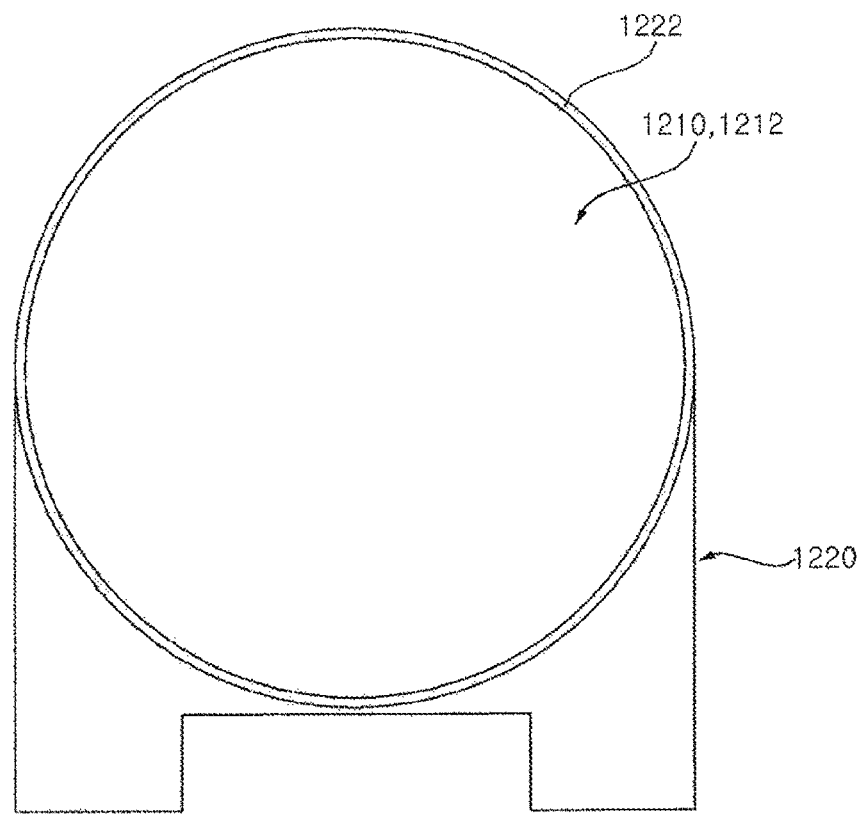
FIG. 11 is a front view showing a door cover assembly in FIG. 8.
Figure 12:
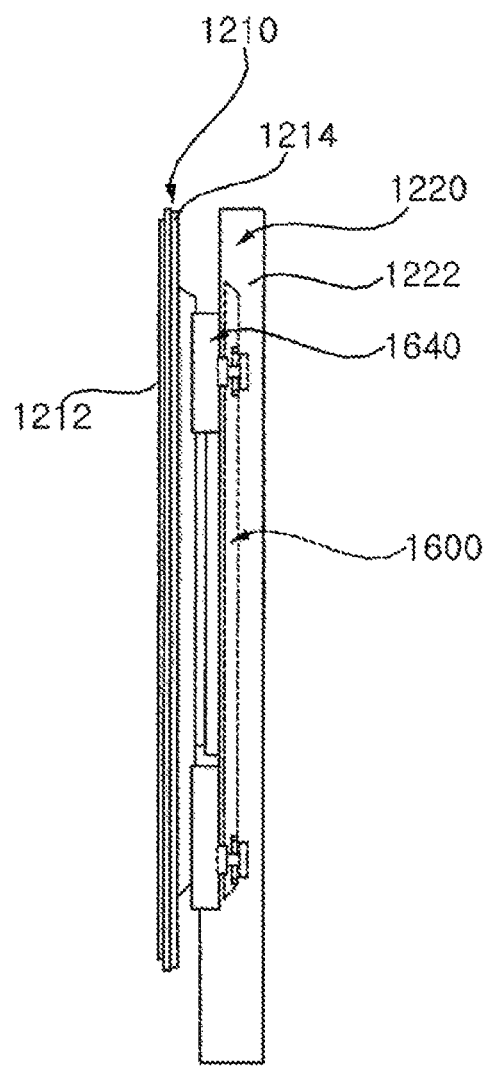
FIG. 12 is a right side view showing the door cover assembly in FIG. 11.
Figure 13:
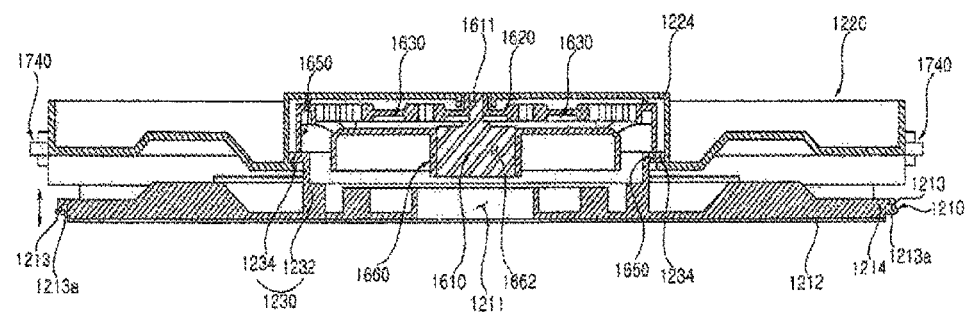
Figure 14:
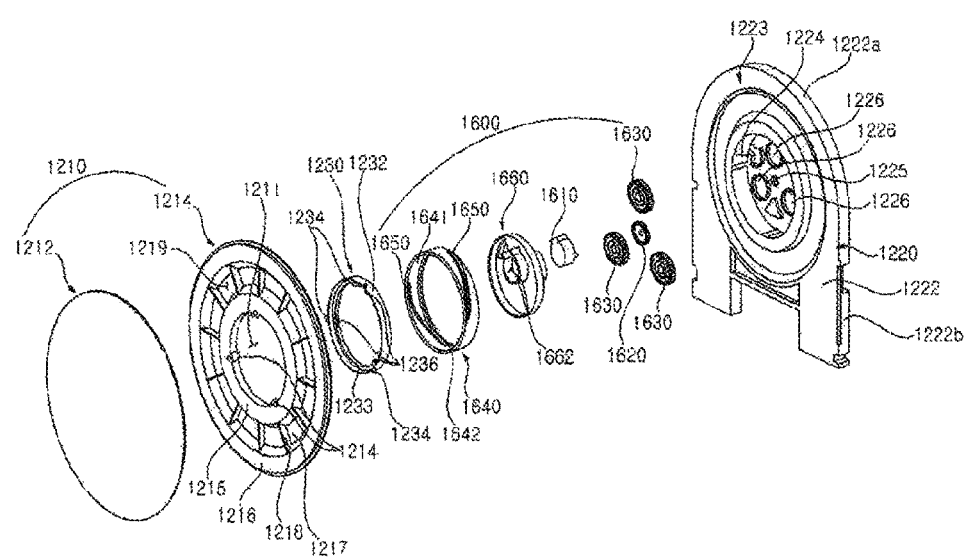
FIG. 14 is an exploded perspective view showing a door cover assembly according to an embodiment of the present disclosure.
Figure 15:
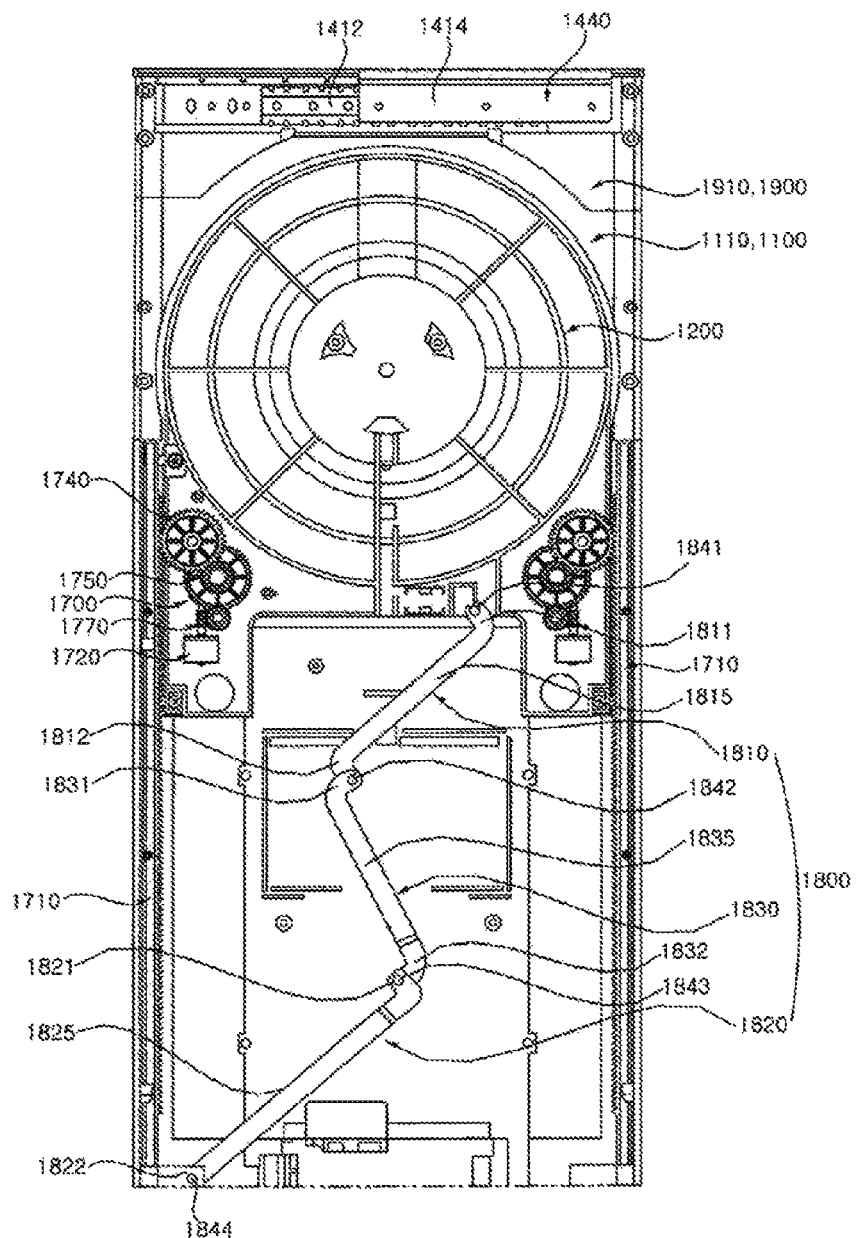
FIG. 15 is an enlarged view showing an upper portion of a door assembly in FIG. 5.
Figure 16:
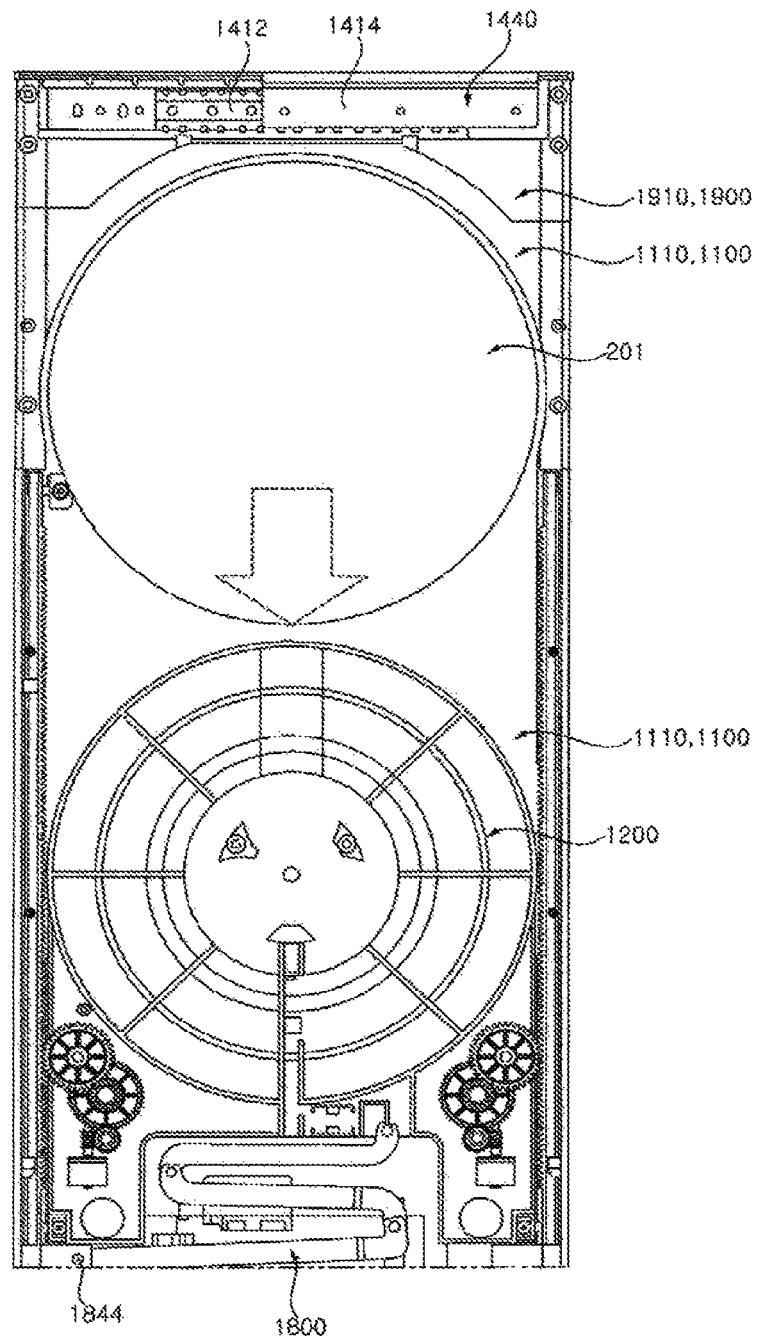
FIG. 16 is an exemplary view showing a door cover assembly in FIG. 0.15 moving downward.
Figure 17:
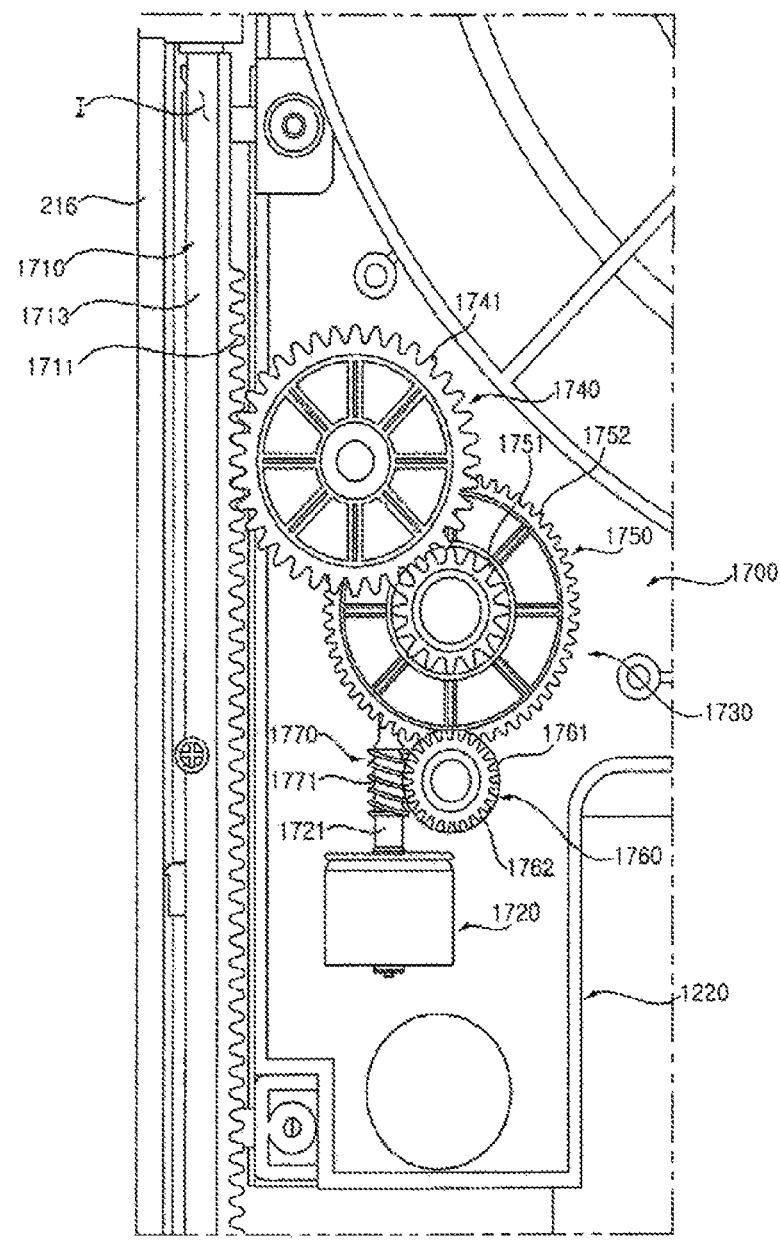
FIG. 17 is an enlarged view showing a door housing moving module in FIG. 15.
Figure 18:
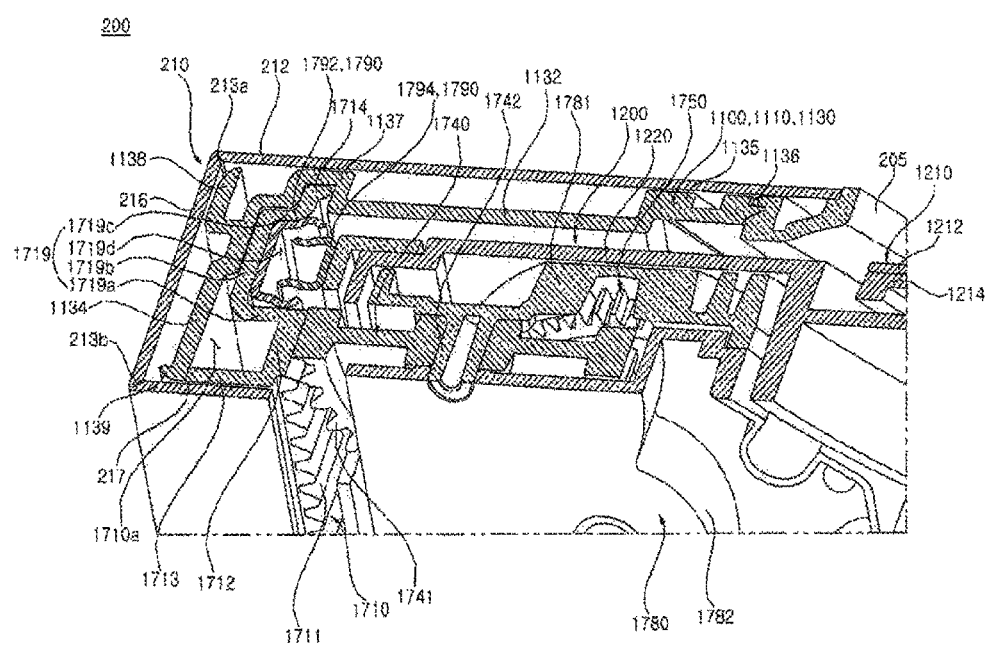
FIG. 18 is a cut-away perspective view showing a coupled structure of a door housing moving module in FIG. 10.
Figure 19:
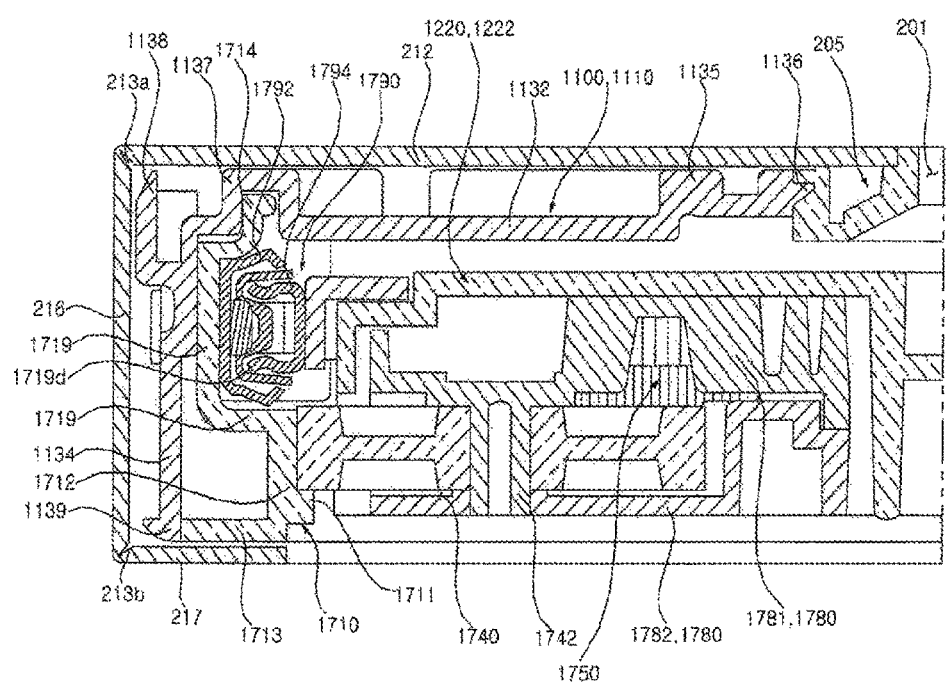
FIG. 19 is an enlarged view showing a coupled structure of a door housing moving module in FIG. 10.

FIG. 9 is a rear view showing a door assembly in FIG. 1. FIG. 10 is a plan cross-sectional view showing a door assembly in FIG. 2. FIG. 11 is a front view showing a door cover assembly in FIG. 8. FIG. 12 is a right side view showing the door cover assembly in FIG. 11. FIG. 13 is a plan cross-sectional view showing the door cover assembly in FIG. 12. FIG. 14 is an exploded perspective view showing a door cover assembly according to an embodiment of the present disclosure. FIG. 15 is an enlarged view showing an upper portion of a door assembly in FIG. 5. FIG. 16 is an exemplary view showing a door cover assembly in FIG. 0.15 moving downward. FIG. 17 is an enlarged view showing a door housing moving module in FIG. 15. FIG. 18 is a cut-away perspective view showing a coupled structure of a door housing moving module in FIG. 10. FIG. 19 is an enlarged view showing a coupled structure of a door housing moving module in FIG. 10.

<<<Configuration of Door Assembly>>>

The door assembly 200 includes a front panel 210 that defines a front discharge outlet 201, a panel module 1100 coupled to a rear surface of the front panel 210 and to define a panel discharge outlet 1101 communicating with the front discharge outlet 201, a door cover assembly 1200 disposed on the panel module 1100 to open and close the panel discharge outlet 1101 and the front discharge outlet 201, a door slide module 1300 disposed on the panel module 1100 to horizontally move the panel module 1100 with respect to the cabinet assembly 100, a camera module 1900 disposed on the panel module 1100 to capture an indoor image, and a cable guide 1800 having an upper end assembled to be rotatable relative to the door cover assembly 1200 and a lower end assembled to be rotatable relative to the panel module assembly 1100, to accommodate a cable connected to the door cover assembly 1200.

The front panel 210 defines the front discharge outlet 201 and the front discharge outlet 201 is opened in a forward and rearward direction. The panel discharge outlet 1101 is defined in the panel module 1100 and is opened in a forward and rearward direction.

The front discharge outlet 201 and the panel discharge outlet 1101 may have the same area and shape. The front discharge outlet 201 is disposed in front of the panel discharge outlet 1101.

In addition, the door assembly 200 further includes a display module 1500 disposed in the panel module 100 to visually provide indoor unit information to the front panel 210.

The display module 1500 may be disposed on the rear surface of the front panel 1100 and may provide visual information to the user through the front panel 1100.

For example, the display module 1500 may pass through the front panel 1100 to expose a portion thereof and may provide visual information to the user through the exposed display.

In one embodiment, the display module 1500 transmits the information to the user through the display opening 202 defined in the front panel 210.

<<Configuration of Front Panel>>

The front panel 210 may be disposed on a front surface of an indoor unit. A front panel 210 includes a front panel body 212, a front discharge outlet 201 opened in a forward and rearward direction of the front panel body 212, a display opening 202 opened in a forward and rearward direction of the front panel body 212, a first front panel side 214 disposed on the left side of the front panel body 212 to cover the left surface of the panel module 1100, and a second front panel side 216 disposed at the right side of the front panel body 212 to cover a right surface of the panel module 1100.

The front panel 210 has a vertical length compared to a horizontal width. In one embodiment, the vertical length of the front panel 210 is three times or more than the horizontal width. In addition, the front panel 210 has a very thin thickness in the forward and rearward direction compared to the horizontal width. In one embodiment, the thickness in the forward and rearward direction of the front panel 210 is ¼ or less compared to the horizontal width.

In one embodiment, the display opening 202 is disposed below the front discharge outlet 201. In another embodiment, the display opening 202 may be disposed above the front discharge outlet 201.

The front discharge outlet 201 and the display opening 202 are disposed in the vertical direction. A virtual center line C connecting a center of the front discharge outlet 201 to a center of the display opening 202 is vertically disposed. The front panel 210 is bilaterally symmetrical with respect to the center line C.

A camera 1950 of the camera module 1900 may also be disposed on the center line C.

The front discharge outlet 201 may have a circular shape. The shape of the front discharge outlet 201 corresponds to a front shape of a discharge grill 450. The discharge grill 450 concealed in the cabinet assembly 100 is exposed to the outside through the front discharge outlet 201.

In one embodiment, the front discharge outlet 201 is selectively opened to expose the discharge grill 450. In addition, the discharge grill 450 protrudes forward than the front panel 210 through the front discharge outlet 201.

When the discharge grill 450 protrudes forward through the front panel 210, interference between the air passing through the discharge grill 450 and the front panel 210 may be minimized to farther flow the discharged air.

The first front panel side 214 protrudes rearward from a left edge of the front panel body 212 and covers the left surface of the panel module 1100 coupled to the rear surface of the front panel body 212.

The second front panel side 216 protrudes rearward from a right edge of the front panel body 212 and covers the right surface of the panel module 1100 coupled to the rear surface of the front panel body 212.

The first front panel side 214 and the second front panel side 216 each block side surfaces of the panel module 1100 from being exposed to the outside.

In addition, a first front panel end 215 protruding from the rear end of the first front panel side 214 toward the second front panel side 216 is further disposed. A second front panel end 217 protruding from the rear end of the second front panel side 216 toward the first front panel side 214 is further disposed.

The first front panel end 215 and the second front panel end 217 are each disposed on the rear surface of the panel module 1100. For example, the panel module 1100 is disposed between the front panel body 212 and the front panel ends 215 and 217.

In one embodiment, a distance between the front panel body 212 and each of the front panel ends 215 and 217 is referred to as "an inner distance (I)" of the front panel. The inner distance (I) is shorter than the thickness in the forward and rearward direction of the front panel 210.

In addition, the first front panel end 215 and the second front panel end 217 face each other and are spaced apart from each other. In one embodiment, a distance between the first front panel end 215 and the second front panel end 217 is referred to as "an opening distance (D)" of the front panel. The opening distance (D) of the front panel 210 is shorter than a horizontal width (W) of the front panel 210.

In one embodiment, the front panel body 212 is parallel to the front panel ends 215 and 217. The front panel body 212 and the front panel sides 214 and 216 cross with each other and are orthogonal in one embodiment. The front panel sides 214 and 216 are each disposed in the forward and rearward direction.

In one embodiment, the front panel body 212, the front panel sides 214 and 216, and the front panel ends 215 and 217 of the front panel 210 are integrated with one another.

In one embodiment, the front panel 210 is entirely made of metal. In particular, the front panel 210 is entirely made of aluminum.

The front panel sides 214 and 216 are bent from the front panel body 212 toward the rear side thereof and the front panel ends 215 and 217 are bent from the front panel sides 214 and 216 toward the opposite sides thereof.

A first bending groove (not shown) is defined at a bending portion between the front panel body 212 and the first front panel side 214 and a second bending groove 213*a* may be defined at a bending portion between the front panel body 212 and the second front panel side 216 to easily bend the front panel 210 entirely made of metal.

In addition, a third bending groove (not shown) is defined at a bending portion between the first front panel side 214 and the first front panel end 215 and a fourth bending groove 213*b* may be defined at a bending portion between the second front panel side 216 and the second front panel end 217.

Each of the bending grooves may extend in the vertical direction of the front panel 210. Each of the bending grooves is preferably disposed inside the bending portion. When the first bending groove and the second bending groove 213*a* are not provided, an angle between the front panel body 212 and the front panel side may be difficult to be a right angle. In addition, when the first bending groove and the second bending groove 213*a* are not provided, the bending portion between the front panel body 212 and the front panel side does not have a flat shape and may protrude in any direction, and a shape thereof may be changed during bending. The third bending groove and the fourth bending groove 213*b* perform the same function as the first bending groove and the second bending groove 213a.

A panel upper opening 203 is defined at the top of the front panel 210 manufactured as described and a panel lower opening 204 is defined at the bottom of the front panel 210. In one embodiment, as the front panel 210 is manufactured by bending a single metal plate, the panel upper opening 203 and the panel lower opening 204 have the same area and shape.

The thickness of the panel module 1100 is equal to or less than the distance between the front panel body 212 and each of the front panel ends 215 and 217. The panel module 1100 may be inserted through the panel upper opening 203 or the panel lower opening 204. The panel module 1100 may be coupled by a fastening member (not shown) passing through the front panel ends 215 and 217.

The camera module 1900 may be inserted into the panel upper opening 203 and is disposed on the panel module 1100. The camera module 1900 may close the panel upper opening 203.

The camera module 1900 may be disposed above the front discharge outlet 201 and is disposed on the rear surface of the front panel 210. The camera module 1900 is concealed by the front panel 210. The camera module 1900 is exposed above the front panel 210 only during operation and is hidden at the rear surface of the front panel 210 when not in operation.

The front panel ends 215 and 217 surround the side surface and the rear surface of the camera module 1900 and a fastening member (not shown) is coupled to the camera module 1900 through the front panel ends 215 and 217.

In one embodiment, the panel upper opening 203 and the camera module 1900 have the same horizontal width. In addition, in one embodiment, the panel upper opening 203 and the panel module 1100 have the same horizontal width.

In one embodiment, the panel upper opening 203 and the camera module 1900 have the same thickness in the forward and rearward direction. In addition, in one embodiment, the panel upper opening 203 and the panel module 1100 have the same thickness in the forward and rearward direction.

In this example, the camera module 1900 and the panel module 1100 may be disposed between the front panel body 212 and each of the front panel ends 215 and 217 and may be supported by the front panel body 212 and the front panel ends 215 and 217.

<<Structure of Panel Module>>

The panel module 1100 includes an upper panel module 1110 and a lower panel module 1120. In another embodiment, the upper panel module 1110 and the lower panel module 1120 may be integrated with each other. In one embodiment, as the front panel 210 has a greater vertical length than a horizontal width of the front panel 210, there is a restriction that the panel module 100 is difficult to be inserted through a panel upper opening 203 or a panel lower opening 204 of the front panel 210 when the panel module 1100 including the integrated components is manufactured.

In one embodiment, the panel 1100 includes two components, for example, the upper panel module 1110 and the lower panel module 1120, the upper panel module 1110 is inserted into the front panel 210 through the panel upper opening 203, and the lower panel module 1120 is inserted into the front panel 210 through the panel lower opening 204.

When the panel 1100 is manufactured to include two components, there is an advantage that the upper panel module 1110 or the lower panel module 1120 may each be easily repaired and replaced. The integrated upper panel module 1110 and lower panel module 1120 suppress distortion of the front panel 210 and provide rigidity against external force.

For example, when the door cover assembly 1200 needs to be replaced, only the upper panel module 1110 may be separated and when a door slide module 1300 needs to be replaced, only the lower panel module 1120 may be replaced.

The upper panel module 1110 and the lower panel module 1120 are each inserted into a space having the inner distance (I) of the front panel 210, support the front panel 210, and prevent deformation and warpage of the front panel 210.

In one embodiment, the upper panel module 1110 and the lower panel module 1120 are made of molded material. The upper panel module 1110 and the lower panel module 1120 made of the molded material each contact the front panel body 212, the front panel sides 214 and 216, and the front panel ends 215 and 217.

The upper panel module 1110 and the lower panel module 1120 each support the front panel body 212, the front panel sides 214 and 216, and the front panel end 215 and 217 to suppress the warpage of the front panel 210 made of metal.

In one embodiment, the upper panel module 1110 and the lower panel module 1120 each support the entire surfaces of the first front panel side 214 and the second front panel side 216 to which external impact is frequently applied.

In addition, the upper panel module 1110 and the lower panel module 1120 each support only a partial area and do not support the entire surface of the front panel body 212 to reduce overall load of the door assembly 200. For example, the upper panel module 1110 and the lower panel module 1120 each define a plurality of bending portions at a front side and a rear side thereof and support some areas on the rear surface of the front panel body 212.

<Configuration of Upper Panel Module>

The upper panel module 1110 includes an upper panel body 1130 disposed on a rear surface of a front panel 210 and a panel discharge outlet 1101 to pass through the upper panel body 1130 in a forward and rearward direction, disposed behind the front discharge outlet 201, and communicating with the front discharge outlet 201.

The panel discharge outlet 1101 corresponds to the front discharge outlet 201. In one embodiment, the panel discharge outlet 1101 and the front discharge outlet 201 each have a circle shape. A gasket 205 may be disposed between the panel discharge outlet 1101 and the front discharge outlet 201 to prevent discharged air from leaking.

The gasket 205 is disposed along an inner surface of the front discharge outlet 201 and contacts the upper panel module 1110. The panel discharge outlet 1101 is defined on the rear surface of the gasket 205.

The panel discharge outlet 1101 has the area same as or greater than that of the front discharge outlet 201. In one embodiment, the panel discharge outlet 1101 has a slightly greater diameter than a diameter of the front discharge outlet 201 in consideration of the installation structure of the gasket 205. The gasket 205 contacts an inner surface of the front discharge outlet 201 and an inner surface of the panel discharge outlet 1101 and closes between the upper panel module 1110 and the front panel 210.

The discharge grill 450 of the long-distance fan assembly 400 sequentially passes through the panel discharge opening 1101 and the front discharge opening 201 and protrudes forward further than the front surface of the front panel 210.

When the discharge grill 450 protrudes to the outside, a front end of the fan housing 430 of the long-distance fan assembly 400 may contact the gasket 205. The front end of the fan housing 430 contacts the gasket 205 to block air flowing inside the fan housing 430 from leaking to the door assembly 200.

When the air discharged from the long-distance fan assembly 400 leaks into the door assembly 200, dew formation may occur inside the door assembly 200.

In particular, as the front panel 210 is made of metal, the discharged air leaking into the door assembly 200 during cooling may be used to cool the surroundings of the front discharge outlet 201 and to form a large amount of dew around the front discharge outlet 201.

Meanwhile, in one embodiment, the door cover assembly 1200 and the display module 1500 are each disposed on the upper panel module 1110.

When the door cover assembly 1200 and the display module 1500 are assembled to the upper panel module 1110, the assembled component is disposed within the thickness of the front panel 210.

To this end, a display installation portion 1113 may be disposed on the upper panel module 1110 and the display module 1500 is disposed in the display installation portion 1113. The display installation portion 1113 is disposed on the upper panel module 1110 to minimize a degree of protrusion of the display module 1500 forward from the upper panel body 1130.

The display installation portion 1113 may penetrate the upper panel module 1110 in the forward and rearward direction.

The display module 1500 may be assembled to the upper panel module 1110. The display module 1500 assembled to the upper panel module 1110 is partially exposed to the outside through the display opening 202 of the front panel 210. When the display module 1500 is exposed to the outside through the display opening 202, a display 1510 of the display module 1500 forms a continuous surface with the front surface of the front panel 210.

For example, the front surface of the display 1510 of the display module 1500 does not protrude forward further than the front panel 210 and forms the continuous plane with the front surface of the front panel 210.

The display module 1500 transmits and receives power and electrical signals through a cable passing through the upper panel module 1110.

The door cover assembly 1200 may be disposed on the rear surface of the upper panel module 1110 and may be moved vertically along the rear surface of the upper panel module 1110.

When the door cover assembly 1200 is moved downward after opening the front discharge outlet 201, the door cover assembly 1200 may be disposed at a same height as the display module 1500.

The door cover assembly 1200 is not coupled to the panel module 1100. The door cover assembly 1200 is moved vertically with respect to the panel module 1100.

In one embodiment, the upper panel module 1110 and the lower panel module 1120 are vertically stacked. In particular, the upper panel module 1110 and the lower panel module 1120 are assembled to each other inside the front panel 210 to minimize vibration or operating noise when the door assembly 200 slides.

To this end, the upper panel module 1110 and the lower panel module 1120 may be assembled by stationary fitting. One of the upper panel module 1110 and the lower panel module 1120 defines a panel protrusion protruding to the other one thereof and the other one thereof defines a panel fitting portion to accommodate the protrusion fitting portion.

In one embodiment, the upper panel module 1110 defines a panel protrusion 1113. The panel protrusion 1113 protrudes downward from a lower surface of the upper panel body 1130.

The lower panel module 1120 defines a panel fitting portion 1123 to accommodate the panel protrusion 1113 and to be assembled to the panel protrusion 1113 by the stationary fitting.

The panel fitting portion 1123 may be disposed on an upper surface of the lower panel module 1120.

<Configuration of Lower Panel Module>

The lower panel module 1120 may be disposed on a rear surface of a front panel 210. The lower panel module 1120 is disposed within an inner distance (I) of the front panel 210. The lower panel module 1120 is disposed under the upper panel module 1110, supports the upper panel module 1110, and is assembled to the upper panel module 1110.

The lower panel module 1120 is disposed in the front panel 210 to prevent deformation of the front panel 210. The lower panel module 1120 may be coupled to the upper panel module 1110 by stationary fitting and supports the upper panel module 1110 under the upper panel module 1110.

The lower panel module 1120 includes a lower panel body 1122 assembled to the front panel 210. A panel fitting portion 1123 may be disposed above the lower panel body 1122 to be fitted to the panel protrusion 1113 of the upper panel module 1110. The panel fitting portion 1123 is concave downward.

A driver of the door slide module 1300 may be disposed on the lower panel module 1120.

The lower panel module 1120 is coupled to the front panel 210 by fastening members (not shown) penetrating the first front panel end 215 and the second front end 217, respectively.

The fastening members are all disposed on the rear surfaces of the first front panel end 215 and the second front end 217 to couple the upper panel module 1110 and the lower panel module 1120, thereby preventing exposure of a fastening structure of the door assembly 200 to the outside, which is hidden.

In particular, a fastening member or a fastening hole is not exposed on the outer surface of the front panel 210 made of metal and is hidden.

<<Configuration of Door Cover Assembly>>

The door cover assembly 1200 opens and closes a front discharge outlet 201 defined in a door assembly 200.

The door cover assembly 1200 opens the front discharge outlet 201 to expand a movement path of a long-distance fan assembly 400. The long-distance fan assembly 400 may protrude outside the door assembly 200 through the open front discharge outlet 201.

The door cover assembly 1200 is disposed on the movement path of the long-distance fan assembly 400, and when the front discharge outlet 201 is opened, the door cover assembly 1200 is moved out of the movement path of the long-distance fan assembly 400.

The door cover assembly 1200 includes a door cover 1210 disposed in the front discharge outlet 201, moved in a forward and rearward direction of the front discharge outlet 201, to open and close the front discharge outlet 201, a door cover housing 1220 disposed at a rear side of the door cover 1210 and disposed in the door assembly 200, a door cover moving module 1600 disposed in the door cover housing 1220, disposed between the door cover housing 1220 and the door cover 1210, and disposed on the rear surface of the door cover 1210, to move the door cover 1210 in the forward and rearward direction, and a door housing moving module 1700 disposed in at least one of the door cover housing 1220 or the door assembly 200 to vertically move the door cover housing 1220.

The door cover 1210 is inserted into the front discharge outlet 201 and provides a continuous surface with the front panel 210. The door cover 1210 may move rearward based on the operation of the door cover moving module 1600. After the door cover 1210 is separated from the front discharge outlet 201, the door cover assembly 1200 may be moved downward by operating the door housing moving module 1700.

When the door cover 1210 is moved downward by the door housing moving module 1700, the front discharge outlet 201 is opened in the forward and rearward direction.

For convenience of description, a state in which the door cover 1210 is moved rearward from the front discharge outlet 201 by the door cover moving module 1600 and the front panel 210 is spaced apart from the door cover 1210 in the forward and rearward direction is referred to as "first front opening".

In the first front opening, the long-distance fan assembly 400 is covered by the door cover 1210 and is not exposed to the user. In the first front opening, air inside a cabinet may be discharged into an indoor space through a gap between the door cover 1210 and the front panel 210.

In the first front opening, the long-distance fan assembly 400 is disposed behind the door cover 1210. In the first front opening, the door cover 1210 is disposed behind the front panel body 212.

A state in which the door cover 1210 is moved downward from the front discharge outlet 201 by the door housing moving module 1700 from behind the front discharge outlet 201 and the front discharge outlet 201 is not covered by the door cover 1210 is referred to as "second front opening".

In the second front opening, the door cover 1210 is disposed below the front discharge outlet 201 and the long-distance fan assembly 400. In the second front opening, the door cover 1210 is disposed behind the front panel body 212.

In the second front opening, the long-distance fan assembly 400 is exposed to the user through the front discharge outlet 201. In the second front opening, the long-distance fan assembly 400 is moved forward to protrude outward from the front discharge outlet 201 and the long-distance fan assembly 400 may discharge air toward an indoor space when the long-distance fan assembly 400 protrudes outward from the front panel 210.

In the second front opening, at least one of the door cover housing 1220 or the door cover 1210 is disposed at a rear side of the display 1500. In the second front opening, even if the door cover 1210 moves downward, the door cover 1210 does not interfere with the display 1500. In the second front opening, the door cover 1210 may be spaced apart from the rear surface of the display 1500 by a predetermined distance.

For example, in the first front opening, the door cover 1210 needs to be moved rearward more than a thickness of the front panel 210 to prevent interference between the door cover 1210 and the display 1500 during the second front opening operation.

The door cover 1210 includes an outer door cover 1212 to form a continuous surface with the front panel 210, an inner door cover 1214 coupled to the rear surface of the outer door cover 1212, assembled to the door cover moving module 1600, and moving forward and rearward based on a driving power of the door cover moving module 1600, and a mover 1230 disposed in the inner door cover 1214, protruding rearward from the inner door cover 1214, to receive the driving power from the door cover moving module 1600 through interference with the door cover moving module 1600, and to receive the driving power needed for forward movement or rearward movement of the inner door cover 1214 through the interference.

The mover 1230 is assembled to a cover guide 1640 of the door cover moving module 1600 described below. The mover 1230 interferes with the cover guide 1640 when the cover guide 1640 is rotated and moves the door cover 1210 coupled to the mover 1230 forward or rearward.

The outer door cover 1212 has the same area and shape as the front discharge outlet 201.

The inner door cover 1214 is not limited to the area or the shape of the front discharge outlet 201. In one embodiment, the inner door cover 1214 is wider than the outer door cover 1212.

When the outer door cover 1212 is inserted into the front discharge outlet 201, the inner door cover 1214 contacts an edge of the front discharge outlet 201.

In one embodiment, the front discharge outlet 201 and the outer door cover 1212 have a circle shape with the same diameter and the inner door cover 1214 has a circle shape with a greater diameter than that of the front discharge outlet 201. In particular, the outer edge of the inner door cover 1214 has a vertically flat shape and covers a boundary between the front discharge outlet 201 and the outer door cover 1212.

The outer door cover 1212 may be made of the same material as the front panel 210. The outer door cover 1212 may be entirely made of aluminum metal. The outer door cover 1212 may be coated only with a metal on the front surface. When only the front surface of the outer cover door 1212 is coated with metal, load of the door cover 1210 may be reduced and operating load of the door cover moving module 1600 and the door housing moving module 1700 may be reduced.

The outer door cover 1212 has the same thickness as the front panel body 212 and the outer door cover 1212 may form a continuous surface with the front surface and the rear surface of the front panel body 212 when the outer door cover 1212 is inserted into the front discharge outlet 201.

The inner door cover 1214 contacts the rear surface of the outer door cover 1212, is coupled to the rear surface of the outer door cover 1212, and has a diameter greater than that of the outer door cover 1212.

A center of the inner door cover 1214 corresponds to a center of the outer door cover 1212.

In one embodiment, the inner door cover 1214 has a circular plate shape. In another embodiment, the inner door cover 1214 may have a ring shape with a central hole.

The inner door cover 1214 includes a core door cover 1215 disposed at a center thereof to contact the rear surface of the outer door cover 1212, a border door cover 1216 disposed radially outside of the core door cover 1215 to contact an outer edge of the outer door cover 1212, a connect door cover 1217 to connect the core door cover 1215 and the border door cover 1216 and which is spaced apart from the outer door cover 1212 to provide a space 1119, and a connecting rib 1218 to connect the core door cover 1215, the connect door cover 1217, and the border door cover 1216 and which protrudes from the connect door cover 1217 toward the outer door cover 1212.

The connecting rib 1218 is disposed radially outward from the center of the inner door cover 1214. A plurality of connecting ribs 1218 are disposed with the same angle with respect to the center of the inner door cover 1214.

A front surface of the connecting rib 118 may contact the rear surface of the outer door 1212. The rear surface of the connecting rib 1218 may be integrated with the connect door cover 1217. An inner surface of the connecting rib 1218 is connected to the core door cover 1215 and the outer surface thereof is connected to the border door cover 116.

The space 1119 is provided among the core door cover 1215, the border door cover 1216, and the plurality of connecting ribs 1218.

A plurality of spaces 1119 are provided radially with respect to the center of the inner door cover 1214 and the plurality of spaces 1119 are provided at an equal angle. Rigidity of the inner door cover 1214 is improved due to the structure of each of the connecting rib 1218 and the space 1119.

The core door cover 1215 has a circular shape when viewed from the front and the border door cover 1216 has a ring shape.

The core door cover 1215 defines a core opening 1211 into which some components of the door cover moving module 1600 are inserted. Some components of the door cover moving module 1600 are inserted into the core opening 1211 to minimize the thickness in the forward and rearward direction of the door cover assembly 1200.

The border door cover 1216 may be parallel to the outer door cover 1212. The border door cover 1216 includes a border flange 1213 protruding outward than an outer edge of the outer door cover 1212.

The outer door cover 1212 and the inner door cover 1214 may be integrated with each other. In this case, the border flange 1213 is disposed at the outer edge of the door cover 1210.

The border flange 1213 is disposed at the rear side than the inner door cover 1214. The border flange 1213 protrudes radially outward than the inner door cover 1214.

In one embodiment, the border flange 1213 is disposed along the outer edge of the outer door cover 1214 and has a circular shape.

When the door cover 1210 is inserted into the front discharge outlet 201 of the front panel 210, the border flange 1213 contacts the rear surface of the front panel 210 and contacts the boundary between the front discharge outlet 201 and the outer door cover 1212.

The border flange 1213 has a ring shape when viewed from the front. A gasket (not shown) may be disposed on the border flange 1213. The gasket may contact the boundary between the front discharge outlet 201 and the outer door cover 1212.

When the door cover 1210 contacts the front panel 210, the gasket may reduce connection noise and close the boundary between the front discharge outlet 201 and the outer door cover 1212.

When the long-distance fan assembly 400 is not operated and only the short-distance fan assembly is operated, if cold air leaks through the boundary, dew formation may occur at the boundary.

A groove 1213a may be concave from a front surface to the rear of the border flange 1213. The groove 1213a has a ring shape when viewed from the front. The gasket may be inserted into the groove 1213a.

The thickness of the door cover assembly 1200 occupies most of the thickness of the door assembly 200. Therefore, minimizing the thickness in the forward and rearward direction of the door assembly 200 is an important factor to minimize the thickness of the door assembly 200. When the thickness of the door assembly 200 is minimized, the operating load of the door slide module 1300 may be minimized.

The core opening 1211 passes through the outer door cover 1214 in the forward and rearward direction. A motor of the door cover moving module 1600 described below is inserted into the core opening 1211.

The mover 1230 is disposed on the inner door cover 1214. The mover 1230 may be integrated with the inner door cover 1214.

In one embodiment, the mover 1230 is separately manufactured and then assembled to the inner door cover 1214. Therefore, the mover 1230 has an assembly structure to be assembled to the inner door cover 1214.

The mover 1230 includes the mover body 1232 protruding to the rear side from the inner door cover 1214 and a mover guide 1234 protruding inward or outward from the mover body 1232 and inserted into a guideway 1650 of the cover guide 1640 described below.

The mover body 1232 has a ring shape when viewed from the front.

A mover fastener 1236 fastened to the inner door cover 1214 is disposed on the mover body 1232. The mover fastener 1236 protrudes inward from the mover body 1232. A protruding direction of the mover fastener 1236 is opposite to a protruding direction of the mover guide 1234.

The inner door cover 1214 includes a fastener 1214a corresponding to the mover fastener 1236. The fastener 1214a protrudes through the core opening 1211. The fastener 1214a is inserted into the mover body 1232.

A mover body supporter 1233 may be disposed on an inner circumferential surface of the mover body 1232 to support the rear end of the core door cover 1215.

The mover body 1232 and the mover guide 1234 may be integrated with each other. The mover body 1232 protrudes rearward from the door cover 1210. The mover body 1232 extends to a length such that the mover body 1232 interferes with the cover guide 1640 described below.

In one embodiment, the mover guide 1234 is orthogonal to the mover body 1232. The mover guide 1234 may be disposed in a direction parallel to the front panel body 212.

The protruding direction of the mover guide 1234 may vary depending on the coupling with the cover guide 1640. In one embodiment, as the mover body 1232 is inserted into the cover guide 1640, the mover guide 1234 protrudes outward from the mover body 1232. In another embodiment one embodiment, when the mover body 1232 is disposed outside the cover guide 1640, the guide protrusion protrudes inside the mover body 1232.

The mover guide 1234 is assembled to the guideway 1650 of the cover guide 1640 described below and may be moved forward or rearward along the guideway 1650 when the cover guide 1640 is rotated.

Meanwhile, the door cover housing 1220 is moved vertically along the upper panel 1110.

The door cover housing 1220 includes a door cover housing body 1222 that moves vertically along the upper panel 1110, a door cover accommodator 1223 disposed in the door cover housing body 1222, to define an opening open forward and selectively accommodate the door housing cover 1222, and a moving module installation portion 1224 disposed in the door cover housing body 1222 to define an opening open forward, to communicate with the door cover accommodator 1223, disposed at a rear side thereof than the door cover accommodator 1223, and in which the door cover moving module 1600 is disposed.

The door cover housing 1220 is disposed within an inner distance (I) of the front panel 210. The left side and the right side of the door cover housing 1220 are disposed within the inner distance (I) and most of them are exposed through the opening having the open distance (D).

The left side and the right side of the door cover housing 1220 are disposed at the front sides of the front panel ends 215 and 217 and the front panel ends 215 and 217 are engaged with respect to the forward and rearward direction of the door cover housing 1220 and block the door cover housing 1220 from being separated rearward. The door cover housing 1220 may vertically slide and limit the forward movement and the rearward movement thereof.

The door cover housing body 1222 may be moved vertically within the inner distance (I) on each of the left side and the right side of the front panel 210. The door cover housing body 1222 is moved vertically by the door housing moving module 1700.

The thickness in the forward and rearward direction of the door cover housing body 1222 is less than the inner distance (I).

When the door cover moving module 1600 is operated, the door cover 1210 is moved rearward and may be accommodated in the door cover accommodator 1223. When the front discharge outlet 201 is closed, the door cover 1210 is disposed in front of the door cover housing 1220 and is flush with the front panel 210.

The door cover accommodator 1223 defines an opening at a front side thereof to accommodate the door cover 1210 and has a circular shape when viewed from the front. The door cover accommodator 1223 may be concave rearward from the door cover housing 1222.

The upper surface 1222a of the door cover housing body 1222 has a curved surface and surrounds the edge of the door cover 1210. The door cover 1210 may be disposed below the upper surface 1222a. The door cover accommodator 1223 is disposed under the upper surface 1222a.

A center of curvature of the upper surface 1222a may be identical to a center of curvature of the door cover 1210. The upper surface 1222a is disposed radially outside the door cover 1210.

In addition, a door cover top wall 1114 is disposed on the upper panel body 1130 to interfere with the door cover housing 1220 and restrict movement of the door cover assembly 1200.

The door cover top wall 1114 protrudes rearward from the upper panel body 1130.

The door cover top wall 1114 may have a shape corresponding to an upper surface of the door cover housing 1220. In one embodiment, as the upper surface of the door cover housing 1220 has an arc shape when viewed from the front, the door cover top wall 1114 has an arc shape having a greater diameter than that of the door cover housing 1220.

The door cover top wall 1114 surrounds the entire upper surface of the door cover housing 1220. The door cover housing 1220 may contact the lower surface of the door cover top wall 1114 to prevent leakage of air inside the cabinet.

The door cover top wall 1114 may have the same center of curvature as the panel discharge outlet 1101. The door cover top wall 1114 has a greater radius of curvature than that of the panel discharge outlet 1101.

The door cover top wall 1114 may block the inside air of the cabinet from flowing toward the camera module 1900. When cold air of the cabinet assembly 100 is directly supplied to the camera module 1900, dew formation may occur on the camera module 1900.

The door cover top wall 1114 is preferably disposed above the panel discharge outlet 1101 to limit the upward movement of the door cover assembly 1200.

When the door cover assembly 1200 is moved upward and the upper surface 1222a contacts the door cover top wall 1114, the door cover 1210, the panel discharge outlet 1101, and the front discharge outlet 201 are disposed in a row in the forward and rearward direction. When the door cover assembly 1200 is not moved upward to a right position, the door cover 1210 is engaged with the upper panel body 1130 and may not be moved to the front discharge outlet 201.

Each of the side surface and the side surface 1222b of the door cover housing body 1222 corresponds to each of the front panel ends 215 and 217 of the front panel 210. The side surface 1222b is disposed within the inner distance (I) of the front panel 210 and may be moved vertically within the inner distance (I).

The moving module installation portion 1224 is concave to the rear side from the door cover housing body 1222. The moving module installation portion 1224 communicates with the door cover accommodator 1223 and is disposed at a rear side thereof than the door cover accommodator 1223.

The moving module installation portion 1224 defines an opening at a front side thereof and has a circular shape when viewed from the front. The moving module installation portion 1224 has an area less than the area of the door cover 1210 and is disposed at the rear side of the door cover 1210. The thickness in the forward and rearward direction of the moving module installation portion 1224 is less than the thickness of the door cover housing 1220.

In one embodiment, the moving module installation portion 1224 has a circular shape when viewed from the front. The moving module installation portion 1224 is concentric with the door cover 1210.

In addition, most of the components of the door cover moving module 1600 are disposed in the moving module installation portion 1224.

<<Configuration of Door Cover Moving Module>>

The door cover moving module 1600 moves the door cover 1210 in a forward and rearward direction. The door cover moving module 1600 implements the first front opening.

The door cover 1210 may be moved in the forward and rearward direction through various methods. For example, the door cover 1210 may be connected to an actuator such as a hydraulic cylinder, and may be moved in the forward and rearward direction through movement of a piston of the hydraulic cylinder. For example, the door cover 1210 may be moved in the forward and rearward direction through a motor and a multi joint link structure.

As a link structure and the hydraulic cylinder structure may include a structure to be moved or rotated forward within the cabinet assembly 100, the thickness in the forward and rearward direction of the door assembly 200 may be increased.

In one embodiment, the door cover moving module 1600 changes the rotational force of the door cover motor through interference to move the door cover 1210 in the forward and rearward direction.

The thickness in the forward and rearward direction of the door assembly 200 may be minimized due to the structure of the door cover moving module 1600.

The door cover moving module 1600 includes a door cover motor 1610 disposed at the rear side of the door cover 1210, disposed on the door cover housing 1220, and in which a door cover motor shaft 1611 is disposed in the forward and rearward direction, a sun gear 1620 coupled to the door cover motor shaft and rotated based on the operation of the door cover motor, a plurality of planetary gears 1630 rotatably assembled to the door cover housing 1220, engaged with the sun gear 1620, and disposed radially outside the sun gear 1620, and a cover guide 1640 disposed between the door cover housing 1220 and the door cover 1210, in which the plurality of planetary gears 1630 are disposed, engaged with the plurality of planetary gears 1630, rotated clockwise or counterclockwise when the planetary gears 1630 rotate, to move the door cover 1210 forward or rearward through the interference with the door cover 1210.

The sun gear 1620 may be a pinion gear and include teeth on an outer surface thereof along a circumferential direction thereof.

The planetary gear 1630 may be a pinion gear and include teeth on an outer surface thereof along a circumferential direction. In one embodiment, three planetary gears 1630 are disposed. The three planetary gears 1630 are engaged with the outer surface of the sun gear 1620 and are rotated simultaneously when the sun gear 1620 is rotated.

The plurality of planetary gears 1630 and the sun gear 1620 are inserted into the moving module installation portion 1224 of the door cover housing 1220. The moving module installation portion 1224 includes a sun gear installation portion 1225 in which the sun gear 1620 is disposed and planetary gear installation portions 1226 in which the planetary gears 1630 are disposed.

A rotary shaft of the sun gear 1620 may be inserted into the sun gear installation portion 1225 and the sun gear 1620 may rotate when the sun gear 1620 is assembled to the sun gear installation portion 1225.

The door cover motor 1610 may be disposed in front of the sun gear 1620. The door cover motor 1610 may be disposed inside the moving module installation portion 1224.

The door cover motor shaft 1611 of the door cover motor 1610 faces the rear side from the front side and is coupled to the sun gear 1620 disposed at the rear of the door cover motor 1610.

A motor housing 1660 is further disposed to couple the door cover motor 1610 to the door cover housing 1220. When the door cover motor 1610 is disposed on the rear surface of the door cover housing 1220, the door cover motor 1610 may be directly coupled to the door cover housing 1220.

As the structure increases the thickness in the forward and rearward direction of the door cover assembly 1200, in one embodiment, the door cover motor 1610 is disposed inside the door cover housing 1220 and the motor housing 1660 is disposed to couple the door cover motor 1610.

The motor housing 1660 may be assembled to the door cover housing 1220. In one embodiment, the motor housing 1660 is inserted into the moving module installation portion 1224 when the motor housing 1660 is assembled to the door cover motor 1610. In this embodiment, the structure, the thickness in the forward and rearward direction of the door cover assembly 1200 may be minimized.

The motor housing 1660 may be disposed inside the cover guide 1640 and the cover guide 1640 may surround the outer portion of the motor housing 1660.

When viewed from the front, the motor housing 1660 is disposed between the door cover motor 1610 and the cover guide 1640. When viewed in the forward and rearward direction, the motor housing 1660 is disposed between the door cover housing 1220 and the door cover 1210.

When the door cover motor 1610 and the motor housing 1660 are assembled, the door cover motor 1610 penetrates the motor housing 1660 to minimize the length in the forward and rearward direction thereof.

To this end, the motor housing 1660 defines a motor penetrating portion 1662 through which the door cover motor 1610 passes. The motor penetrating portion 1662 is disposed in the forward and rearward direction. The motor penetrating portion 1662 is disposed at a rear side of the core opening 1211 of the inner door cover 1214. When the door cover motor 1610 is assembled to the motor housing 1660, the door cover motor 1610 is inserted into the corner opening 1211 through the motor penetrating portion 1662.

The door cover motor 1610 is inserted into the structure of the door cover 1210 moving in the forward and rearward direction in addition to the motor housing 1660 to which the door cove motor 1610 is assembled to minimize the thickness in the forward and rearward direction of the door assembly 200.

When viewed in the forward and rearward direction, the cover guide 1640 is disposed between the door cover housing 1220 and the door cover 1210. When viewed from the front, the cover guide 1640 has a ring shape and defines an opening opened in the forward and rearward direction.

The cover guide 1640 may receive a rotational force from the planetary gear 1630 and may rotate based on the rotational force. The cover guide 1640 may be rotated clockwise or counterclockwise when viewed from the front.

The cover guide 1640 and the door cover 1210 are assembled to be movable relative to each other and the cover guide 1640 moves the door cover 1210 forward or rearward through interference when the cover guide 1640 rotates.

The cover guide 1640 includes a cover guide body 1640 having a ring shape, a guide gear 1642 disposed along the inner circumferential surface of the cover guide body 1640 and engaged with the plurality of planetary gears 1630, and a guideway 1650 disposed along the circumferential direction of the cover guide body 1640, movably assembled to the cover interference portion 1230 (e.g., in one embodiment, the mover guider 1234) to move the door cover 1210 forward or rearward through the interference with the mover guide 1230 when the cover guide 1640 is rotated clockwise or counterclockwise.

When the cover guide 1640 is rotated clockwise or counterclockwise by the operation of the planetary gear 1630, the mover guide 1230 of the door cover 1210 interferes with the cover guide 1640. When the mover 1230 interferes with the cover guide 1640, the mover guide 1234 does not rotate, but the cover guide 1640 rotates to move the mover 1230 (e.g., the mover guide 1234) along the guideway 1650.

The guide gear 1642 is a ring gear. The guide gear 1642 is disposed on the inner circumferential surface of the cover guide body 1640.

In one embodiment, the guideway 1650 penetrates the cover guide body 1642. In another embodiment, the guideway 1650 may have a groove shape. In one embodiment, the guideway 1650 penetrates an inner portion and an outer portion of the cover guide 1640 to minimize the thickness of the cover guide 1640. In one embodiment, the mover guide 1234 is inserted into the guideway 1650.

In one embodiment, a penetration direction of the guideway 1650 is parallel to the front surface of the front panel 210. The coupling direction of the guideway 1650 and the mover guide 1234 intersects with the forward and rearward direction.

The guideway 1650 is disposed in the forward and rearward direction. The mover guide 1234 interferes with the guideway 1650 and the mover guide 1234 is moved in the forward and rearward direction through the interference.

The guideway 1650 extends in the circumferential direction of the cover guide body 1642 and forms a gentle curve from the rear side to the front side of the cover guide body 1642. The door cover 1210 may be moved forward or rearward by the length in the forward and rearward direction of the guideway 1650.

The plurality of guideways 1650 are disposed and three guideways are disposed in one embodiment. The three guideways 1650 are preferably disposed at equal distances with respect to a center of the cover guide 1640.

When the cover guide 1640 is rotated clockwise or counterclockwise, the guideway 1650 interferes with the mover guide 1234.

As the guideway 1650 is disposed in the forward and rearward direction along the circumferential direction of the cover guide 1640, when the cover guide 1640 is rotated, the mover guide 1234 does not rotate, but the mover guide 1234 moves forward or rearward along the guideway 1650.

An axis center of the cover guide 1640 is identical to an axis center of the sun gear 1620. The cover guide 1640 is inserted into the moving module installation portion 1224 and is rotated inside the moving module installation portion 1224.

The guide gear 1642 may be disposed along the inner circumferential surface of the cover guide body 1642 and has a circular shape. The guide gear 1642 includes teeth to face the axis center of the cover guide 1640.

The door cover motor 1610, the plurality of planetary gears 1630, and the sun gear 1620 are disposed inside the cover guide 1640 to minimize the thickness in the forward and rearward direction of the door cover moving module 1600 through the structure.

<<Configuration of Door Housing Moving Module>>

The door housing moving module 1700 vertically moves a door cover assembly 1200 and sets a front discharge outlet 201 defined in the front panel 210 to be a second front opening state.

In one embodiment, the door housing moving modules 1700 are disposed on the left side and the right side of the door cover housing 1220. In another embodiment, only one door housing moving module 1700 may be disposed.

In one embodiment, as the door housing moving module 1700 also functions to fix a vertical position of the door cover assembly 1200, two door housing moving modules 1700 are disposed to distribute supporting load of the door cover assembly 1200.

The door housing moving module 1700 may vertically move the door cover assembly 1200 along the front panel 210. In particular, the door housing moving module 1700 may vertically move the entire door cover housing 1220 to which the door cover 1210 is coupled.

The door cover assembly 1200 is moved along the side surface having the inner distance (I) of the front panel 210. As the door housing moving module 1700 may be disposed inside the front panel 210, an installation space of the door housing moving module 1700 is preferably disposed within the inner distance (I).

In one embodiment, the door housing moving module 1700 provides a structure to be disposed within the thickness of the front panel 210. In one embodiment, the thickness in the forward and rearward direction of the door housing moving module 1700 is less than or equal to the thickness of the front panel 210.

The door cover housing 1220 may be moved below the front discharge outlet 201 by the door housing moving module 1700. Therefore, the front discharge outlet 201 may implement the second front opening.

The door cover 1210 disposed on a movement path of the long-distance fan assembly 400 facing the front discharge outlet 201 may be moved below the front discharge outlet 201 based on the operation of the door housing moving module 1700.

When the door cover 1210 is moved vertically downward, any portion of the door cover 1210 does not overlap with the front discharge outlet 201. The door housing moving module 1700 moves the door cover housing 1220 out of the movement path of the long-distance fan assembly 400.

In the second front opening, the discharge grill 450 may be exposed through the front discharge outlet 201.

The door housing moving module 1700 includes a left door housing moving module disposed on the left side of the door cover housing and a right door housing moving module disposed on the right side of the door cover housing.

The left door housing moving module and the right door housing moving module have the same configuration and may be symmetrical to each other.

The door housing moving module 1700 includes a rack 1710 disposed in the front panel 210 or the panel module 1100 and longitudinally extends vertically, a gear assembly 1730 disposed in the door cover assembly 1700, engaged with the rack 1710, and moving along the rack 1710 during rotation, a gear drive motor 1720 disposed in the door cover assembly 1200 and to provide a driving power to the gear assembly 1730, and a vertical moving rail 1790 disposed in the door cover assembly 1200 and the rack 1710 and to guide movement of the door cover assembly 1200.

The door housing moving module 1700 may further include a gear housing 1780 in which the gear assembly 1730 and a gear drive motor 1720 are disposed. When the gear housing 1780 is not disposed, the gear assembly 1730 and the gear drive motor 1720 are each directly disposed in the door cover housing 1220.

In one embodiment, to facilitate assembly and repair, after assembling each of the gear assembly 1730 and the gear drive motor 1720 to the gear housing 1780, the gear housing 1780 is assembled to the door cover housing 1220.

The rack 1710 extends in the vertical direction of the front panel 210. The rack 1710 is disposed in a space having the inner distance (I) of the front panel 210.

The rack 1710 may be disposed in at least one of the front panel 210 or the panel module 1100. In one embodiment, as the front panel 210 is made of metal, when the rack 1710 is directly disposed, a hole penetrating the front panel 210 made of metal needs to be provided. In this case, cold air may leak through the hole or external foreign matters may flow into the front panel 210.

In one embodiment, the rack 1710 is disposed in the panel module 1100 rather than the front panel 210 to prevent the above configuration. In one embodiment, the rack 1710 is assembled to the upper panel module 1110. The rack 1710 is disposed at a portion inserted into the inner distance (I) of the upper panel module 1110.

The rack 1710 faces the front panel sides 214 and 216.

In one embodiment, two racks 1710 are disposed, and a first rack 1710 is disposed within the inner distance (I) on the left side of the front panel 210 and a second rack 1710 is disposed within the inner distance (I) on the right side of the front panel 210. When a plurality of racks 1710 need to be distinguished, a rack disposed on the left side thereof is referred to as "a left rack" and a rack disposed on the right side thereof is referred to as "a right rack" when viewed from the front of the front panel 210. The left rack and the right rack may be bilaterally symmetrical with each other, and in one embodiment, an example right rack is described.

<Rack Configuration and Rack Installation Structure>

The rack 1710 includes a rack body 1712 longitudinally extending vertically and a rack teeth 1711 disposed in the rack body 1712, disposed within an inner distance (I) at a first side of the front panel 210 (e.g., in one embodiment, a second front panel side), facing a second side of the front panel (e.g., in one embodiment, a first front panel side), and provided in plurality and disposed in a longitudinal direction of the rack body 1712.

The rack teeth 1711 protrudes from the rack body 1712 toward the opposite front panel side. The rack teeth 1711 may be separately manufactured and assembled to the rack body 1712. In one embodiment, the rack teeth 1711 and the rack body 1712 are integrated with each other.

The rack teeth 1711 includes horizontal teeth. A plurality of rack teeth 1711 are vertically disposed. The gear assembly is engaged with the rack teeth 1711 and may be vertically moved along the rack teeth 1711.

The rack 1710 includes a rack contact portion 1713 disposed in the rack body 1712 to contact the front panel end 217, a rack engaging portion 1714 disposed in the rack body 1712, assembled to the upper panel module 1110, and engaged with the upper panel module 1110, and a rail installation portion 1719 disposed in the rack body 1712 and in which a vertical moving rail 1790 is disposed.

In one embodiment, the rack teeth 1711, the rack body 1712, the rack contact portion 1713, the rack engaging portion 1714, and the rail installation portion 1719 may be integrated with one another through injection molding. In another embodiment, some of the rack teeth 1711, the rack body 1712, the rack contact portion 1713, the rack engaging portion 1714, or the rail installation portion 1719 are separately manufactured and then assembled.

The rack contact portion 1713 may be disposed in the space having the inner distance (I) of the front panel 210 and may contact the inner surface of the front panel end 217. A fastening member fastens through each of the front panel end 217 and the rack contact portion 1713 to couple the rack 1710.

The rack contact portion 1713 intersects with the rack body 1712 and is orthogonal to the rack body 1712 in one embodiment. The rack contact portion 1713 faces the front surface of the front panel 210 and the rack body 1712 is disposed in a forward and rearward direction.

The rail installation portion 1719 is disposed in the rack body 1712 and has a concave groove shape. The rail installation portion 1719 is concave toward the front panel side 216 from the rack body 1712. The rail installation portion 1719 is opened toward the opposite front panel side 215.

The rail installation portion 1719 extends along the longitudinal direction of the rack 1710. In one embodiment, the rail installation portion 1719 is vertically disposed.

The vertical moving rail 1790 is inserted into the rail installation portion 1719. The vertical moving rail 1790 may be disposed within a horizontal width of the rack contact portion 1713.

The vertical moving rail 1790 is disposed in the concave rail installation portion 1719 to minimize the installation space of the rack 1710 and the vertical moving rail 1790.

As the rail installation portion 1719 is concave from the rack body 1712 toward the second front panel side 216, the vertical moving rail 1790 may be disposed within the inner distance (I).

In one embodiment, the rail mounting portion 1719 has a "⊐" shape and is opened toward the opposite front panel side. The vertical moving rail 1790 may be inserted into the opening.

The rail installation portion 1719 includes a first rail installation wall 1719a connected to the rack body 1712, a second rail installation wall 1719b intersecting with the first rail installation wall 1719a, disposed in a forward and rearward direction, to couple the vertical moving module 1790, and a third rail installation wall 1719c intersecting with the second rail installation wall 1719b and to face the first rail installation wall 1719a.

The rail installation portion 1719 defines a rail installation space 1719d surrounded by the first rail installation wall 1719a, the second rail installation wall 1719b, and the third rail installation wall 1719c. The rail installation space 1719d is opened toward the opposite front panel side.

The first rail installation wall 1719a is horizontally disposed and faces the rack contact portion 1713. The second rail installation wall 1719b is disposed in the forward and rearward direction and faces the front panel sides 216 and 217. In one embodiment, the first rail installation wall 1719a and the second rail installation wall 1719b are orthogonal to each other.

A rack space 1710a may be provided between the rack contact portion 1713, the first rail installation wall 1719a, and the second rail installation wall 1719b. As the rack 1710 integrates the rack contact portion 1713, the first rail installation wall 1719a, the second rail installation wall 1719b, the third rail installation wall 1719c, and the rack engaging portion 1714 through injection molding, the components may preferably have similar thickness.

The rack space 1710a is opened toward the front panel sides 216 and 217. An opening direction of the rack space 1710a is opposite to an opening direction of the rail installation space 1719d. The opening direction of the rail installation space 1719d is the same as the protruding direction of the rack teeth 1711.

The rack space 1710a is opened toward the disposed front panel side 216 and the rail installation space 1719d is opened toward the opposite front panel side 217, which is not disposed.

The rack engaging portion 1714 protrudes from the rail installation portion 1719 toward the upper panel module 1110. The rack engaging portion 1714 may be inserted into the rear surface of the upper panel module 1110 and suppresses the horizontal movement of the rack 1710.

The rack engaging portion 1714 includes a first rack engaging portion 1714a protruding forward from the third rail mounting wall 1719c and a second rack engaging portion 1714b protruding in the horizontal direction from the first rack engaging portion 1714b.

The first rack engaging portion 1714a and the second rack engaging portion 1714b are crossed, and in one embodiment, the first rack engaging portion 1714a and the second rack engaging portion 1714b are bent and have a "⌈" shape. The second rack engaging portion 1714b may be assembled to the upper panel module 1110 by the stationary fitting.

The upper panel module 1110 provides a structure capable of accommodating the rack 1710.

The upper panel module 1110 includes an upper panel body 1130 disposed on the rear surface of the front panel 210 and a panel discharge outlet 1101 penetrating the upper panel body 1130 in the forward and rearward direction, disposed at a rear side of the front discharge outlet 201, and communicating with the front discharge outlet 201.

The upper panel body 1130 includes an upper panel front 1132 disposed on the rear surface of the front panel 210 to define the panel discharge outlet 1101 and an upper panel side 1134 connecting to the upper panel front 1132 and disposed at an inner side of the front panel 210.

The upper panel front 1132 is disposed between the door cover housing 1220 and the front panel 210.

The upper panel side 1134 is disposed between the rack 1170 and the side surface of the front panel 210 (e.g., in one embodiment, the front panel side). The upper panel side 1134 supports the rack 1170 and may be assembled to the rack 1170.

The upper panel side 1134 may be disposed on at least one of the first front panel side 214 or the second front panel side 216 of the front panel 210.

The upper panel front 1132 and the upper panel side 1134 may be separately manufactured and assembled to each other. In one embodiment, the upper panel front 1132 and the upper panel side 1134 are integrated with each other through injection molding.

The upper panel body 1130 includes a panel front supporter 1135 disposed in the upper panel front 1132, contacting the rear surface of the front panel body 212, to support the rear surface of the front panel body 212, a panel front coupler 1136 disposed on the upper panel front 1132 and coupled to a gasket 205 disposed in the panel discharge outlet 1101, and a panel front insert 1137 disposed on the upper panel front 1132 and assembled to the rack 1710 to be engaged with the rack 1710.

The upper panel body 1130 includes a first panel side supporter 1138 disposed in the upper panel side 1134, contacting the front panel sides 214 and 216 of the front panel 210 to support the front panel side of the front panel 210 and a second panel side supporter 1139 disposed in the upper panel side 1134 and to support the front panel ends 215 and 217 of the front panel 210.

The upper panel body 1130 has a flat plate shape and may be curved in the forward and rearward direction.

The panel front coupler 1136 defines an edge of the panel discharge outlet 1101. The panel front coupler 1136 protrudes from the upper panel body 1130 and may protrude toward the panel discharge outlet 1101 in one embodiment.

The panel front supporter 1135 protrudes forward from the upper panel body 1130 and contacts the rear surface of the front panel 210.

The panel front insert 1137 protrudes forward from the upper panel body 1130 and may contact the rear surface of the front panel 210.

The panel front insert 1137 protrudes forward from the upper panel body 1130 to provide a space into which the rack engaging portion 1714 is inserted, at a rear side thereof.

The upper panel body 1130 supports at least two places in the horizontal direction of the front panel 210. In one embodiment, the upper panel body 1130 also provides a function for supporting the front panel 210 by the panel front insert 1137.

The panel front supporter 1135 is disposed closer to the panel discharge outlet 1101 than the panel front insert 1137. The panel front insert 1137 may be disposed within the inner distance (I) of the front panel 210.

The panel front supporter 1135 and the panel front insert 1137 each protrude forward from the upper panel front 1132 and a space is provided among the panel front supporter 1135, the panel front insert 1137, and the upper panel front 1132. The space is provided between the upper panel front 1132 and the rear surface of the front panel 210.

The upper panel side 1134 may face the inner surface of each of the front panel sides 214 and 126.

The first panel side supporter 1138 protrudes from the upper panel side 1134 toward the front panel side and supports an inner surface of the front panel side.

The second panel side supporter 1139 protrudes from the upper panel side 1134 toward the front panel end and supports an inner surface of the front panel end.

In one embodiment, the upper panel body 1130 supports the front panel 210 by using the panel front supporter 1135, the panel front insert 1137, the first panel side supporter 1138, and the second panel side supporter 1139 and minimizes a contact area between the upper panel body 1130 and the front panel 210.

<Configuration of Vertical Moving Rail>

The vertical moving rail 1790 may be disposed in a rail installation space 1719d surrounded by a first rail installation wall 1719a, a second rail installation wall 1719b, and a third rail installation wall 1719c.

The vertical moving rail 1790 guides vertical movement of the door cover assembly 1200. In particular, the vertical moving rail 1790 is assembled to a door cover housing 1220 and guides the vertical movement of the door cover housing 1220.

The vertical moving rail 1790 may be disposed between a rack 1710 and the door cover housing 1220. More specifically, the vertical moving rail 1790 is disposed between the rail installation portion 1719 and the door cover housing 1220.

The vertical moving rails 1790 are disposed on the left side and the right side of the door cover assembly 1200. The vertical moving rail 1790 may be disposed outside the side surface of the door cover housing 1220. The vertical moving rail 1790 may be disposed on the side surfaces of the door cover assembly 1200 to minimize the thickness in the forward and rearward direction of the door assembly 200.

The vertical moving rail 1790 includes a first rail 1792 disposed in a rack 1710 and a second rail 1794 disposed in the door cover housing 1220.

The first rail 1792 is disposed in the rail installation portion 1719 and is accommodated in the rail installation space 1719d. As the first rail 1792 is accommodated in the rail installation space 1719d, the first rail 1792 does not protrude out of the rack 1710.

The second rail 1794 is assembled to the first rail 1792 and vertically moved along the first rail 1792. A plurality of bearings are disposed between the first rail 1792 and the second rail 1794 and the bearings reduce friction between the first rail 1792 and the second rail 1794.

A portion of the second rail 1794 may be inserted into the rail installation space 1719d to be assembled to the first rail 1792.

In one embodiment, the second rail 1794 does not protrude out of the rack teeth 1711 in the horizontal direction and is covered by the rack teeth 1711 when viewed from the rear.

The second rail 1794 is assembled to a side surface of the door cover housing 1220. The first rail 1792 and the second rail 1794 are relatively movable in the vertical direction.

When the door cover assembly 1200 is moved vertically, the first rail 1792 and the second rail 1794 each guide the vertical movement of the door cover assembly 1200 and reduce friction.

<Configuration of Gear Assembly and Gear Drive Motor>

A height of the door cover assembly 1200 is adjusted by the engagement of the gear assembly 1730 with a rack 1710.

A vertical height of the door cover assembly 1200 is maintained by the engagement of the gear assembly 1730 with the rack 1710.

In one embodiment, an additional component to maintain the height of the door cover assembly 1200 is not included.

The gear assembly 1730 transmits a driving force of the gear drive motor 1720 to the rack 1710 and supports load of the door cover assembly 1200. In one embodiment, the gear assembly 1720 provides a structure to effectively support the load of the door cover assembly 1200.

The gear assembly 1730 includes a first gear 1740 disposed in the door cover assembly 1200, including a first teeth 1741 on an outer circumferential surface thereof, engaged with the rack 1710 through the first teeth 1701, and vertically movable when the first gear 1740 is engaged with the rack 1710, a second gear 1750 disposed in the door cover assembly 1200, including a 2-1 teeth 1751 and a 2-2 teeth 1752 having different radii of curvature, and engaged with the first tooth 1741 of the first gear 1740 through the 2-1 teeth 1175, a third gear 1760 disposed in the door cover assembly 1220, including a 3-1 teeth 1761 and a 3-2 teeth 1762 that are different from each other, and engaged with the 2-2 teeth 1752 of the second gear 1750 through the 3-1 teeth 1761, and a worm gear 1770 disposed in the door cover assembly 1200, engaged with the 3-2 teeth 1762, connected to the gear drive motor 1720 and rotated, and vertically disposed.

A motor shaft 1721 of the gear drive motor 1720 is vertically disposed.

In one embodiment, the motor shaft 1721 of the gear drive motor 1720 penetrates the worm gear 1770. An axis center of the worm gear 1770 is disposed on the same line as the motor shaft 1721.

The first gear 1740 is engaged with each of the rack 1710 and the second gear 1750.

The second gear 1750 is engaged with each of the first gear 1740 and the third gear 1760.

The third gear 1760 is engaged with each of the second gear 1750 and the worm gear 1770.

The first gear 1740, the second gear 1750, and the third gear 1760 each include a pinion gear teeth. The rotary axis of each of the first gear 1740, the second gear 1750, and the third gear 1760 is disposed in the forward and rearward direction.

The first teeth 1741 have a circular shape when viewed from the front or the rear.

A position at which the first teeth 1741 and the rack teeth 1711 are engaged with each other is different from a position at which the first teeth 1741 and the 2-1 teeth 1751 are engaged with each other.

The first teeth 1741, the rack teeth 1711 of the rack 1710, and the 2-1 teeth 1751 have the same size and shape.

The first teeth 1741, the rack teeth 1711 of the rack 1710, and the 2-1 teeth 1751 include the same pinion gear teeth.

The second gear 1750 and the third gear 1760 each include a rotational axis in the forward and rearward direction and include the pinion gear teeth.

The second gear 1750 and the third gear 1760 each include two different teeth, while the first gear 1740 includes one teeth.

Specifically, the second gear 1750 includes a 2-1 teeth 1751 and a 2-2 teeth 1752 and the 2-1 teeth 1751 and the 2-2 teeth 1752 are each disposed in a rotational axis direction (e.g., in one embodiment, the forward and rearward direction) of the second gear 1750. The 2-1 teeth 1751 and the 2-2 teeth 1752 are each disposed in the forward and rearward direction.

In the second gear 1750, the 2-1 teeth 1751 and the 2-2 teeth 1752 include different teeth. The 2-1 teeth 1751 and the 2-2 teeth 1752 each include the pinion gear teeth.

When viewed from the front, the 2-1 teeth 1751 and the 2-2 teeth 1752 each have a circular shape having different diameters.

One of the 2-1 teeth 1751 and the 2-2 teeth 1752 may be disposed at a front side thereof and the other one thereof may be disposed at a rear side thereof. In one embodiment, the 2-1 teeth 1751 is disposed on the rear side thereof than the 2-2 teeth 1752. The 2-1 teeth 1751 is flush with the first teeth 1741 and the 3-2 teeth 1762.

In addition, as the second gear 1750 maintains an engaged state with the first gear 1740 and the third gear 1760, the teeth same as the second gear 1750 are also disposed in the first gear 1740 and the third gear 1760. The 2-2 teeth 1352, the first teeth 1341, and the 3-1 teeth 1361 have the same standard.

In one embodiment, in the second gear 1750, the 2-2 teeth 1752 has a greater diameter than that of the 2-1 teeth 1751. The 2-1 teeth 1751 has the different diameter from that of the 2-2 teeth 1752 to provide an engagement structure to simultaneously engage with the first gear 1740 and the third gear 1760.

When the first gear 1740 and the second gear 1750 are engaged, the first gear 1740 is disposed at the rear side thereof than the 2-2 teeth 1752 because the 2-1 teeth 1751 is disposed at the rear side thereof than the 2-2 teeth 1572.

In another embodiment, the arrangement in the forward and rearward direction of the 2-1 teeth 1751 and the 2-2 teeth 1752 may be reversed.

In the second gear 1750, the 2-1 teeth 1751 and the 2-2 teeth 1752 have different teeth. The 2-1 teeth 1751 and the 2-2 teeth 1752 are pinion gear teeth.

The third gear 1760 includes the 3-1 teeth 1761 and the 3-2 teeth 1762. At least one of the 3-1 teeth 1761 or the 3-2 teeth 1762 is engaged with the worm gear 1770.

In one embodiment, the 3-1 teeth 1761 and the 3-2 teeth 1762 have different diameters. The 3-2 teeth 1762 engaged with the worm gear 1770 may have the diameter greater than that of the 3-1 teeth 1761.

As the 3-2 teeth 1762 is engaged with the worm gear teeth 1771, when the 3-2 teeth 1762 has the diameter less than that of the 3-1 teeth 1761, the worm gear teeth 1771 may interfere with the 3-1 teeth 1761. The 3-2 teeth 1762 is engaged with the worm gear teeth 1771 in a worm gear manner and operation noise may be minimized through the worm gear engagement.

In one embodiment, the 3-2 teeth 1762 has the diameter greater than that of the 3-1 teeth 1761.

The 3-2 teeth 1762 is disposed at a rear side thereof than the 3-1 teeth 1761 to minimize interference with the worm gear 1770.

The rotary shaft of the third gear 1760 is disposed in the forward and rearward direction.

The 3-1 teeth 1761 and the 3-2 teeth 1762 are each disposed in the forward and rearward direction. The 3-1 teeth 1761 is disposed at the front side thereof than the 3-2 teeth 1762.

The 3-1 teeth 1761 is flush with the 2-2 teeth 1752 and the 3-2 teeth 1762 is flush with the 2-1 teeth 1751.

In one embodiment, as the 3-2 teeth 1762 is engaged with the worm gear 1770, the 3-2 teeth 1762 is a worm gear teeth.

As the 3-1 teeth 1761 is engaged with the 2-2 teeth 1752, the 3-1 teeth 1761 is a pinion gear teeth.

The worm gear 1770 has a cylindrical shape and includes a vertical rotational axis. The worm gear 1770 includes a worm gear teeth 1771 on an outer circumferential surface thereof and has a vertical spiral shape.

As the rotary shaft of the worm gear 1770 is vertically disposed, the worm gear teeth 1771 may support a vertical external force.

The worm gear 1770 may rotate based on applied vertical external force when the rotary shaft of the worm gear 1770 is inclined or horizontally disposed.

In one embodiment, the rotary shaft of the worm gear 1770 is vertically disposed to support the vertical external force applied to the third gear 1760. The door cover assembly 1200 may be prevented from being moved downward by its own weight through the arrangement of the worm gear 1770 without an additional stopper.

In one embodiment, the weight of the door cover assembly 1200 may be supported through the engagement between the rack 1710 and the first gear 1740 and the engagement between the worm gear 1770 and the third gear 1760.

The worm gear 1770 is directly connected to the motor shaft 1721 of the gear drive motor 1720. The motor shaft 1721 of the gear drive motor 1720 vertically penetrates the rotation center of the worm gear 1770.

In one embodiment, the gear drive motor 1720 uses a step motor to suppress the rotation of the worm gear 1770 based on the external force applied to the third gear 1760.

The first gear 1740, the second gear 1750, the third gear 1760, the worm gear 1770, and the gear drive motor 1720 may be assembled to the gear housing 1780.

The gear housing 1780 provides the rotary shafts of the first gear 1740, the second gear 1750, and the third gear 1760. The first gear 1740, the second gear 1750, and the third gear 1760 are assembled to bosses 1742 defined in the gear housing 1780.

In one embodiment, the gear housing 1780 includes a first gear housing 1781 and a second gear housing 1782.

The first gear 1740, the second gear 1750, the third gear 1760, the worm gear 1770, and the gear drive motor 1720 are each disposed between the first gear housing 1781 and the second gear housing 1782.

Each of the bosses 1742 protrudes from at least one of the first gear housing 1781 or the second gear housing 1782 to provide the rotary shaft of each of the first gear 1740, the second gear 1750, and the third gear 1760. The boss 1742 protrudes rearward from the first gear housing 1781.

In one embodiment, the first gear housing 1781 is disposed at the front side thereof than the second gear housing 1782. The first gear housing 1781 is assembled to the rear surface of the door cover housing 1220.

Among the gears of the gear assembly 1730, only the first gear 1740 protrudes outward the gear housing 1780. The first gear 1740 penetrates a side surface of the gear housing 1780 and defines a protrusion protruding outward. A portion of the side surface of the gear housing 1780 is opened to protrude the first gear 1740 outward.

The first teeth 1741 of the first gear 1740 protruding outward from the gear housing 1780 is engaged with the rack teeth 1711 of the rack 1710. As the first teeth 1741 and the rack teeth 1711 are each disposed in the forward and rearward direction, the first teeth 1741 and the rack teeth 1711 maintain the vertically engaged state.

The vertical moving rail 1790 is disposed in front of the first teeth 1741 and the rack teeth 1711. The vertical moving rail 1790 is disposed on a plane on which the second gear 1750 is disposed in the forward and rearward direction.

<Configuration of Cable Guide>

As the door housing moving module 1700 is moved vertically, a cable connected to the door housing moving module 1700 is also moved vertically.

As the door assembly 200 has a thickness in the forward and rearward direction which is less than a width, cable twist may occur when the door housing moving module 1700 is moved vertically.

In addition, the cable is sandwiched between the vertically moving door housing moving module 1700 and the panel module 1100 to limit operation of the door housing moving module 1700. A cable guide 1800 may minimize the above problem.

An upper end of the cable guide 1800 is assembled to the door cover assembly 1200 and a lower end thereof is assembled to the panel module 1100.

The cable guide 1800 includes a first cable guide 1810 assembled to be rotatable relative to the door cover assembly 1200, a second cable guide 1820 assembled to be rotatable relative to the panel module 1100, and a connecting cable guide 1830 assembled to be rotatable relative to the first cable guide 1810 and the second cable guide 1820.

The first cable guide 1810 includes a cable guide body 1815, a cable insertion space 1813 provided inside the cable guide body 1815 and into which the cable is inserted, a 1-1 rotator 1811 disposed at a first side of the cable guide body 1815 and assembled to be rotatable relative to the door cover assembly 1200 (e.g., in one embodiment, the door cover housing), and a 1-2 rotator 1812 disposed at a second side of the cable guide body 1815 and assembled to be rotatable relative to the connecting cable guide 1830.

The cable guide body 1815 has a length greater than the width. A cross-section orthogonal to the longitudinal direction of the cable guide body 1815 has a "U" shape and the first cable guide 1810 provides the cable insertion space 1813. The cable insertion space 1813 of the first cable guide 1810 is opened upward.

The 1-1 rotator 1811 protrudes upward from the upper end of the cable guide body 1815. The 1-1 rotator 1811 may be coupled to the door cover housing 1220 by a hinge and may rotate relative to the door cover housing 1220.

When the door cover housing 1220 is moved upward or downward, the first cable guide 1810 is pivoted relative to the 1-1 rotator 1811.

The 1-2 rotator 1812 has the same structure as the 1-1 rotator 1811. The 1-2 rotator 1812 protrudes downward from the lower end of the cable guide body 1815. The 1-2 rotator 1812 may be coupled to the upper portion of the connecting cable guide 1830 by the hinge and may be rotated relative to the connecting cable guide 1830.

The second cable guide 1820 includes a cable guide body 1825, a cable insertion space 1823 provided in the cable guide body 1825 and into which a cable is inserted, a 2-1 rotator 1821 disposed at a first side of the cable guide body 1825 and assembled to be rotatable relative to the connecting cable guide 1830, and a 2-2 rotator 1822 disposed at a second side of the cable guide body 1825 and assembled to be rotatable relative to the panel module 1100 (e.g., in one embodiment, the upper panel module).

As the second cable guide 1820 is similar to the first cable guide 1810 in configuration, details thereof are not repeated but are shown in the drawings.

The connecting cable guide 1830 includes a cable guide body 1835, a cable insertion space 1833 disposed in the cable guide body 1835 and into which a cable is inserted, a 3-1 rotator 1831 disposed at a first side of the cable guide body 1835 and assembled to be rotatable relative to the first cable guide 1810, and a 2-2 rotator 1832 disposed at a second side of the second cable guide body 1835 and assembled to be rotatable relative to the second cable guide 1820.

As the connecting cable guide 1830 is similar in configuration to the first cable guide 1810, details thereof are not repeated but are shown in the drawings. A first pin 1841 assembles the 1-1 rotator 1811 to the door cover housing 1220 to be rotatable relative to each other. A second pin 1842 assembles the 1-2 rotator 1812 and the 2-1 rotators 1821 to be rotatable relative to each other. A third pin 1843 assembles the 2-2 rotator 1822 to the 3-1 rotator 1831 to be rotatable relative to each other. A fourth pin 1844 assembles the 3-2 rotator 1832 to the upper panel module 1110 to be rotatable relative to each other.

The first cable guide 1810 and the connecting cable guide 1830 form an angle within 180 degrees, and when the door cover assembly 1200 is moved down, the angle of the first cable guide 1810 and the connecting cable guide 1830 becomes less.

The second cable guide 1820 and the connecting cable guide 1830 form an angle within 180 degrees, and when the door cover assembly 1200 is moved down, the angle of the second cable guide 1820 and the connecting cable guide 1830 becomes less.

As the 2-2 rotator 1822 is disposed in the upper panel module 1110, the 2-2 rotator 1822 is not moved and a position thereof is fixed.

When the door cover assembly 1200 is moved down, the 1-1 rotator 1811, the 1-2 rotator 1812, the 3-1 rotator 1831, the 3-2 rotator 1832, and the 2-1 rotator 1821 may each be moved vertically.

The cable is connected to the door cover motor 1610 of the door cover assembly 1200 and the gear drive motor 1720 of the door housing moving module 1700. The cable may provide power and a control signal to the door cover motor 1610 or the gear drive motor 1720, respectively.

<<Configuration of Door Slide Module>>

The door slide module 1300 moves a door assembly 200 in a horizontal direction of a cabinet assembly 100. The door slide module 1300 may reciprocate the door assembly 200 in the horizontal direction.

The door slide module 1300 is disposed in one of the door assembly 200 or the cabinet assembly 100 and implements slide movement through interference with the other one thereof.

The door slide module 1300 includes a rack 1310 disposed in the door assembly 200 and extending in the horizontal direction, a gear assembly 1330 disposed in a structure of the cabinet assembly 100, engaged with the rack 1310, and moving along the rack 1310 when rotating, a gear drive motor 1320 disposed in a structure of the cabinet assembly 100 to provide a driving force to the gear assembly 1330, and a gear housing 1380 disposed in a structure of the cabinet assembly 100 and in which the gear assembly 1330 and the gear drive motor 1320 are disposed.

The structures of the cabinet assembly 100 may be coupled to the cabinet assembly 100. In one embodiment, a fixed plate 190 is disposed at a front side the cabinet assembly 100. The fixed plate 190 has a vertical length greater than a width thereof.

The rack 1310 is horizontally disposed. In one embodiment, the rack 1310 is horizontally disposed.

The rack 1310 includes a rack body 1312 extending horizontally and rack teeth 1311 disposed on the rack body 1312, vertically disposed on the rack body 1312, and provided in plurality along a longitudinal direction of the rack body 1312.

The rack teeth 1311 may face upward or downward. In one embodiment, the rack teeth 1311 protrude downward from the rack body 1312.

The rack teeth 1311 may be separately manufactured and assembled to the rack body 1312. In one embodiment, the rack teeth 1311 and the rack body 1312 are integrated with each other.

The rack teeth 1311 include teeth disposed in the forward and rearward direction. The plurality of rack teeth 1311 are horizontally disposed. The gear assembly may be engaged with the rack teeth 1311 and may be horizontally moved along the rack teeth 1311.

The gear assembly 1330 includes a first gear 1340 disposed in the gear housing 1380, including a first teeth 1341 on an outer circumferential surface thereof, engaged with the rack 1310 through the first teeth 1341, and horizontally movable when the first gear 1340 is engaged with the rack 1310, a second gear 1350 disposed in the gear housing 1380, including a 2-1 teeth 1351 and a 2-2 teeth 1352 having different radii of curvature, and engaged with the first teeth 1341 of the first gear 1340 through the 2-1 teeth 1351, a third gear 1360 disposed in the gear housing 1380, including a 3-1 teeth 1361 and a 3-2 teeth 1362 including different teeth, and engaged with the 2-2 teeth 1352 of the second gear 1350 through the 3-1 teeth 1361, and a worm gear 1370 disposed in the gear housing 1380, engaged with the 3-2 teeth 1362, and connected to a gear drive motor 1320 to rotate.

The first gear 1340, the second gear 1350, and the third gear 1360 each include a pinion gear teeth.

The first gear 1340, the second gear 1350, and the third gear 1360 are each disposed vertically with respect to the forward and rearward direction. For example, the first gear 1340, the second gear 1350, and the third gear 1360 are each disposed parallel to the front body 212 of the front panel 210.

A rotary shaft of each of the first gear 1340, the second gear 1350, and the third gear 1360 is disposed in the forward and rearward direction.

In one embodiment, the motor shaft 1321 of the gear drive motor 1320 penetrates the worm gear 1370. An axis center of the worm gear 1370 is disposed on the same line as the motor shaft 1321.

In one embodiment, the motor shaft 1321 is disposed diagonally when viewed from the front or the rear. A direction of the motor shaft 1321 intersects with an arrangement direction of the rack 1310, and in one embodiment, an angle between the direction of the motor shaft 1321 and the arrangement direction of the rack 1310 is greater than 0 degrees and less than 90 degrees.

The first gear 1340 may be disposed in the gear housing 1380 and a portion thereof protrudes out of the gear housing 1380. The portion thereof protruding out of the gear housing 1380 and the rack 1310 are engaged with each other.

The first gear 1340 may be engaged with each of the rack 1310 and the second gear 1350.

The second gear 1350 may be engaged with each of the first gear 1340 and the third gear 1360.

The third gear 1360 may be engaged with each of the second gear 1350 and the worm gear 1370.

The first gear 1340 is a pinion gear and includes the rotary shaft extending in the forward and rearward direction.

The first teeth 1341 has a circular shape when viewed from the front or the rear.

A position at which the first teeth 1341 and the rack teeth 1311 are engaged with each other is different from a position at which the first teeth 1341 and the 2-1 teeth 1351 are engaged with each other. The first teeth 1341, the rack teeth 1311 of the rack 1310, and the 2-1 teeth 1351 have the same size and shape.

The first teeth 1341, the rack teeth 1311 of the rack 1310, and the 2-1 teeth 1351 include the same pinion gear teeth.

The second gear 1350 and the third gear 1360 each include a rotational axis in the forward and rearward direction and include the pinion gear teeth.

The second gear 1350 and the third gear 1360 each include two different teeth, while the first gear 1340 includes one tooth.

For example, the second gear 1350 includes a 2-1 teeth 1351 and a 2-2 teeth 1352 and the 2-1 teeth 1351 and the 2-2 teeth 1352 are each disposed in a rotational axis direction (e.g., in one embodiment, the forward and rearward direction) of the second gear 1350.

For example, the 2-1 teeth 1351 and the 2-2 teeth 1352 are each disposed in the forward and rearward direction.

The 2-1 teeth 1351 and the 2-2 teeth 1352 each include the pinion gear teeth and the 2-1 teeth 1351 and the 2-2 teeth 1352 include different teeth.

When viewed from the front, the 2-1 teeth 1351 and the 2-2 teeth 1352 each have a circular shape with different diameters.

A first one of the 2-1 teeth 1351 and the 2-2 teeth 1352 may be disposed at a front side thereof and a second one thereof may be disposed at a rear side thereof. In one embodiment, the 2-1 teeth 1351 is disposed in front of the 2-2 teeth 1352.

The 2-1 teeth 1351 is flush with each of the first teeth 1341 and the 3-2 teeth 1362.

In addition, as the second gear 1350 maintains an engaged state with the first gear 1340 and the third gear 1360, the teeth same as the second gear 1350 is also disposed in the first gear 1340 and the third gear 1360. The 2-2 teeth 1352, the first teeth 1341, and the 3-1 teeth 1361 have the same standard due to the above structure.

In one embodiment, in the second gear 1350, the 2-2 teeth 1352 has a greater diameter than that of the 2-1 teeth 1351. The 2-1 teeth 1351 has the different diameter from that of the 2-2 teeth 1352 to provide an engagement structure to simultaneously engage it with the first gear 1340 and the third gear 1360.

When the first gear 1340 and the second gear 1350 are engaged with each other, the first gear 1340 is disposed in front of the 2-2 teeth 1352 because the 2-1 teeth 1351 is disposed in front of the 2-2 teeth 1352.

In another embodiment, the arrangement in the forward and rearward direction of the 2-1 teeth 1351 and the 2-2 teeth 1352 may be reversed.

In the second gear 1350, the 2-1 teeth 1351 and the 2-2 teeth 1352 have different teeth. The 2-1 teeth 1351 and the 2-2 teeth 1352 are pinion gear teeth.

The third gear 1360 includes the 3-1 teeth 1361 and the 3-2 teeth 1362. At least one of the 3-1 teeth 1361 or the 3-2 teeth 1362 is engaged with the worm gear 1370.

In one embodiment, the 3-1 teeth 1361 and the 3-2 teeth 1362 have different diameters. For example, the 3-2 teeth 1362 engaged with the worm gear 1370 may have the diameter greater than that of the 3-1 teeth 1361.

As the 3-2 teeth 1362 is engaged with the worm gear teeth 1371, when the 3-2 teeth 1362 has the diameter less than that of the 3-1 teeth 1361, interference may occur.

The rotary shaft of the third gear 1360 is disposed in the forward and rearward direction.

The 3-1 teeth 1361 and the 3-2 teeth 1362 are each disposed in the forward and rearward direction. The 3-1 teeth 1361 is disposed behind the 3-2 teeth 1362.

The 3-1 teeth 1361 is flush with the 2-2 teeth 1352 and the 3-2 teeth 1362 is flush with the 2-1 teeth 1351.

In one embodiment, the 3-2 teeth 1362 is engaged with the worm gear 1370 and the 3-2 teeth 1362 includes the pinion gear teeth.

As the 3-1 teeth 1361 is engaged with the 2-2 teeth 1352, the 3-1 teeth 1361 is a pinion gear teeth.

The worm gear 1370 has a cylindrical shape and includes a horizontally-inclined rotational axis. The worm gear 1370 includes a worm gear teeth 1371 on an outer circumferential surface thereof and has a spiral shape.

The rotary shaft of the worm gear 1370 is disposed in an inclined direction and is disposed below the third gear 1360.

The worm gear 1370 is directly connected to the motor shaft 1321 of the gear drive motor 1320. The motor shaft 1321 of the gear drive motor 1320 penetrates the rotation center of the worm gear 1370.

In one embodiment, the gear drive motor 1320 uses a step motor.

The first gear 1340, the second gear 1350, the third gear 1360, the worm gear 1370, and the gear drive motor 1320 are each assembled to the gear housing 1380.

The gear housing 1380 provides the rotary shafts of the first gear 1340, the second gear 1350, and the third gear 1360. The first gear 1340, the second gear 1350, and the third gear 1360 are assembled to bosses 1342 defined in the gear housing 1380.

In one embodiment, the gear housing 1380 includes a first gear housing 1381 and a second gear housing 1382.

The first gear 1340, the second gear 1350, the third gear 1360, the worm gear 1370, and the gear drive motor 1320 are each disposed between the first gear housing 1381 and the second gear housing 1382.

The boss 1342 protrudes from at least one of the first gear housing 1381 or the second gear housing 1382 to provide the rotary shaft of each of the first gear 1340, the second gear 1350, and the third gear 1360. The boss 1342 protrudes forward from the first gear housing 1381.

In one embodiment, the first gear housing 1381 is disposed at the rear side thereof than the second gear housing 1382. The first gear housing 1381 is assembled to the front surface of the fixed plate 190.

Among the gears of the gear assembly 1330, only the first gear 1340 protrudes outward from the gear housing 1380. The first gear 1340 penetrates an upper surface of the gear housing 1380 and defines a protrusion protruding outward. A portion of the upper surface of the gear housing 1380 is opened to protrude the first gear 1340 outward.

The first teeth 1341 of the first gear 1340 protruding outward from the gear housing 1380 is engaged with the rack teeth 1311 of the rack 1310.

As the gear housing 1380 is assembled to the structure of the cabinet assembly 100, when the gear drive motor 1320 is operated, the first gear 1340 is rotated in place and the rack 1310 engaged with the first gear 1340 is horizontally moved.

In one embodiment, the door slide module 1300 is disposed at a middle height of the door assembly 200. This is associated with the center of gravity of the door assembly 200.

In one embodiment, as only one gear drive motor 1320 is disposed to move the door assembly 200, the gear drive motor 1320 is preferably disposed at a position close to the center of gravity of the door assembly 200.

When the door slide module 1300 is disposed at an upper portion or a lower portion of the door assembly 200, only a portion where the rack is disposed may be moved and the other side thereof may not be moved, which is a problem that occurs because the door assembly 200 of the present disclosure has a much larger height than the width thereof.

When the rack is disposed at the lower portion of the door assembly 200 including a front panel 210 made of metal, only the lower portion thereof is moved based on the driving force of the gear drive motor and the upper portion thereof may not be moved by the self-weight of the door assembly 200 or may be moved late.

In some cases where the delay occurs when the door assembly 200 is moved as described above, operation noise may be generated when the door assembly 200 is moved, and a phenomenon may occur in which the door assembly 200 is temporarily stopped and moved.

In the present disclosure, as the rack 1310 is disposed in the middle portion of the vertical height of the door assembly 200, even if only one gear drive motor 1320 is operated, the entire door assembly including the upper portion and the lower portion of the door assembly 200 may be uniformly moved.

<<Side Moving Assembly>>

In addition, according to one embodiment, an indoor unit may further include a side moving assembly 1400 to guide horizontal sliding of the door assembly 200 and support the load of the door assembly 200.

The side moving assembly 1400 is disposed in the door assembly 200 and the cabinet assembly 100 and guides the horizontal movement of the door assembly 200.

When the door slide module 1300 is operated, the side moving assembly 1400 guides the slide movement of the door assembly 200. The slide movement of the door assembly 200 may be performed only by the operation of each of the rack 1310 and the gear assembly 1330 of the door slide module 1300, but there are limitations in implementing smooth slide movement.

In one embodiment, the side moving assembly 1400 is disposed at an upper side, a middle side, and a lower side of the door assembly 200.

The side moving assembly 1400 includes a top rail 1410 disposed at an upper portion of the door assembly 200, a middle rail 1420 disposed in the middle of the door assembly 200, a bottom rail 1430 disposed at a lower portion of the door assembly 200, a top supporter 1440 assembled to the door assembly 200, disposed at the upper portion of the door assembly 200, and hung at the upper portion of the cabinet assembly 100, and a bottom supporter 1450 assembled to the cabinet assembly 100, disposed at the lower portion of the cabinet assembly 100, and hung at the lower end of the door assembly 200.

The top rail 1410, the middle rail 1420, and the bottom rail 1430 are each horizontally disposed. The top rail 1410, the middle rail 1420, and the bottom rail 1430 are each disposed between the door assembly 200 and the cabinet assembly 100.

The top rail 1410 includes a first top rail 1412 and a second top rail 1414.

The first top rail 1412 may be disposed on the rear surface of the door assembly 200. The first top rail 1412 is horizontally disposed. The first top rail 1412 may be disposed on the rear surface of the upper panel module 1110 of the door assembly 200.

The second top rail 1414 may be assembled on the front surface of the cabinet assembly 100 and may be horizontally moved relative to the first top rail 1412.

In one embodiment, the second top rail 1414 is coupled to the top supporter 1440 and the top supporter 1440 is coupled to the cabinet assembly 100.

The first top rail 1412 and the second top rail 1414 are assembled to be movable relative to each other. A bearing 1415 may be disposed between the first top rail 1412 and the second top rail 1414 and may reduce a frictional force when the first top rail 1412 and the second top rail 1414 are moved relative to each other.

The middle rail 1420 includes a first middle rail 1422 and a second middle rail 1424.

The first middle rail 1422 may be disposed on the rear surface of the door assembly 200. The first middle rail 1422 is horizontally disposed. The first middle rail 1422 may be disposed on a rear surface of the lower panel module 1120 of the door assembly 200.

The second middle rail 1424 may be assembled to the front surface of the cabinet assembly 100 and may be horizontally moved relative to the first middle rail 1422.

The first middle rail 1422 and the second middle rail 1424 are assembled to be movable relative to each other. A bearing (not shown) may be disposed between the first middle rail 1422 and the second middle rail 1424 and may reduce the frictional force when the first middle rail 1422 and the second middle rail 1424 move relative to each other.

The bottom rail 1430 includes a first bottom rail 1432 and a second bottom rail 1434.

The first bottom rail 1432 may be disposed on the rear surface of the door assembly 200. The first bottom rail 1432 is horizontally disposed. The first bottom rail 1432 may be disposed on the rear surface of the lower panel module 1120 of the door assembly 200.

The second bottom rail 1434 may be assembled to a structure (e.g., in one embodiment, the bottom supporter) disposed on the front surface of the cabinet assembly 100 and may be horizontally moved relative to the first bottom rail 1432.

The first bottom rail 1432 and the second bottom rail 1434 are assembled to be movable relative to each other. A bearing (not shown) may be disposed between the first bottom rail 1432 and the second bottom rail 1434 and may reduce the frictional force when the first bottom rail 1432 and the second bottom rail 1434 move relative to each other.

When the door assembly 200 is horizontally moved by the door slide module 1300, the top supporter 1440 and the bottom supporter 1450 are disposed in place while supporting the load of the door assembly 200.

The top supporter 1440 distributes the load of the door assembly 200 to the upper portion of the cabinet. The bottom supporter 1450 supports the lower portion of the door assembly 200 and reduces friction when the door assembly 200 horizontally slides.

The top supporter 1440 includes a top fixer 1442 assembled to the structure of the door assembly 200 (e.g., in one embodiment, the second top rail 1414), a top ray 1444 protruding from the top fixer 1442 toward the cabinet assembly 100 and hung on the cabinet assembly 100, and a top engaging portion 1446 disposed on the top ray 1444 and to provide engagement with the cabinet assembly 100 in a forward and rearward direction.

The top fixer 1442 extends in the horizontal direction of the door assembly 200. The top fixer 1442 may contact and may be assembled to the door assembly 200. In one embodiment, the top fixer 1442 is assembled to the structure of the door assembly 200, and in one embodiment, the top fixer 1442 is coupled to the top rail 1414.

The top fixer 1442 may be disposed at a rear side of the second top rail 1414.

The top ray 1444 and the top fixer 1442 may be integrated with each other. The top fixer 1442 and the top ray 1444 may be manufactured by bending one plate.

The top ray 1444 protrudes rearward from the top fixer 1442.

In one embodiment, the top ray 1444 protrudes rearward from an upper edge of the top fixer 1442.

The top ray 1444 may be coupled to the upper portion of the cabinet assembly 100.

When the door assembly 200 is horizontally moved, the top ray 1444 and the second top rail 1414 are each disposed in place and only the first top rail 1412 and the door assembly 200 are horizontally moved relative to each other.

The top engaging portion 1446 is horizontally disposed and is engaged in the forward and rearward direction of the cabinet assembly 100.

The top engaging portion 1446 protrudes downward from the top ray 1444.

In one embodiment, the top engaging portion 1446 defines a downward-concave groove and extends along a longitudinal direction of the top ray 1444. The top engaging portion 1446 defines an engaging groove 1446a opened upward and the engaging groove 1446a extends in the horizontal direction.

The top ray 1444 includes a first top ray 1444a disposed at a front side of the top engaging portion 1446 and a second top ray 1444b disposed at a rear side of the top engaging portion 1446.

The top engaging portion 1446 is disposed between the first top ray 1444a and the second top ray 1444b.

The top engaging portion 1446 is disposed at the upper portion of the cabinet assembly 100 and a top supporter installation portion (not shown) is engaged with the top engaging portion 1446.

The bottom supporter 1450 is coupled to the structure of the cabinet assembly 100, supports the lower end of the door assembly 200, and minimizes friction when the door assembly 200 moves.

In one embodiment, the bottom supporter 1450 is coupled to the fixed plate 190. The fixed plate 190 may be fixed to the cabinet assembly 100, and in one embodiment, the door slide module 1300 is disposed on the fixed plate 190.

The bottom supporter 1450 includes a bottom supporter body 1450 disposed between the door assembly 200 and the cabinet assembly 100, disposed parallel to the rear surface of the door assembly 200, and assembled to the structure of the cabinet (in one embodiment, a fixed plate 190), a bottom supporter engaging portion 1454 disposed on the bottom supporter body 1460 and engaged with the fixed plate 190, a bottom wheel 1456 disposed on the bottom supporter body 1460, engaged with a lower end of the door assembly 200 to support the door assembly 200, and rotatable relative to the bottom supporter body 1460, and a sensor installation portion 1458 disposed on the bottom supporter body 1460 to install a sensor for detecting a movement position of the door assembly 200.

The bottom supporter body 1460 includes a supporter plate 1470 assembled to the structure of the cabinet (e.g., in one embodiment, the fixed plate 190) and a supporter body 1480 coupled to the supporter plate 1470 to place the bottom wheel 1456.

In one embodiment, the supporter plate 1470 is manufactured by bending a metal plate and the supporter body 1480 is manufactured by injecting synthetic resin.

In another embodiment, the supporter plate 1470 and the supporter body 1480 may be manufactured by injection molding. However, in this case, a decrease in strength may not be avoided. As the bottom supporter 1450 is needed to support the load of the door assembly 200, when the bottom supporter 1450 is entirely made of synthetic resin, damage or warpage may occur due to the decrease in strength.

For example, as the door assembly 200 is not opened based on the rotation, but horizontally slides, the bottom supporter 1450 may support the load of the door assembly 200.

In addition, when the bottom supporter 1450 is entirely made of metal, it is difficult to manufacture the installation structure of the supporter wheel 1456 and the installation structure of the sensor installation portion 1458.

In one embodiment, the bottom supporter body 1460 is disposed at the rear side of the fixed plate 190. The bottom supporter body 1460 may be coupled to the rear surface of the fixed plate 190.

The supporter plate 1470 includes a supporter plate body 1472 to contact the fixed plate 190 which is a cabinet structure, a bottom support engaging portion 1454 disposed on the supporter plate body 1472, bending toward the fixed plate 190, and horizontally engaged with the fixed plate 190, and a supporter body installation portion 1474 to install the supporter body 1480 disposed on the supporter plate body 1472.

The supporter plate 1470 is disposed parallel to the fixed plate 190 and coupled to the fixed plate 190. The supporter plate 1470 includes a plurality of fastening holes 1471 for fastening with the fixed plate 190.

In one embodiment, the bottom supporter engaging portion 1454 is disposed on the supporter plate 1470. The bottom supporter engaging portion 1454 is provided by bending the supporter plate 1470.

In one embodiment, the bottom supporter engaging portion 1454 contacts a left surface and a right surface of the fixed plate 190. The bottom supporter engaging portion 1454 is bent toward the fixed plate 190. The bottom supporter engaging portion 1454 is vertically disposed and is horizontally engaged with the fixed plate 190. In another embodiment, the bottom supporter engaging portion 1454 may be disposed on the supporter body 1480.

The fixed plate 190 includes a fixed plate insert 191 into which the bottom supporter body 1460 is inserted.

The fixed plate insert 191 is bent rearward from the fixed plate 190. The fixed plate insert 191 has a closed upper surface and provides an opening at a lower side and both sides thereof.

A gap 192 is provided between the fixed plate insert 191 and the rear surface of the fixed plate 190.

The bottom supporter body 1460 may be inserted from the bottom of the fixed plate insert 191. In one embodiment, an upper end of the bottom supporter body 1460 is inserted into the gap 192 and the fixed plate insert 191 restricts the upward movement of the bottom supporter body 1460.

When the bottom supporter body 1460 is assembled to the fixed plate 190, the fixed plate insert 191 and the bottom supporter engaging portion 1454 each limit the installation position of the bottom supporter body 1460. When the bottom supporter body 1460 is inserted into the fixed plate insert 191, fastening holes 1471 are provided in the fixed plate 190 and the bottom supporter body 1460 for coupling.

The supporter body installation portion 1474 is provided by bending the supporter plate body 1472. The supporter body 1480 is assembled to the supporter body installation portion 1474.

The supporter body installation portion 1474 is bent rearward from the supporter plate body 1472 to provide the installation space of the supporter body 1480.

The supporter body 1480 is preferably disposed behind the door assembly 200 and the bottom wheel 1456 may be disposed at the lower portion of the door assembly 200.

At least two bottom wheels 1456 are disposed on the supporter body 1480. In this example, the supporter body 1480 extends in the horizontal direction and the bottom wheel 1456 is horizontally disposed.

The supporter body 1480 includes a rail insert 1486 concave rearward and into which a lower rail 206 of the door assembly is inserted and a rotary shaft hole 1481 into which a wheel shaft 1483 of the bottom wheel 1456 is inserted.

The rail insert 1486 is horizontally disposed. The rail insert 1486 may be disposed behind the bottom wheel 1456. When viewed from the front, the upper end of the bottom wheel 1456 overlaps with the rail insert 1486.

An upper end of the bottom wheel 1456 may be disposed lower than an upper end 1486*a* of the rail insert 1486 and higher than a lower end 1486*b* of the rail insert 1486.

The rotary shaft hole 1481 may be disposed lower than the lower end 1486*b* of the rail insert 1486.

The lower rail 206 of the door assembly 206 may be inserted into the rail insert 1486 and may be supported on the upper end of the bottom wheel 1456. Through this structure, the gap between the door assembly 200 and the bottom supporter 1450 may be minimized.

As the distance between the door assembly 200 and the bottom supporter 1450 in the forward and rearward direction increases, the load applied to the bottom supporter 1450 is increased.

According to one embodiment, the distance between the door assembly 200 and the bottom supporter 1450 in the forward and rearward direction may be minimized, and thus, the load applied to the bottom wheel may be minimized and the load applied to the bottom supporter 1450 may also be minimized.

The bottom wheel 1456 has a circular shape when viewed from the front and defines a wheel groove 1456*a* along an outer circumferential surface thereof. The lower rail 206 is mounted on the wheel groove 1456*a*.

The bottom supporter 1450 further includes a rotary shaft 1457 disposed on the bottom wheel 1456 and protruding in the frontward and rearward direction. In one embodiment, the rotary shaft 1457 protrudes rearward from the bottom wheel 1456. The rotary shaft 1457 and the bottom wheel 1456 may be integrated with each other.

The wheel shaft 1483 penetrates the rotary shaft 1457. The bottom wheel 1456 may be rotated when the bottom wheel 1456 is assembled to the wheel shaft 1483. The wheel shaft 1483 passes through the bottom wheel 1456 and the rotary shaft 1457 and passes through a rotary shaft hole 1481 of the supporter body 1480.

The supporter body 1480 includes a shaft fixing member 1485 engaged with the wheel shaft 1483, at a rear side of the supporter body 1480. The supporter body 1480 defines a shaft fixing member groove 1484 concave forward from the rear side.

The wheel shaft 1483 is coupled to the shaft fixing member 1485 through the support body 1480 and the bottom wheel 1456 may be rotated through the wheel shaft 1483.

The sensor installation portion 1458 is disposed on the support body 1480 and penetrates the support body 1480 in one embodiment. A door sensing sensor 207 is disposed in the sensor installation portion 1458.

The door sensing sensor 207 detects a sliding distance of the door assembly 200. The door assembly 200 includes the position sensing factor 208.

The position sensing factor 208 corresponds to the door sensing sensor 207. The position sensing factor 208 may be disposed on the rear surface of the door assembly 200, for example, is disposed on the rear surface of the lower panel module 1120.

In one embodiment, a hall sensor and a permanent magnet are each used to detect the horizontal movement distance of the door assembly 200. In this example, the hall sensor is used as the door sensing sensor 207 and the permanent magnet is used as the position sensing factor 208.

In another embodiment, a photo sensor is used as the door sensing sensor and a rib disposed in the door assembly may be used as the position sensing factor. When the rib blocks an optical signal of a photo sensor, the horizontal movement distance of the door assembly may be determined.

Figure 20:
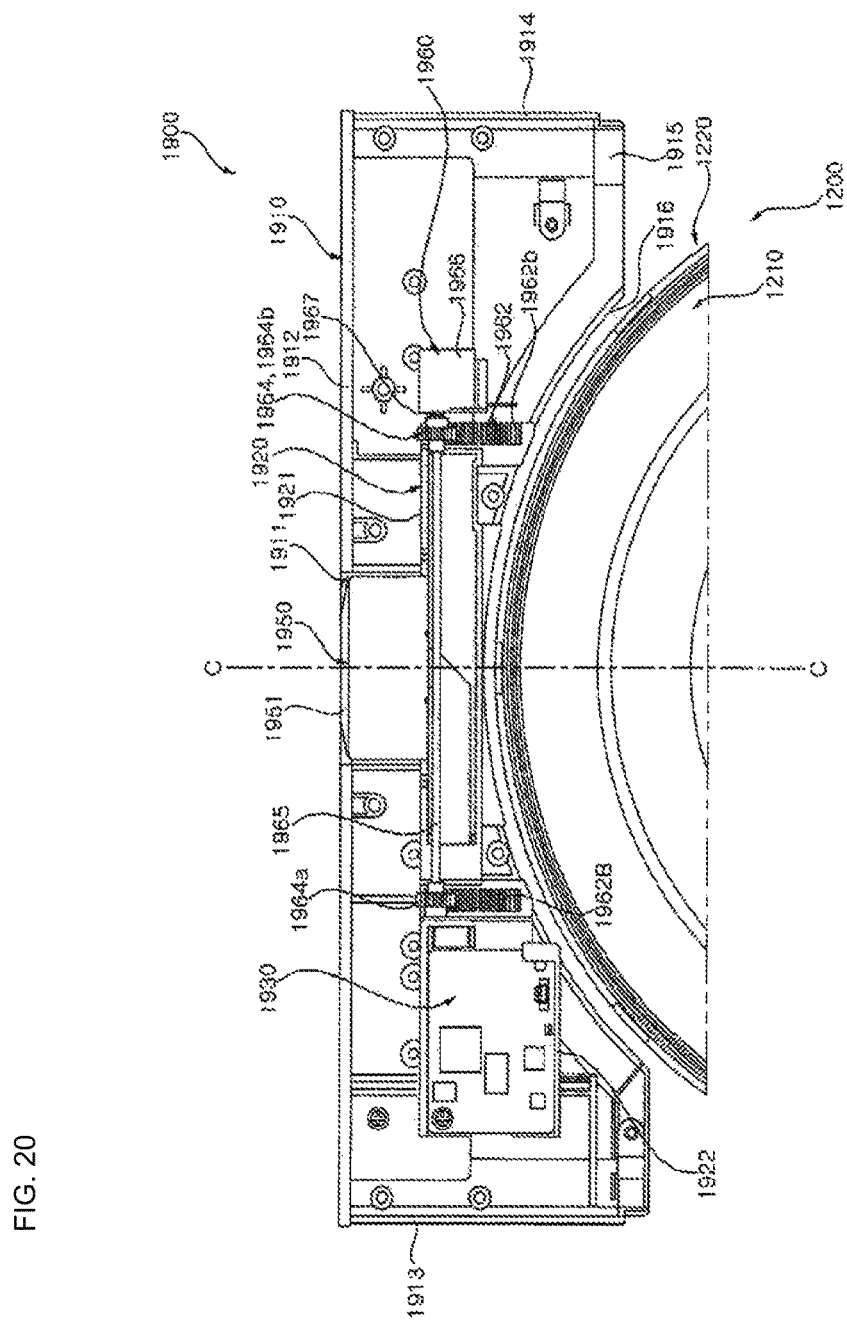
FIG. 20 is a front view showing an installation structure of a camera module in a door assembly according to an embodiment of the present disclosure.
Figure 21:
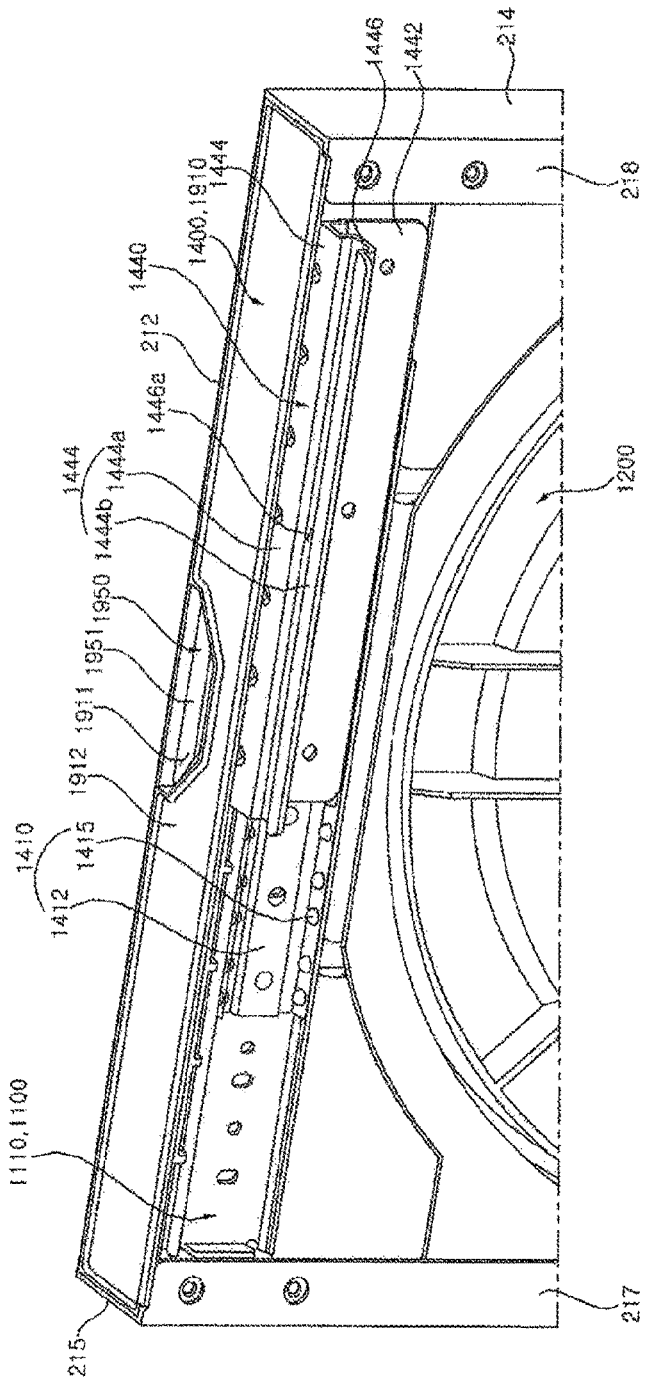
FIG. 21 is a rear perspective view showing an upper portion of the door assembly including the camera module in FIG. 20.

FIG. 20 is a front view showing an installation structure of a camera module inside a door assembly according to an embodiment of the present disclosure. FIG. 21 is a rear perspective view showing the camera module in FIG. 20 at an upper portion of the door assembly.

<<Configuration of Camera Module>>

The camera module 1900 may be disposed in a door assembly 200 (e.g., an upper panel module 1110 in one embodiment) and is selectively operated. The camera module 1900 may be exposed outside the door assembly 200 only during operation and may be concealed inside the door assembly 200 when not in operation.

The camera module 1900 includes a camera module housing 1910 disposed in the door assembly 200, defining a camera opening 1911 opened upward, a camera 1950 disposed in the camera module housing 1910, vertically moved with respect to the camera module housing 1910, to selectively expose through the camera opening 1911, a camera body 1920 disposed in the camera module housing 1910 and to place the camera 1950, a camera controller 1930 disposed on the camera body 1920, electrically connected to the camera 1950, to control the camera 1950, and a camera moving module 1960 disposed in the camera module housing 1910 to vertically move the camera body 1920 to place the camera 1950.

The camera module housing 1910 may be a portion of the upper panel module 1110. In one embodiment, the camera module housing 1910 is manufactured separately from the upper panel module 1110 and is disposed on the upper panel module 1110.

The camera module housing 1910 covers the panel upper opening 203. A top wall 1912 of the camera module housing 1910 is disposed inside the front panel 210 and closes the panel upper opening 203.

The camera opening 1911 is defined on the top wall 1912 of the camera module housing 1910. The camera opening 1911 vertically penetrates the top wall 1912 of the camera module housing 1910.

The camera module housing 1910 includes a housing top wall 1912 defining the camera opening 1911 to form an upper surface of the door assembly 200, a housing left wall 1913 extending downward from the housing top wall 1912 and to contact a left surface of the front panel 210, a housing right wall 1914 extending downward from the housing top wall 1912 and to contact a right surface of the front panel 210, and a housing inner wall 1915 extending downward from the housing top wall 1912 and to connect the housing left wall 1913 to the housing right wall 1914.

The housing left wall 1913 contacts the inner surface of the first front panel side 214 of the front panel 210. The housing right wall 1914 contacts the inner surface of the second front panel side 216 of the front panel 210.

The housing left wall 1913 and the housing right wall 1914 are each disposed in a forward and rearward direction. The housing left wall 1913 and the housing right wall 1914 face each other.

The housing inner wall 1915 is horizontally disposed above the door cover assembly 1200. In one embodiment, the housing inner wall 1915 is disposed above the door cover top wall 1114.

For example, the housing inner wall 1915 is disposed above the door cover top wall 1114 of the upper panel module 1110 and the door cover housing 1220 is disposed below the door cover top wall 1114.

The lower end of the housing inner wall 1915 has a shape corresponding to that of the door cover top wall 1114.

When viewed from the front, as the door cover top wall 1114 has an arc shape with a predetermined radius of curvature, a lower end 1916 of the housing inner wall 1915 also has an arc shape with a predetermined radius of curvature when viewed from the front.

The lower end 1916 of the housing inner wall 1915 has an arc shape concave upward to minimize the installation space of the camera module housing 1910.

The camera body 1920 may be disposed in the camera module housing 1910.

The camera body 1920 may be disposed at a front side or a rear side of the camera module housing 1910. The camera body 1920 may be vertically moved by the camera movement module 1960.

The camera 1950 is disposed on the camera body 1920. In one embodiment, the upper end of the camera 1950 is disposed higher than the upper end of the camera body 1920.

When the camera movement module 1960 is operated, the camera body 1920 is disposed below the top wall 1912 and the camera 1950 is exposed outside the top wall 1912.

The upper end 1921 of the camera body 1920 contacts the lower surface of the top wall 1912 and the top wall 1912 also functions as a stopper to limit the upward movement of the camera body 1920.

The camera body 1920 includes a camera control installation portion 1922 in which the camera controller 1930 is disposed.

A virtual central line (C) connecting a center of the front discharge outlet 201 provided on the front panel 210 and a center of a display opening 202 is vertically disposed.

The camera 1950 of the camera module 1900 is disposed on the central line (C).

The camera control installation portion 1922 is biased to the left or the right with respect to the central line (C).

In addition, the lower end 1926 of the camera body 1920 also has an arc shape with a predetermined radius of curvature when viewed from the front, similar to the lower end 1916 of the housing inner wall 1915.

The lower end 1926 of the camera body 1920 has an arc shape concave upward to prevent interference with the door cover top wall 1114 when moving in the vertical direction.

In one embodiment, the radius of curvature of the lower end 1926 of the camera body 1920 is the same as the radius of curvature of the lower end 1916 of the housing inner wall 1915.

When the camera body 1920 is moved downward, the camera body 1920 is supported by the door cover top wall 1114 and the movement thereof may be restricted. The door cover top wall 1114 functions as a stopper to restrict the movement of the camera body 1920.

The camera 1950 is disposed on the camera body 1920 and protrudes above the camera body 1920. The camera 1950 may be vertically moved based on the operation of the camera movement module 1960 and may be exposed outside the door assembly 200 through the camera opening 1911.

When the camera 1950 is not in use, the camera 1950 moves below the camera opening 1911 and is hidden to users.

The camera opening 1911 and the camera 1950 are each disposed on the central line (C) and may be moved in the direction of the central line (C).

An upper surface 1951 of the camera 1950 may cover the camera opening 1911. When not in operation, the upper surface 1951 of the camera 1950 forms a continuous surface with the upper surface (e.g., the top wall 1912 in one embodiment) of the camera module housing 1910.

The camera movement module 1960 vertically moves the camera body 1920.

The camera movement module 1960 includes a camera moving rack 1962 disposed on the camera body 1920 and extending in the moving direction of the camera 1950, a camera gear 1964 engaged with the camera rack 1962, and a camera moving motor 1966 disposed in the structure coupled to the door assembly 200 to provide a rotational force to the camera moving gear 1964.

The camera moving rack 1962 includes a plurality of teeth and the teeth are vertically disposed. The camera moving rack 1962 extends in the vertical direction.

In one embodiment, the camera gear 1964 is a pinion gear. The camera gear 1964 is coupled to the motor shaft 1967 of the camera moving motor 1966.

When the camera moving motor 1966 is operated, the camera gear 1964 is rotated in place, and the camera moving rack 1962 is vertically moved when the camera moving rack 1962 is engaged with the camera gear 1964.

In one embodiment, the camera moving rack 1962 is disposed on the left side and the right side of the central line (C) to uniformly move the left side and the right side of the camera body 1920 upward.

The camera moving rack 1962 disposed on the left side with respect to the central line (C) is referred to as "a first camera moving rack 1962a" and the camera moving rack 1962 disposed on the right side with respect to the central line (C) is referred to as "a second camera moving rack 1962b". As they have different arrangement positions, but have the same configuration, the same reference numeral is used.

The camera moving gear 1964 disposed on the left side with respect to the central line (C) is referred to as "a first camera moving gear 1964a" and the camera moving gear 1964 disposed on the right side with respect to the central line (C) is referred to as "a second camera moving gear 1964b". As they have different arrangement positions, but have the same configuration, the same reference numeral is used.

A rotary shaft of each of the first camera moving gear 1964a and the second camera moving gear 1964b is disposed in the leftward direction.

In one embodiment, one camera moving motor 1966 is used to rotate each of the first camera moving gear 1964a and the second camera moving gear 1964b. In this example, a moving gear shaft 1965 is coupled to each of the first camera moving gear 1964a and the second camera moving gear 1964b.

The first camera moving gear 1964a is assembled to the left side of the moving gear shaft 1965 and the second camera moving gear 1964b is assembled to the right side thereof.

The moving gear shaft 1965 is horizontally disposed. In one embodiment, the rotary shaft of the moving gear shaft 1965 and the motor shaft 1967 of the camera moving motor 1966 are arranged in a line.

The camera moving motor 1966 may be disposed in the structure coupled to the cabinet assembly 100. In one embodiment, the camera moving motor 1966 may be coupled to the camera module housing 1910. In another embodiment, the camera moving motor 1966 may be coupled to the structure of the upper panel module 1110 or the front panel 210 of the door assembly 200.

In addition, in another embodiment one embodiment, the camera moving motor 1966 and the camera moving rack 1962 may be reversely disposed.

The first camera moving rack 1962a and the second camera moving rack 1962b may be bilaterally symmetrical to each other with respect to the central line (C) to uniformly move up both ends of the camera body 1920 extending in the horizontal direction. In addition, the first camera moving gear 1964a and the second camera moving gear 1964b are also bilaterally symmetrical to each other with respect to the central line (C).

Figure 22:
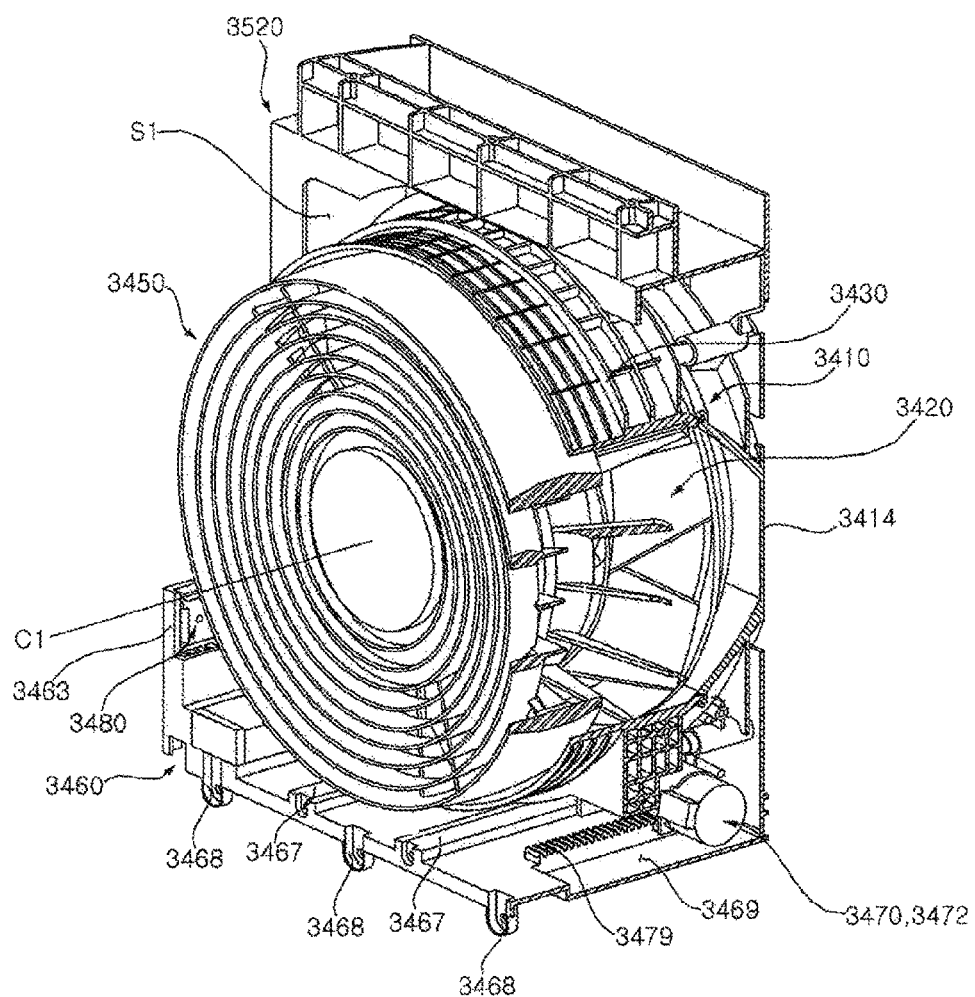
FIG. 22 is a partially cut-away perspective view showing a long-distance fan assembly in FIG. 6.
Figure 23:
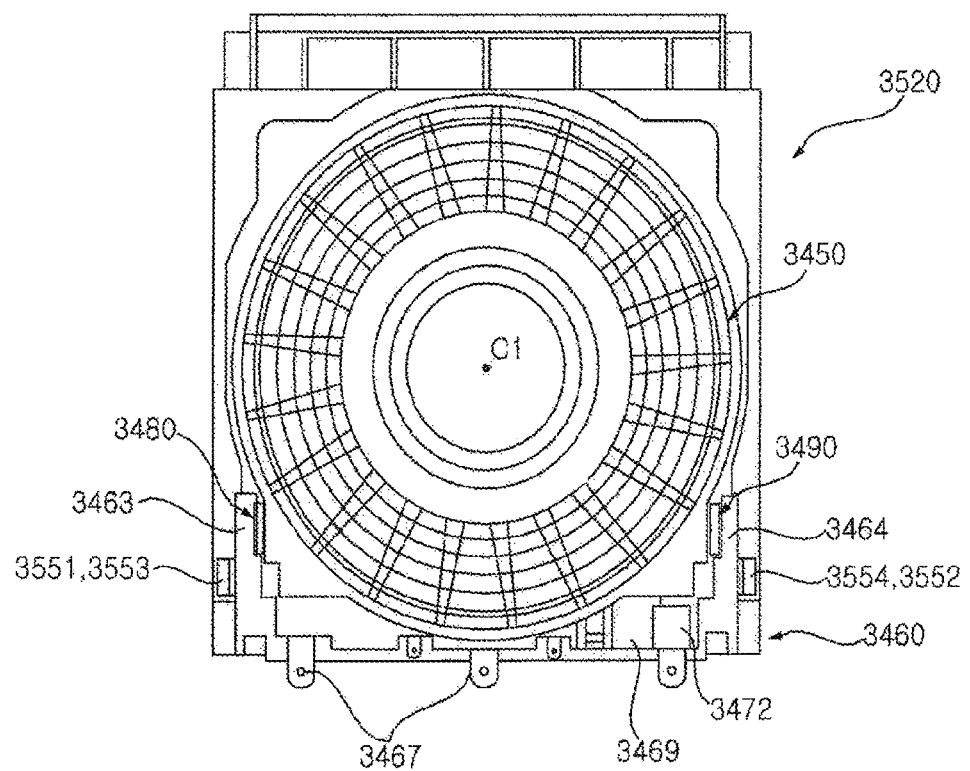
FIG. 23 is a front view showing the long-distance fan assembly in FIG. 22.
Figure 24:
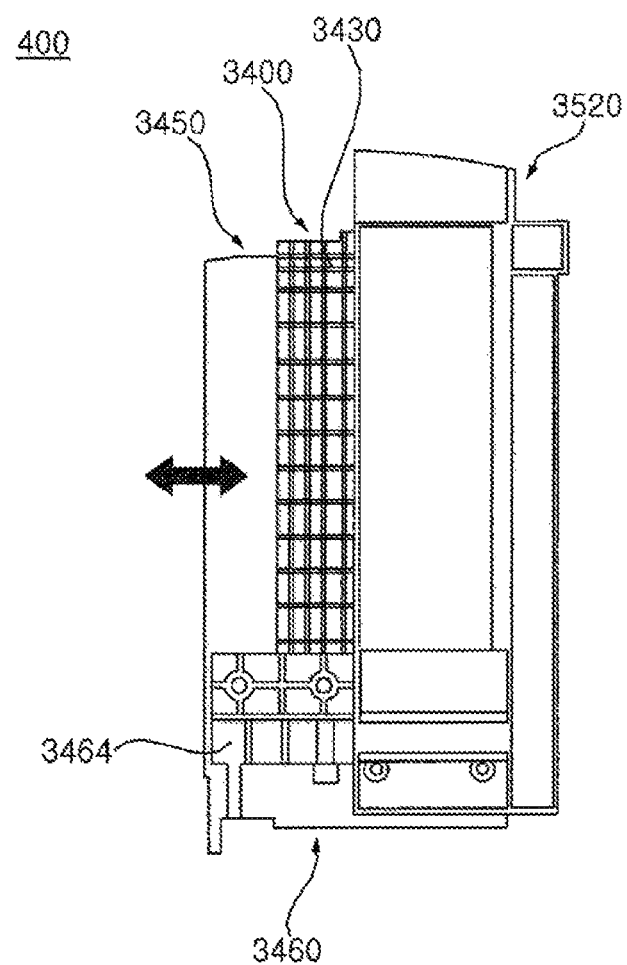
FIG. 24 is a right view showing the long-distance fan assembly in FIG. 22.
Figure 25:
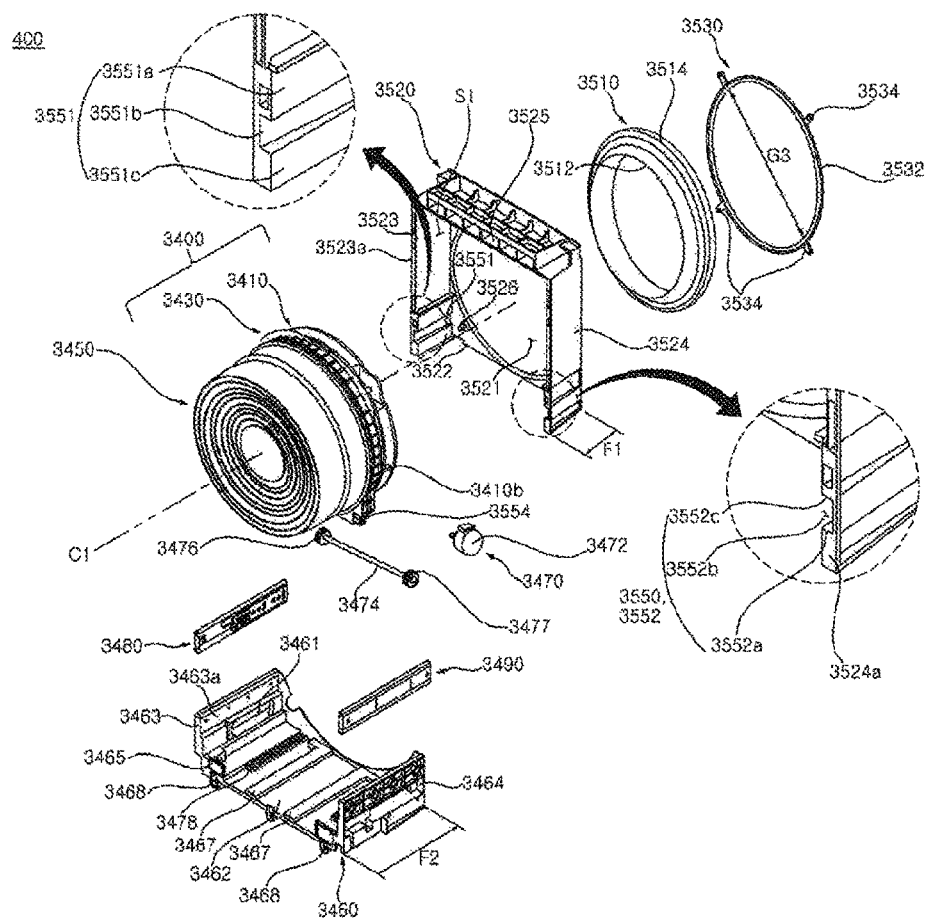
FIG. 25 is an exploded perspective view showing the long-distance fan assembly in FIG. 22.
Figure 26:
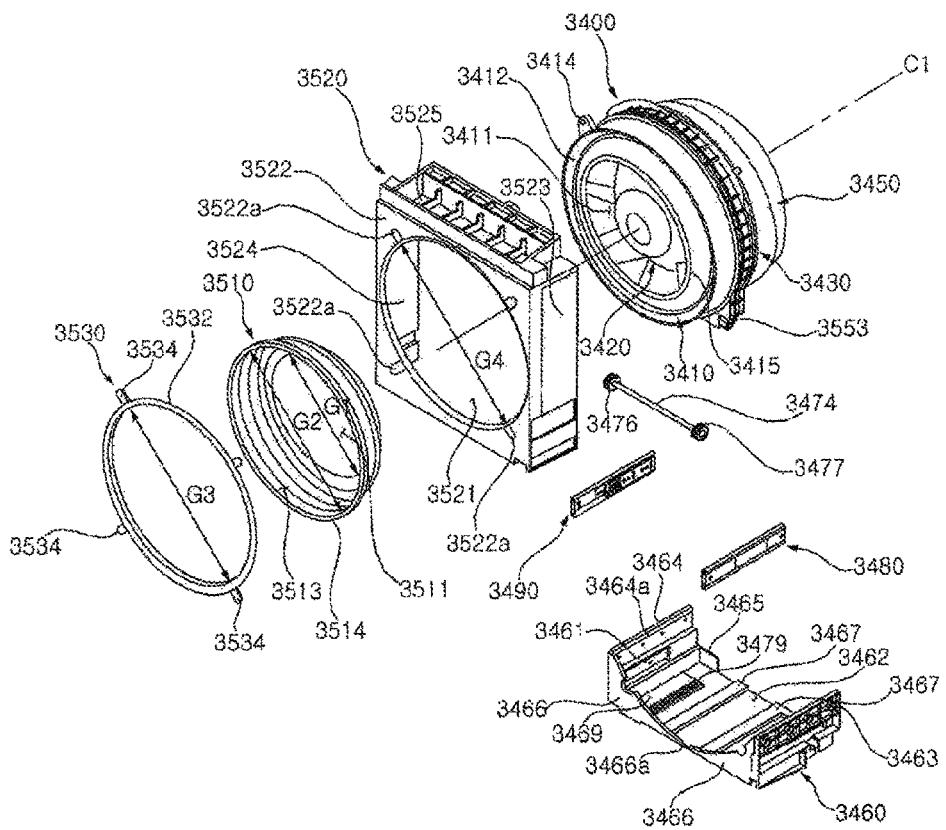
FIG. 26 is an exploded perspective view showing the long-distance fan assembly in FIG. 25 when viewed from the rear.
Figure 27:
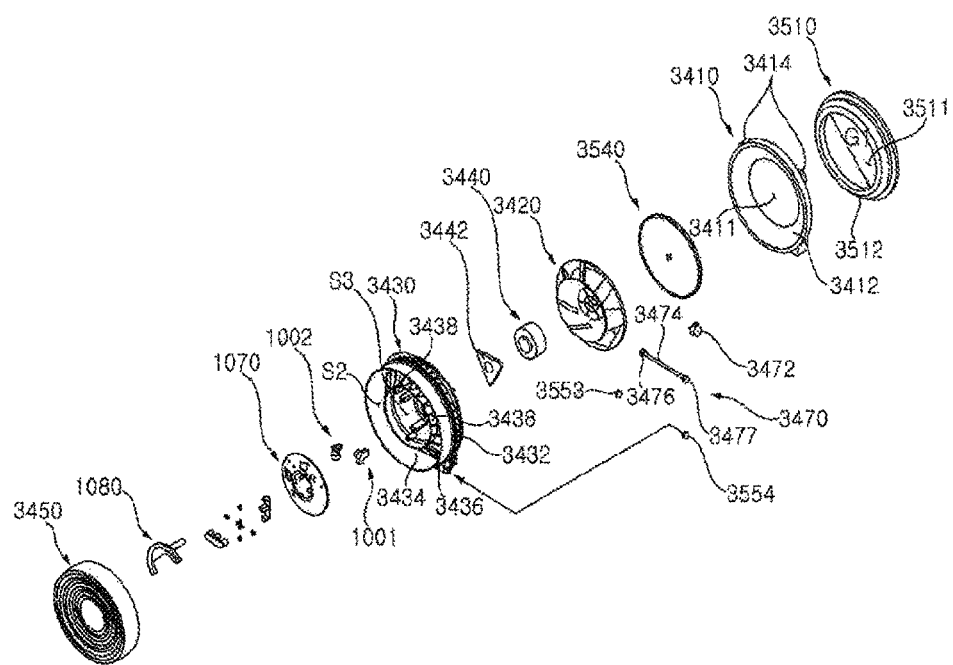
FIG. 27 is an exploded perspective view showing a fan housing assembly in FIG. 25.
Figure 28:
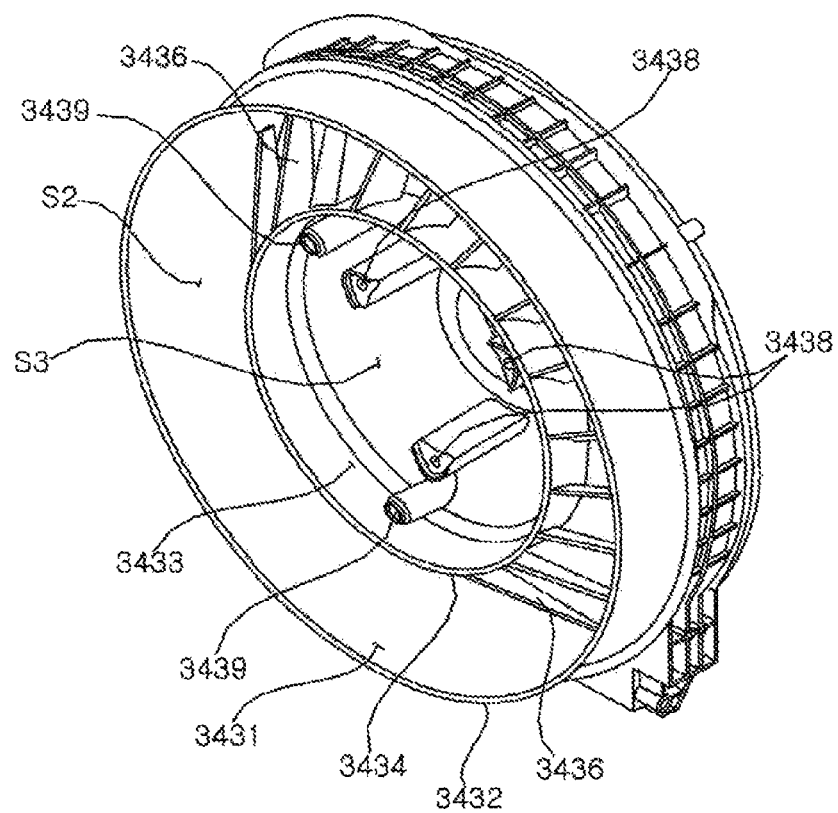
FIG. 28 is a perspective view showing a front fan housing in FIG. 27.
Figure 29:
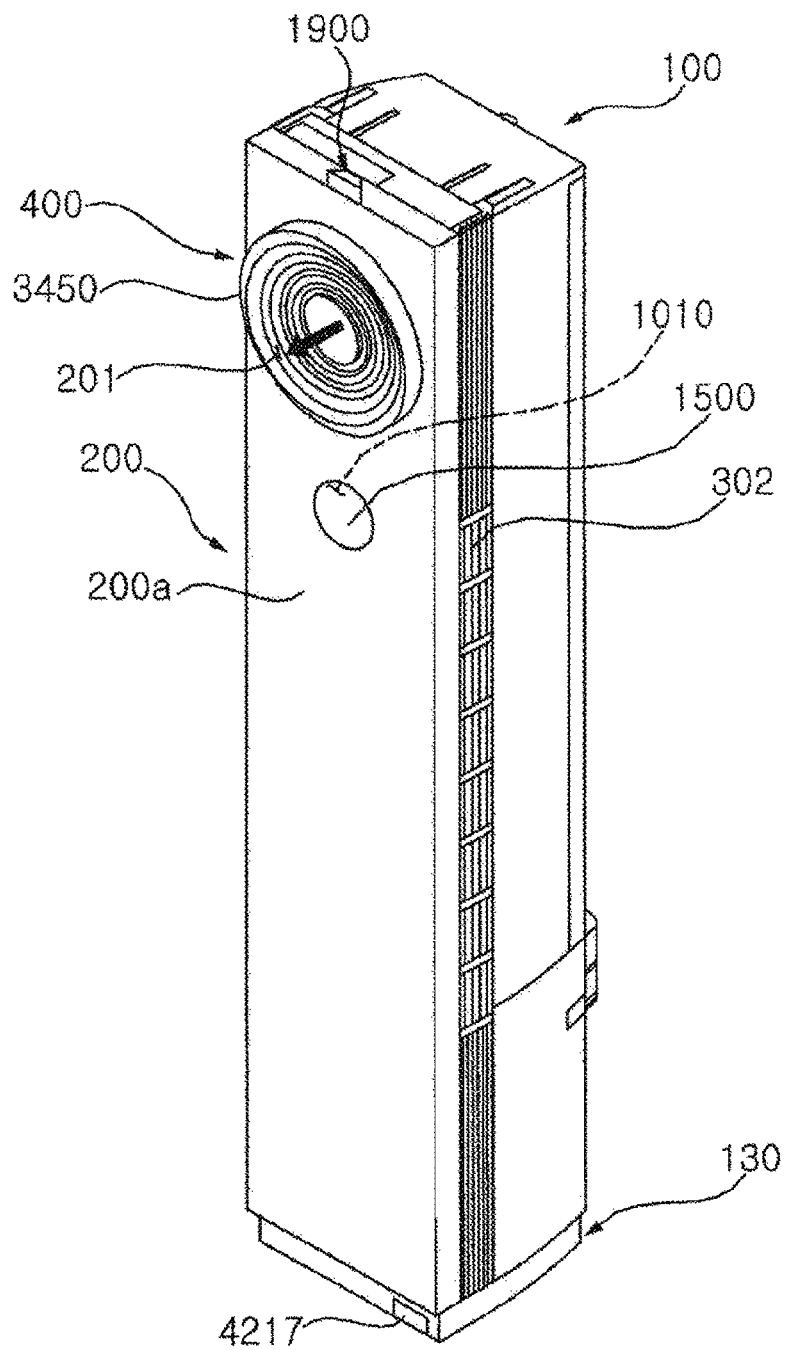
FIG. 29 is a perspective view showing an indoor unit comprising an upper proximity sensor and a lower proximity sensor according to an embodiment of the present disclosure.

FIG. 20 is a partially cut-away perspective view showing a long-distance fan assembly in FIG. 6. FIG. 21 is a front view showing the long-distance fan assembly in FIG. 20. FIG. 22 is a right view showing the long-distance fan assembly in FIG. 20. FIG. 23 is an exploded perspective view showing the long-distance fan assembly in FIG. 20. FIG. 24 is an exploded perspective view showing the long-distance fan assembly in FIG. 23 when viewed from the rear. FIG. 25 is an exploded perspective view showing a fan housing assembly in FIG. 23. FIG. 28 is a perspective view showing a front fan housing in FIG. 25.

<<Configuration of Long-Distance Fan Assembly>>

The long-distance fan assembly 400 is movable relative to the cabinet assembly 100 in a forward and rearward direction. The long-distance fan assembly 400 discharges air to a front of the door assembly 200 and provides direct air to an indoor space.

The long-distance fan assembly 400 passes through a front discharge outlet 201 of the door assembly 200 only during operation and protrudes forward than a front surface 200a of the door assembly 200. Therefore, the long-distance fan assembly 400 is in a projection state.

The long-distance fan assembly 400 is disposed inside the cabinet assembly 100 and is moved in the forward and rearward direction inside the cabinet assembly 100 only during operation.

The long-distance fan assembly 400 may be disposed in front of the heat exchange assembly 500 and is disposed behind the door assembly 200. The long-distance fan assembly 400 may be disposed above the short-distance fan assembly 300 and is disposed below an upper wall of the cabinet assembly 100.

The long-distance fan assembly 400 discharges air through the front discharge outlet 201 defined in the door assembly 200 and the steering grill 3450 of the long-distance fan assembly 400 is disposed in front of the front discharge outlet 201.

The steering grill 3450 is disposed outside the front discharge outlet 201 to minimize air resistance due to structures such as the cabinet assembly 100 or the door assembly 200.

The long-distance fan assembly 400 provides a structure tiltable in an upward direction, a downward direction, a leftward direction, a rightward direction, or a diagonal direction. The long-distance fan assembly 400 may discharge the air to a remote place of the indoor space and may improve indoor air circulation.

The long-distance fan assembly 400 includes a guide housing (e.g., in one embodiment, an upper guide housing and a lower guide housing described below) disposed inside the cabinet assembly, a fan housing assembly 3400 assembled to be movable relative to the guide housing to discharge air in the inner space (S) to the front discharge outlet, and an actuator 3470 disposed in at least one of the cabinet assembly 100 or the guide housing and to move the fan housing assembly along the guide housing.

The guide housing includes an upper guide housing 3520 disposed in front of the heat exchange assembly 500 and defining a guide housing suction inlet 3521 to introduce air passing through the heat exchange assembly 500 and a lower guide housing 3460 assembled to the upper guide housing 3520 and to place the front fan housing 3430, and to guide forward and rearward movement of the front fan housing 3430.

The fan housing assembly 3400 includes a rear fan housing 3410 defining a fan suction inlet 3411 communicating with the guide housing suction inlet 3521 and disposed in the upper guide housing 3520, a fan 3420 disposed in front of the rear fan housing 3410 to discharge air suctioned by the fan suction inlet 3411 in a diagonal direction, a front fan housing 3430 disposed in front of the rear fan housing 3410, coupled to the rear fan housing 3410, disposed in front of the fan 3420, assembled to the fan 3420, to guide air pressurized by the fan 3420 in the diagonal direction, a fan motor 3440 disposed in front of the front fan housing 3430, including a motor shaft 3441 assembled to the fan 3420 through the front fan housing 3430, to rotate the fan 3420, a steering grill 3450 disposed in front of each of the front fan housing 3430 and the fan motor 3440, tiltable in any direction with respect to the front fan housing 3430, to control a discharge direction of air guided by the front fan housing 3430, and steering assemblies 1001 and 1002 disposed between the front fan housing 3430 and the steering grill 3450 to push or pull the steering grill 3450 to tilt the steering grill 3450 with respect to a central axis (C1) of the steering grill 3450.

The actuator 3470 may be disposed in at least one of the front fan housing 3430 or the lower guide housing 3460 and provides a driving force when the front fan housing 3430 moves in the forward and rearward direction.

The long-distance fan assembly 400 further includes an air guide 3510 opened in the forward and rearward direction, connecting the rear fan housing 3410 to the upper guide housing 3520, to guide the air suctioned by the guide housing suction inlet 3521 into the fan suction inlet 3411, made of an elastic material, and to expand or contract when the front fan housing 3430 moves in the forward and rearward direction.

For convenience of description, the assembly moved in the forward and rearward direction by an actuator 3470 of the long-distance fan assembly 400 is referred to as "a fan housing assembly 3400". The fan housing assembly 3400 includes a rear fan housing 3410, a front fan housing 3430, a fan 3420, a steering grill 3450, a fan motor 3440, and steering assemblies 1001 and 1002.

The fan housing assembly 3400 may be moved in the forward and rearward direction by the actuator 3470. A first guide rail 3480 and a second guide rail 3490 may be further disposed between the front fan housing 3430 and the lower guide housing 3460 to easily slide the front fan housing 3430.

The lower guide housing 3460 and the upper guide housing 3520 are coupled structures and may each be coupled to at least one of the cabinet assembly 100 or the short-distance fan assembly 300.

The air that has passed through the heat exchange assembly 500 passes through the guide housing suction inlet 3521, the fan suction inlet 3411, the fan 3420, and the front fan housing 3430, and is discharged from the steering grill 3450.

The upper guide housing 3520 and the lower guide housing 3460 may be integrated with each other. The integrated upper guide housing 3520 and lower guide housing 3460 may be referred to as "a guide housing".

The guide housing defines an opening at a front surface of the fan housing assembly 3400 to move in the forward and rearward direction and defines a guide housing suction inlet 3521 at a rear surface thereof to suction the air.

In one embodiment, the upper guide housing 3520 and the lower guide housing 3460 are respectively fabricated and assembled to move the fan housing assembly 3400 in the forward and rearward direction.

<Configuration of Upper Guide Housing>

The upper guide housing 3520 constitutes an upper portion of a guide housing. The upper guide housing 3520 surrounds a fan housing assembly 3400. The upper guide housing 3520 guides air that has passed through a heat exchange assembly 500 to the fan housing assembly 3400.

The upper guide housing 3520 prevents air passing through the heat exchange assembly 500 from flowing into the steering grill 3450 through other flow paths except for the guide housing suction inlet 3521.

The guide housing suction inlet 3521 provides a unified flow path for guiding the cooled air to the steering grill 3450 to minimize contact of the cooled air with the door assembly 200.

The upper guide housing 3520 preferably has an area capable of covering the front surface of the heat exchange assembly 500. In one embodiment, as the short-distance fan assembly 300 is disposed, the upper guide housing 3520 has a shape and an area to cover the upper remaining area not covered by the short-distance fan assembly 300.

The upper guide housing 3520 may be assembled to the lower guide housing 3460 and may be disposed on the lower guide housing 3460. The upper guide housing 3520 and the lower guide housing 3460 may be integrated with each other through fastening.

The fan housing assembly may be disposed inside each of the upper guide housing 3520 and the lower guide housing 3460 and is movable relative to each of the upper guide housing 3520 and the lower guide housing 3460 in the forward and rearward direction.

The upper guide housing 3520 has a rectangular parallelepiped shape and defines openings at the front surface and the rear surface thereof.

The upper guide housing 3520 includes a rear wall 3522 defining a guide housing suction inlet 3521, a left wall 3523 and a right wall 3524 protruding forward from a side edge of the rear wall 3522, and a top wall 3525 protruding forward from an upper edge of the rear wall 3522.

The guide housing suction inlet 3521 penetrates the rear wall 3522 in the forward and rearward direction. The guide housing suction inlet 3521 has a circular shape when viewed from the front. The guide housing suction inlet 3521 is greater than the fan suction inlet 3411. The fan suction inlet 3411 also has a circular shape when viewed from the front.

The diameter of the guide housing suction inlet 3521 may be greater than the diameter of the fan suction inlet 3411.

The left wall 3523 is disposed on the left when viewed from the front and the right wall 3524 is disposed on the right. The left wall 3523 and the right wall 3524 face each other.

The top wall 3525 connects the rear wall 2522, the left wall 3523, and the light wall 3524. The fan housing assembly is disposed under the top wall 3525.

When not in operation, the fan housing assembly is disposed between the left wall 3523, the right wall 3524, and the top wall 3525. In operation, the fan housing assembly is moved forward.

Even when the fan housing assembly is moved forward with a maximum level, the rear fan housing 3410 is disposed inside the upper guide housing 3520. In one embodiment, when the fan housing assembly is moved forward with a maximum level, a rear end 3410b of the rear fan housing 3410 is disposed at a rear side than each of a front end 3523a of the left wall 3523 and a front end 3524a of the light wall 3524.

When the fan housing assembly moves out of the upper guide housing 3520 during operation to return to an initial position thereof, if an external shock is applied, the fan housing assembly may be engaged with the upper guide housing 3520 and may not be returned to the initial position thereof.

Further, when the fan housing assembly moves out of the upper guide housing 3520, a flow distance of air flowing from the guide housing suction inlet 3521 to the fan suction inlet 3411 may be increased.

A fixer 3526 is disposed in the rear wall 3522 to fix the air guide 3510. The fixer 3526 protrudes forward from the front surface of the rear wall 3522. A plurality of fixers 3526 are disposed and each fixer 3526 is disposed outside the guide housing suction inlet 3521. In one embodiment, the fixers 3526 are disposed in four places.

In one embodiment, a lower surface 3527 of the upper guide housing 3520 is opened. In another embodiment, the lower surface 3527 may be closed.

In one embodiment, as the lower guide housing 3460 is disposed under the upper guide housing 3520 and the lower guide housing 3460 closes the lower surface 3527, the lower surface 3527 may be manufactured to have an open shape.

A horizontal width of the rear wall 3522 may be greater than a horizontal width of the heat exchange assembly 500 and air passing through the heat exchange assembly 500 preferably flows into only the guide housing suction inlet 3521.

When the width of the rear wall 3522 is narrower than the width of the heat exchange assembly 500, the air passing through the heat exchange assembly 500 may flow to the door assembly 200 through the outside portion of the long-distance fan assembly 400. Through this structure, cold air may be used to cool the door assembly 200 when cooling to occur dew formation.

The front surface of the rear wall 3522 preferably faces the front surface of the heat exchange assembly 500 and the rear wall 3522 preferably contacts the front surface of the heat exchange assembly 500. The rear wall 3522 may contact the front surface of the heat exchange assembly 500 to effectively flow the heat-exchanged air to the guide housing suction inlet 3521.

A length in a forward and rearward direction of each of the left wall 3523, the right wall 3524, and the top wall 3525 is referred to as "F1".

At least one of the left wall 3523 or the right wall 3524 defines a guide groove 3550. The guide groove 3550 is disposed in the forward and rearward direction.

The guide groove 3550 supports the fan housing assembly 3400 and guides the forward and rearward movement of the fan housing assembly 3400.

A guide groove 3550 defined in the left wall 3523 is referred to as "a first guide groove 3551" and a guide groove 3550 defined in the right wall 3524 is referred to as "a second guide groove 3552".

The first guide groove 3551 is provided in the storage space (S1) and is concave toward the left wall 3523. The second guide groove 3552 is concave toward the right wall 3524 in the storage space (S1).

The first guide groove 3551 is defined on an inner surface of the left wall 3523, extends in the forward and rearward direction, and opens toward the inner space (S1). The second guide groove 3552 is defined on an inner surface of the right wall 3524, extends in the forward and rearward direction, and opens toward the inner space (S1).

The first guide groove 3551 includes a lower surface 3551a, a side surface 3551b, and an upper surface 3551c and the second guide groove 3522 includes a lower surface 3552a, a side surface 3552b, and an upper surface 3552c.

The lower surface 3551a of the first guide groove 3551 and the lower surface 3552a of the second guide groove 3552 each support the load of the fan housing assembly 3400.

The first guide roller 3553 and the second guide roller 3554 of the fan housing assembly 3400 described below are moved in the forward and rearward direction along the first guide groove 3551 and the second guide groove 3552.

The first guide groove 3551 and the second guide groove 3552 each provide moving spaces of the first guide roller 3553 and the second guide roller 3554 and each support the first guide roller 3553 and the second guide roller 3554.

<Configuration of Lower Guide Housing>

The lower guide housing 3460 constitutes a lower portion of a guide housing. The lower guide housing 3460 movably supports the fan housing assembly 3400 and guides the fan housing assembly 3400 in a forward and rearward direction.

There is no particular restriction on a shape of the lower guide housing 3460 and the lower guide housing 3460 may have a shape capable of supporting the fan housing assembly 3400 and guiding the frontward and rearward movement.

The lower guide housing 3460 may be assembled to the upper guide housing 3520 and provides a storage space (S1) to accommodate the fan housing assembly 3400. In one embodiment, only the rear side of the fan housing assembly 3400 is accommodated and a front side thereof may be exposed outside the storage space S1. In another embodiment, the storage space S1 may accommodate the entire fan housing assembly 3400.

In one embodiment, the lower guide housing 3460 is disposed on the fan casing 320.

The lower guide housing 3460 has a longer length in the forward and rearward direction than that of the upper guide housing 3520 because the lower guide housing 3460 supports the fan housing assembly 3400 and guides the forward and rearward movement of the fan housing assembly 3400. The length in the forward and rearward direction of the lower guide housing 3460 is referred to as "F2". The length (F2) in the forward and rearward direction of the lower guide housing 3460 is longer than the length (F1) in the forward and rearward direction of the upper guide housing 3520.

The lower guide housing 3460 closes the lower surface of the upper guide housing 3520 and movably supports the fan housing assembly 3400. The fan housing assembly 3400 may be moved in the forward and rearward direction by an actuator 3470 when the fan housing assembly 3400 is supported on the lower guide housing 3460.

The lower guide housing 3460 includes a housing base 3462 disposed under the fan housing assembly 3400, a left side wall 3463 and a right side wall 3464 extending upward from both edges of the housing base 3462, a stopper 3465 disposed on at least one of the housing base 3462, the left side wall 3463, or the right side wall 3464 to limit a forward movement of the fan housing assembly 3400, a base guide 3467 disposed on the housing base 3462, interfering with the fan housing assembly 3400 (e.g., in one embodiment, the front fan housing), to guide the forward and rearward direction of the fan housing 3400, and a cable penetration portion 3461 disposed on at least one of the left side wall 3463 or the right side wall 3464, extending in a forward and rearward direction, having a long shape, and through which a cable (not shown) coupled to the actuator 3470 passes.

In one embodiment, the lower guide housing 3460 includes a housing rear wall 3466 connecting the housing base 3462, the left side wall 3463, and the right side wall 3464 and disposed at a rear side of the housing base 3462, the left side wall 3463, and the right side wall 3464. The housing rear wall 3466 functions as a stopper to limit the rearward movement of the fan housing assembly 3400.

The housing rear wall 3466 faces the rear wall 3522 of the upper guide housing 3520 and is disposed in front of the rear wall 3522.

An upper end 3466a of the housing rear wall 3466 has the same line as the guide housing suction inlet 3521. For example, the upper end 3466a of the housing rear wall 3466 has the same radius of curvature as the radius of curvature of the guide housing suction inlet 3521. The upper end 3466a of the housing rear wall 3466 may not cover the guide housing suction inlet 3521 in the forward and rearward direction.

The housing rear wall 3466 connects the housing base 3462, the left side wall 3463, and the right side wall 3464 to improve rigidity of the lower guide housing 3460 and prevent excessive rearward movement of the fan housing assembly 3400.

The stopper 3465 is disposed in front of the housing rear wall 3466. In one embodiment, the stoppers 3465 are disposed on the left side and the right side of the housing base 3562. One of the stoppers 3465 connects the housing base 3462 and the left side wall 3463 and the other one thereof connects the housing base 3462 and the right side wall 3464.

When the fan housing assembly 3400 is excessively moved forward, the fan housing assembly 3400 is supported by the stopper 3465 and the movement of the fan housing assembly 3400 is stopped.

The cable penetration portion 3461 communicates the outer space of the guide housing with the inner storage space (S1) of the guide housing.

The cable penetration portions 3461 are disposed on the left side wall 3463 and the right side wall 3464. The cable penetration portions 3461 penetrate the left side wall 3463 and the right side wall 3464 in the horizontal direction. The cable penetration portion 3461 extends in the forward and rearward direction. The cable penetration portion 3461 provides a space where the cable may be moved in the forward and rearward direction along with the fan housing assembly 3400. In one embodiment, the cable penetration portion 3461 has a length corresponding to the forward and rearward moving distance of the fan housing assembly 3400.

When the cable penetration portion 3461 has a short length that does not correspond to the moving distance of the fan housing assembly 3400, the connection with the actuator 3470 may be separated.

The cable penetration portion 3461 extends in the forward and rearward direction and communicates an inner side of the lower guide housing 3460 and an outer side of the lower guide housing 3460. The cable penetration portion 3461 provides a space where a wire connected to the guide motor may also be moved in the forward and rearward direction when the fan housing assembly is moved. The wire may be moved along the cable penetration portion 3461 to provide reliability of connection with the guide motor 3472.

The lower guide housing 3460 includes a fastener 3468 to couple with the fan casing 320 of the short-distance fan assembly. The fastener 3468 is disposed on the housing base 3462.

The base guide 3467 is disposed in a forward and rearward direction that is a moving direction of the fan housing assembly 3400. Two base guides 3467 are disposed, a first one thereof is disposed near the left side wall 3463 and a second one thereof is disposed near the right side wall 3464.

The base guide 3467 protrudes upward from an upper surface of the housing base 3462. The base guide 3467 is inserted into a groove defined in the lower surface of the front fan housing 3430. The base guide 3467 limits the horizontal movement of the fan housing assembly 3400.

<Configuration of Rear Fan Housing>

The rear fan housing 3410 forms a rear surface of a fan housing assembly. The rear fan housing 3410 may be disposed in front of a heat exchange assembly 500.

In one embodiment, the rear fan housing 3410 is disposed at a front side of an upper guide housing 3520, and more specifically, at a front side of a rear wall 3522. The rear fan housing 3410 may be disposed inside the upper guide housing 3520.

The rear fan housing 3410 includes a rear fan housing body 3412 to cover a rear surface of the front fan housing 3430, a fan suction inlet 3411 disposed in the rear fan housing body 3412 and penetrating in a forward and rearward direction, and a fastener 3414 disposed in the rear fan housing body 3412 and coupled to the front fan housing 3430.

A plurality of fasteners 3414 are disposed to be assembled with the front fan housing 3430. The fastener 3414 protrudes radially outward from the rear fan housing body 3412.

The rear fan housing 3410 has a donut shape and defines a fan suction inlet 3411 when viewed from the front. In particular, the rear fan housing body 3412 has a donut shape when viewed from the front.

The rear fan housing 3410 surrounds the fan 3420 together with the front fan housing 3430. The fan 3420 is disposed between the rear fan housing 3410 and the front fan housing 3430.

The rear fan housing 3410 covers the rear surface of the front fan housing 3430 and is assembled to a rear end of the front fan housing 3430.

The rear fan housing 3410 is vertically disposed with respect to the floor. The rear fan housing 3410 faces the front surface of the heat exchange assembly 500.

The fan suction inlet 3411 is parallel to the guide housing suction inlet 3521 and faces each other. A diameter of the fan suction inlet 3411 is less than a diameter of the guide housing suction inlet 3521. The air guide 3510 connects the fan suction inlet 3411 to the guide housing suction inlet 3521. The fan suction inlet 3411 faces the front surface of the heat exchange assembly 500.

The rear fan housing body 3412 is concave from the front side to the rear side thereof.

The air guide 3510 may be disposed at the rear side of the rear fan housing 3410 and may be coupled to the rear surface of the rear fan housing 3410. In particular, the air guide 3510 may be assembled to the rear fan housing body 3412 and surrounds the fan suction inlet 3411.

<Configuration of Front Fan Housing>

The front fan housing 3430 has a cylindrical shape, is opened in a forward and rearward direction, and provides a flow path structure to guide air flowed by the fan 3420 to a steering grill 3450. In addition, in one embodiment, the fan motor 3440 is assembled to the front fan housing 3430 and the front fan housing 3430 provides an installation structure for installing the fan motor 3440.

The fan motor 3440 may be disposed at a front side of the front fan housing 3430, the fan 3420 is disposed at a rear side thereof, and a lower guide housing 3460 is disposed at a lower side thereof.

The front fan housing 3430 may be assembled to the lower guide housing 3460 and is movable in the forward and rearward direction with respect to the lower guide housing 3460.

The front fan housing 3430 includes an outer fan housing 3432 opened in a forward and rearward direction and having a cylindrical shape, an inner fan housing 3434 defining an opening opened to a front, disposed in the outer fan housing 3432 and to accommodate the fan motor 3440, a vane 3436 connecting the outer fan housing 3432 to the inner fan housing 3434, and a motor installation portion 3448 disposed in the inner fan housing 3434 and assembled with the fan motor 3440.

The outer fan housing 3432 has a cylindrical shape and defines openings at a front surface and a rear surface thereof and the inner fan housing 3434 is disposed therein. The outer fan housing 3432 may receive a driving force from the actuator 3470 and may be moved in the forward and rearward direction.

An open front surface of the outer fan housing 3432 is referred to as "a first fan opening surface 3431". In one embodiment, the first fan opening surface 3431 has a circular shape when viewed from the front. The rear end of the steering grill 3450 may be inserted into the first fan opening surface 3431.

An inner space of the outer fan housing 3432 opened in the forward and rearward direction is referred to as "a space (S2)". The first fan opening surface 3431 forms a front surface of the space (S2).

The inner fan housing 3434 defines an opening at a front side thereof and has a bowl shape and concave from a front side to a rear side thereof. A concave inner space of the inner fan housing 3434 is referred to as "a space (S3)". The fan motor 3440 is disposed in the space (S3) and is coupled to the inner fan housing 3434.

The open front surface of the inner fan housing 3434 is referred to as "a second fan opening surface 3433". The second fan opening surface 3433 may have various shapes. In one embodiment, the second fan opening surface 3433 has a circular shape in consideration of air flow.

The second fan opening surface 3433 forms a front surface of the space (S3). The first fan opening surface 3431 is disposed in front of the second fan opening surface 3433. The second fan opening surface 3433 is disposed inside the first fan opening surface 3431.

The first fan opening surface 3431 and the second fan opening surface 3433 are spaced apart from each other in the forward and rearward direction to provide a space to tilt the steering grill 3450. The rear end of the steering grill 3450 may be disposed between the first fan opening surface 3431 and the second fan opening surface 3433.

A motor installation portion 3438 is disposed in the inner fan housing 3434 to couple the fan motor 3440.

The motor installation portion 3438 is disposed in the space (S3) and protrudes forward from the inner fan housing 3434. The fan motor 3440 further includes a motor mount 3442 and the motor mount 3442 is coupled to the motor installation portion 3438.

The motor installation portion 3438 is disposed in the inner fan housing 3434. The motor installation portions 3438 are disposed at equal distances with respect to a central axis (C1).

A motor shaft of the fan motor 3440 passes through the inner fan housing 3434 and is disposed toward the rear, and is coupled to a fan 3420 disposed at the rear side of the inner fan housing 3434. The inner fan housing 3434 defines a shaft hole 3437 through which the motor shaft of the fan motor 3440 passes.

As the fan motor 3440 is disposed at the front side of the inner fan housing 3434 and is inserted into the space (S3), interference with the discharged air may be minimized.

In particular, a steering base 1070 described below is coupled to the inner fan housing 3434 and closes the space (S3). The fan motor 3440 is disposed outside a flow path of the discharged air to minimize resistance to the discharged air. In particular, the fan motor 3440 may be disposed at the front side of the inner fan housing 3434 to block resistance to air suctioned from the rear portion thereof.

The inner fan housing 3434 defines a fastening boss 3439 to fix the steering base 1070 and support the steering base 1070. The fastening bosses 3439 are disposed in three places and are spaced apart from one another with the same distance with respect to the central axis (C1).

The fastening boss 3439 and the motor installation portion 3438 are disposed inside the space (S3). When the steering base 1070 is assembled to the fastening boss 3439, the motor installation portion 3438 is concealed by the steering base 1070.

The inner fan housing 3434 is spaced apart from the outer fan housing 3432 by a predetermined distance and the vane 3436 integrates the outer fan housing 3432 with the inner fan housing 3434.

The outer fan housing 3432, the inner fan housing 3434, and the vane 3436 provide straight movement to the air discharged by the fan 3420.

Meanwhile, a first guide roller 3553 and a second guide roller 3554 are disposed outside the front fan housing 3430.

The first guide roller 3553 and the second guide roller 3554 are moved in the forward and rearward direction of the first guide groove 3551 and the second guide groove 3552 disposed in the upper guide housing 3520.

The first guide roller 3553 is inserted into the first guide groove 3551, moved along the first guide groove 3551 in the forward and rearward direction, and is supported by the first guide groove 3551.

The second guide roller 3554 may be inserted into the second guide groove 3552, is moved along the second guide groove 3552 in the forward and rearward direction, and is supported by the second guide groove 3552.

The first guide roller 3553 includes a roller shaft coupled to the front fan housing 3430 and a roller rotatably coupled to the roller shaft. The roller shaft is horizontally disposed.

The second guide roller 3554 includes a roller shaft coupled to the front fan housing 3430 and a roller rotatably coupled to the roller shaft. The roller shaft is horizontally disposed.

The roller shaft of the first guide roller 3553 and the roller shaft of the second guide roller 3554 are disposed in a line.

The first guide roller 3553 is disposed on the left side of the front fan housing 3430 and the second guide roller 3554 is disposed on the right side of the front fan housing 3430.

The fan housing assembly 3400 is supported by the first guide roller 3553 and the second guide roller 3554 and a lower end of the fan housing assembly 3400 is spaced apart from a housing base 3462 of the lower guide housing 3460.

When the first guide roller 3553 and the second guide roller 3554 are not provided, load of the fan housing assembly 3400 is applied to an actuator 3470, and the actuator 3470 may move the fan housing assembly 3400 forward or rearward when the actuator 3470 supports the load of the fan housing assembly 3400.

The lower end of the fan housing assembly 3400 is spaced apart by the support of the first guide roller 3553 and the second guide roller 3554 to reduce operating load of the actuator 3470.

<Fan Configuration>

The fan 3420 may be disposed between a rear fan housing 3410 and a front fan housing 3430. The fan 3420 may be disposed inside the assembled rear fan housing 3410 and front fan housing 3430 and is rotated therein.

The fan 3420 discharges air suctioned through a fan suction inlet 3411 in a diagonal direction. The fan 3420 suctions the air through the fan suction inlet 3411 disposed at a rear side thereof and discharges the air in a circumferential direction. The discharge direction of the air discharged by the fan housing assembly is a diagonal direction. In one embodiment, the diagonal direction refers to a direction between a forward direction and the circumferential direction.

<Configuration of Air Guide and Air Guide Bracket>

The air guide 3510 couples a fan housing assembly 34000 to a guide housing (e.g., in one embodiment, an upper guide housing) and connects the guide housing suction inlet 3521 to a fan suction inlet 3411.

The air guide 3510 defines an opening opened in a forward and rearward direction and introduces air. Specifically, the air guide 3510 connects the rear fan housing 3410 to an upper guide housing 3520 and guides the air suctioned by the guide housing suction inlet 3521 to the fan suction inlet 3411.

The air guide 3510 is made of elastic material and may be expanded or contracted when the front fan housing 3430 moves in the forward and rearward direction.

As the air guide 3510 is made of the elastic material, an additional component is needed to couple to the guide housing and the fan housing assembly 3400.

The long-distance fan assembly 400 further includes a first air guide bracket 3530 to couple the air guide 3510 to the guide housing (e.g., in one embodiment, an upper guide housing) and a second air guide bracket 3540 to couple the air guide 3510 to the fan housing assembly 3400 (e.g., in one embodiment, a rear fan housing).

The air guide 3510 is made of elastic material and may have a cylindrical shape.

The air guide 3510 defines an air guide outlet 3511 at a front side thereof (e.g., in one embodiment, toward the fan housing assembly) and defines an air guide inlet 3513 at a rear side thereof (e.g., in one embodiment, toward the guide housing).

The air guide outlet 3511 may have a diameter of G1 and the air guide inlet 3513 may have a diameter of G2. The G1 and the G2 may be the same, and in one embodiment, the G2 is greater than the G1.

A size of the G1 corresponds to a size of the fan suction inlet 3411 and a size of the G2 corresponds to a size of the guide housing suction inlet 3521.

In one embodiment, G1 is preferably greater than the diameter of the fan suction inlet 3411 and the fan suction inlet 3411 is disposed inside the air guide outlet 3511.

Similarly, G2 is preferably greater than a diameter (G4) of the guide housing suction inlet 3521.

The first air guide bracket 3530 couples the rear end 3514 of the air guide 3510 to the guide housing (e.g., in one embodiment, the upper guide housing). The second air guide bracket 3540 couples the front end 3512 of the air guide 3510 to the fan housing assembly 3400.

The first air guide bracket 3530 includes a bracket body 3532 having a ring shape and a bracket fastener 3534 disposed on the bracket body 3532 and protruding outward from the bracket body 3532.

The bracket body 3532 has a circular shape and a diameter of the bracket body 3532 is referred to as "G3". The diameter (G3) of the bracket body 3532 is less than the diameter (G2) of the air guide inlet 3513 and is greater than the diameter (G4) of the guide housing suction inlet 3521.

The rear end 3513 of the air guide passes through the guide housing suction inlet 3521 and is disposed on the rear surface of the rear wall 3522 and the bracket body 3532 contacts the rear end 3513 of the air guide to the rear wall 3522.

A fastening member (e.g., in one embodiment, a screw) is fastened to the rear wall 3522 through the bracket fastener 3534.

A first bracket installation portion 3522a in which the bracket fastener 3534 is disposed is disposed on a rear surface of the rear wall 3522. The first bracket installation portion 3522a has a concave shape, and the bracket fastener 3534 is partially inserted, and an operator may align an assembly position of the bracket fastener 3534 using the first bracket installation portion 3522a.

A plurality of bracket fasteners 3534 are disposed, and in one embodiment, four bracket fasteners are disposed. The bracket fastener 3534 protrudes radially outward with respect to the central axis (C1) of the fan housing assembly 3400 and is disposed at equal distance with respect to the central axis (C1).

The first air guide bracket 3530 is coupled to the rear surface of the rear wall 3522 to prevent the rear end 3513 of the air guide 3510 from being separated when the fan housing assembly 3400 is moved in the forward and rearward direction.

In addition, there is an advantage that, as the first air guide bracket 3530 is assembled to the rear surface of the rear wall 3522, the air guide 3510 may be easily replaced.

In addition, as the first air guide bracket 3530 pressurizes the entire rear end 3513 of the air guide 3510 to contact with the rear wall 3522, the entire rear end 3513 of the air guide 3510 is uniformly supported and may be prevented from tearing at a specific position. In particular, the fastening member to fix the first air guide bracket 3530 may not penetrate the air guide 3510 to prevent damage to the air guide 3510.

In one embodiment, the second air guide bracket 3540 uses a snap ring.

The second bracket installation portion 3415 is disposed on the rear surface of the rear fan housing 3410 to dispose the second air guide bracket 3540 using the snap ring.

The second bracket installation portion 3415 has a ring shape when viewed from the rear and is disposed outside than the fan suction inlet 3411. The second bracket installation portion 3415 is a rib extending rearward and outward from the rear surface of the rear fan housing 3410 and defines, at an outer side thereof, a groove 3416 into which the second air guide bracket 3540 is inserted. The groove 3416 opens radially outward with respect to the central axis (C1) of the fan housing assembly 3400 and is concave toward the central axis (C1).

In addition, a guide wall 3417 is disposed on a rear surface of the rear fan housing 3410 to receive the air guide 3510 in a right position. The guide wall 3417 faces the second insertion wall 3528b and is disposed in front of the second insertion wall 3528b.

When viewed from the rear of the rear fan housing 3410, the guide wall 3417 has a donut shape.

<Actuator Configuration>

The actuator 3470 provides a driving force to move the fan housing assembly 3400 in a forward and rearward direction. The actuator 3470 may move the fan housing assembly 3400 in the forward and rearward direction based on a control signal of a controller.

When an indoor unit is operated, the actuator 3470 moves the fan housing assembly 3400 forward, and when the indoor unit is stopped, the actuator 3470 moves the fan housing assembly 3400 rearward.

The actuator 3470 may move the fan housing assembly 3400 in the forward and rearward direction. For example, the actuator 3470 may include a hydraulic cylinder or a linear motor to move the fan housing assembly 3400 in the forward and rearward direction.

In one embodiment, the actuator 3470 transmits a motor driving force to the fan housing assembly 3400 to move the fan housing assembly 3400 forward or rearward.

In one embodiment, as the first guide roller 3553 and the second guide roller 3554 disposed in the fan housing assembly 3400 each support the load of the fan housing assembly 3400, the actuator 3470 may minimize the operating load occurring based on the forward movement or the rearward movement of the assembly 3400.

In one embodiment, the central axis (C1) of the fan housing assembly and a center of the front discharge outlet 201 is identical to each other. The actuator 3470 moves the fan housing assembly 3400 forward or rearward along the central axis (C1).

The guide housing (e.g., in one embodiment, the upper guide housing or the lower guide housing) guides the forward and rearward movement of the fan housing assembly 3400.

The actuator 3470 includes a guide motor 3472 disposed on the fan housing assembly 3400 to provide a driving force to move the fan housing assembly 3400 in the forward and rearward direction, a guide shaft 3474 disposed in the fan housing assembly 3400 to receive a rotational force of the guide motor 3472 and rotate, a first guide gear 3476 coupled at a left side of the guide shaft 3474 and rotating with the guide shaft 3474, a second guide gear 3477 coupled to a right side of the guide shaft 3474 and rotating together with the guide shaft 3474, a first rack 3478 disposed in the lower guide housing 3460 and engaged with the first guide gear 3476, and a second rack 3479 disposed in the lower guide housing 3460 and engaged with the second guide gear 3477.

In one embodiment, the guide motor 3472, the first guide gear 3476, the second guide gear 3477, and the guide shaft 3474 are each disposed in the front fan housing 3430 and are moved together when the fan housing assembly 3400 moves forward or rearward.

The first rack 3478 engaged with the first guide gear 3476 and the second rack 3479 engaged with the second guide gear 3477 are each disposed in the lower guide housing 3460.

In another embodiment, the guide motor 3472, the first guide gear 3476, the second guide gear 3477, and the guide shaft 3474 are each disposed on the lower guide housing 3460 and the first rack 3478 and a second rack 3479 may be disposed under the front fan housing 3430.

The fan housing assembly 3400 moves forward or rearward by the engagement of the racks 3478 and 3479 with the guide gears 3476 and 3477.

In one embodiment, one guide motor 3472 is used and a guide shaft 3474 is disposed to uniformly move the front fan housing 3430. The first guide gear 3476 and the second guide gear 3477 are disposed at both ends of the guide shaft 3474. The guide shaft 3474 is horizontally disposed.

In one embodiment, the first guide gear 3476 is disposed on the left side of the guide shaft 3474 and the second guide gear 3477 is disposed on the right side of the guide shaft 3474.

Racks 3478 and 3479 engaged with the guide gears 3476 and 3477 are disposed on the left side and the right side of the lower guide housing 3460, respectively.

In one embodiment, the first guide gear 3476 and the second guide gear 3477 are disposed on the first rack 3478 and the second rack 3479, respectively. The first guide gear 3476 and the second guide gear 3477 moves in the forward and rearward direction along the first rack 3478 and the second rack 3479, respectively.

The first rack 3478 and the second rack 3479 are each disposed on the upper surface of the housing base 3462 of the lower guide housing 3460 and each protrude upward from the housing base 3462.

The first rack 3478 and the second rack 3479 are disposed under the guide gears 3476 and 3477, respectively, and interfere with the guide gears 3476 and 3477 through the engagement, respectively.

The first guide gear 3476 is moved in the forward and rearward direction along the first rack 3478 and the second guide gear 3477 is also moved in the forward and rearward direction along the second rack 3479.

The guide motor 3472 may be disposed at the lower left or lower right of the front fan housing 3430. The motor shaft of the guide motor 3472 may be directly coupled to each of the first guide gear 3476 or the second guide gear 3477.

When the guide motor 3472 is rotated, the first guide gear 3476 and the second guide gear 3477 are simultaneously rotated based on the rotational force of the guide motor 3472 and the left side and the right side of the fan housing assembly 3400 may be moved forward or rearward based on the same force.

The guide motor 3472 may be moved together with the fan housing assembly 3400 and the lower guide housing 3460 defines a motor guide groove 3469 to move the guide motor 3472. The motor guide groove 3469 is disposed in the forward and rearward direction, which is a moving direction of the guide motor 3472.

The housing base 3462 of the lower guide housing 3460 defines the motor guide groove 3469 and the motor guide groove 3469 is concave downward from the housing base 3462.

The motor guide groove 3469 may be disposed outside the first rack 3478 or the second rack 3479. The motor guide groove 3469 is concave downward from the first rack 3478 or the second rack 3479.

The installation and movement space of the guide motor 3472 may be provided due to the motor guide groove 3469 and an overall height of the long-distance fan assembly 400 may be minimized. In particular, the motor guide groove 3469 is concave downward to directly couple the guide motor 3472 to the first guide gear 3476 or the second guide gear 3477 and to minimize a number of power transmission components.

A first guide rail 3480 and the second guide rail 3490 are further disposed between the fan housing assembly 3400 (e.g., in one embodiment, the front fan housing 3430 and the lower guide housing 3460 to easily slide the fan housing assembly 3400.

The first guide rail 3480 couples the left side of the lower guide housing 3460 to the left side of the fan housing assembly. The first guide rail 3480 supports the load of the fan housing assembly and guides the moving direction of the fan housing assembly.

In one embodiment, the first guide rail 3480 is coupled to each of the left side wall 3463 of the lower guide housing 3460 and the front fan housing 3430 to generate the sliding.

The second guide rail 3490 connects the right side of the lower guide housing 3460 to the right side of the fan housing assembly. The second guide rail 3490 supports the load of the fan housing assembly and guides the moving direction of the fan housing assembly.

In one embodiment, the second guide rail 3490 is coupled to each of the right side wall 3464 of the lower guide housing 3460 and the front fan housing 3430 to generate the sliding.

The first guide rail 3480 and the second guide rail 3490 may be bilaterally symmetrical to each other with respect to the central axis (C1) of the fan housing assembly.

The first guide rail 3480 and the second guide rail 3490 support a portion of the load of the fan housing assembly to easily implement the forward and rearward movement of the fan housing assembly.

The first guide rail 3480 and the second guide rail 3490 are disposed above the first rack 3478 and the second rack 3479, respectively. The first guide rail 3480 and the second guide rail 3490 support the left side and the right side of the fan housing assembly 3400, respectively, and guide the moving directions of the left side and the right side of the fan housing assembly 3400, respectively.

The first guide rail 3480 and the second guide rail 3490 are bilaterally symmetrical to each other relative to the central axis (C1) to move the left side and the right side of the fan housing assembly at the same speed and distance.

When the moving speed and distance of the left side or right side of the fan housing assembly are non-uniform, the long-distance assembly 400 may be moved from one side to the other side. In addition, when the moving speed and moving distance of the left side or the right side of the fan housing assembly are each non-uniform, the steering grill 3450 may not be accurately inserted into the front discharge outlet 201.

The first guide rail 3480 and the second guide rail 3490 minimize friction when the front fan housing 3430 is moved through rolling friction.

Figure 32:
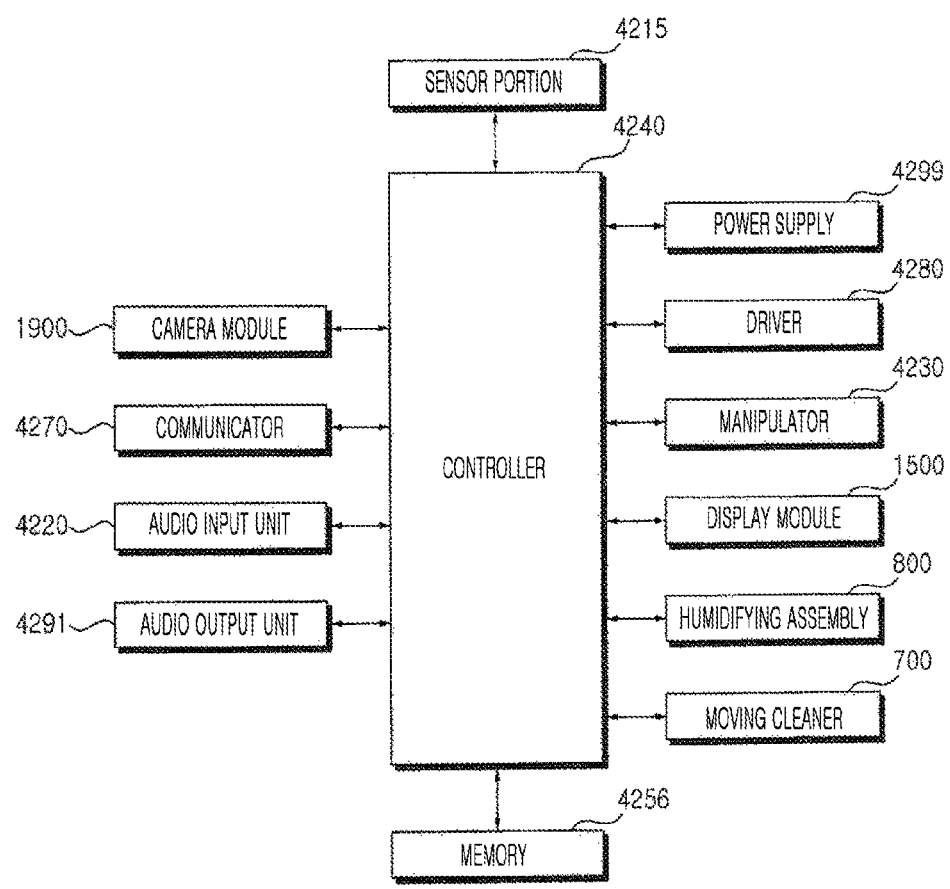
FIG. 32 is a block diagram showing control relation among main components of an air conditioner according to an embodiment of the present disclosure.

FIG. 32 is a block diagram showing a control relation among main components of an air conditioner according to one embodiment of the present disclosure.

Referring to FIG. 32, according to one embodiment of the present disclosure, an air conditioner may include a sensor portion 4215 including at least one sensor to sense various pieces of data, a memory 4256 to store various pieces of data, a communicator 4270 to wirelessly communicate with other electronic devices, a moving cleaner 700, a humidifying assembly 800, a controller 4240 to control overall operation, and a driver 4280 to control operations of a heat exchanger, a valve, and a air movement direction control means disposed in the cabinet assembly 100 under the control of the controller 4240.

For example, the sensor portion 4215 may include at least one temperature sensor to sense indoor temperature and outdoor temperature, a humidity sensor to sense humidity, and a dust sensor to sense air quality.

The temperature sensor is disposed at a suction inlet to measure the indoor temperature, is disposed inside a cabinet assembly 100 to measure a heat exchange temperature, is disposed at one side of a discharge outlet to measure a temperature of discharged air, and is disposed in a refrigerant pipe to measure a refrigerant temperature.

According to one embodiment, the sensor portion 4215 may include at least one human body sensing sensor. For example, the sensor portion 4215 may include a proximity sensor 4217.

The proximity sensor 4217 may detect a person or object approaching within a predetermined distance.

In addition, the proximity sensor 4217 may detect whether a user is present and a distance from the user.

The proximity sensor 4217 may be disposed at a lower portion of the cabinet assembly 100, a front portion of a base 130, or a door assembly 200, and may also be disposed adjacent to a display module 1500.

The proximity sensor 4217 may input an approaching signal to the controller 4240 when a predetermined object or person approaches within the predetermined distance. The proximity sensor 4217 detects the user approaching the cabinet assembly 100 and generates and outputs a signal corresponding to the user's approach.

Further, the sensor portion 4215 may include at least one position sensor to detect positions of components of the air conditioner.

For example, the controller 4240 may control the operation of the air conditioner based on the data sensed by the sensor portion 4215.

The memory 4256 may record various pieces of information used to operate the air conditioner and may store control data for controlling operation, operation mode data, data detected by the sensor portion 4215, and data transmitted and received through the communicator.

The memory 4256 may include volatile or nonvolatile recording media. The recording medium stores data that may be read by a microprocessor and include a hard disk drive (HDD), solid state disk (SSD), silicon disk drive (SDD), read-only memory (ROM), random-access memory (RAM), compact disc read-only memory (CD-ROM), magnetic tapes, floppy disks, optical data storage devices, and the like.

For example, the memory 4256 may store data for voice recognition and the controller 4240 may process a user's voice input signal received at an audio input unit 4220 and may perform a voice recognition process.

In some examples, the air conditioner may perform simple voice recognition and a voice recognition server system may perform high-dimensional voice recognition, such as natural language processing.

For example, when a wake up voice signal including a preset call word is received, the air conditioner may be changed to be in a state in which a voice command is received. In this case, the air conditioner performs the voice recognition process related to whether the call word voice is input, and subsequently, the voice recognition server system may perform the voice recognition for the user voice input.

As the air conditioner has limited system resources, the voice recognition server system may perform complex natural language recognition and processing.

According to one embodiment, the memory 4256 may store a sound source file of a user-input voice command and the communicator 4270 may transmit the stored sound source file to the voice recognition server system. In addition, the stored sound source file may be deleted after an elapse of a predetermined time period or a predetermined operation is performed.

The communicator 4270 includes at least one communication module and performs wireless communication with other electronic devices according to a predetermined communication scheme to transmit and receive various signals.

The predetermined communication scheme may be a Wi-Fi communication scheme. The communication module of the air conditioner may be the Wi-Fi communication module, but the present disclosure is not limited to the communication scheme.

Alternatively, the air conditioner may include different types of communication modules or may include a plurality of communication modules. For example, the air conditioner may include a near field communication (NFC) module, a zigbee communication module, a Bluetooth™ communication module, and the like.

The air conditioner may be connected to a server of the voice recognition server system or a predetermined external server, a user's mobile terminal, and the like, by using the Wi-Fi communication module and may support smart functions such as remote monitoring and remote control.

The user may identify information on the air conditioner or control the air conditioner using the mobile terminal.

In addition, the communicator 4270 may communicate with an access point (AP) device and access a wireless Internet network using the access point device to communicate with other devices.

In addition, the controller 4240 may control the communicator 4270 to transmit state information of the air conditioner and a user's voice command to the voice recognition server system.

For example, when the communicator 4270 receives the control signal, the controller 4240 may control the air conditioner to operate based on the received control signal.

The driver 4280 may control an amount of air discharged into the indoor space by controlling the rotation of the motor connected to the indoor fans. For example, the driver 4280 may control the rotation of the motor connected to a circulator fan provided in the fan housing assembly 3400, other blowing fans below the circulator fan, and the like.

In addition, the driver 4280 may control the heat exchanger to heat exchange with surrounding air by evaporation or condensing supplied refrigerant.

The driver 4280 may control operations of a valve and a air movement direction adjusting means provided in the cabinet assembly 100 according to a control command from the controller 4240.

According to one embodiment, the controller 4240 may directly control a predetermined unit of the air conditioner.

For example, the driver 4280 may include a motor driver and may include an inverter to drive the motor.

According to one embodiment, the driver 4280 may provide a driving force for rotating the fan housing assembly 3400. In addition, the driver 4280 may provide a circulator mover (not shown) with the power to move the fan housing assembly 3400. In addition, the driver 4280 may control opening and closing of the valve disposed therein. In some cases, the driver 4280 may provide the driving force to slidably move the door assembly 200 leftward or rightward. According to one embodiment, the driver 4280 may include a circulator driver and a door assembly driver.

The moving cleaner 700 may be disposed in a filter to clean foreign substances in the filter. The moving cleaner 700 may include a cleaning robot (not shown). The cleaning robot may suction the foreign substances in the filter while moving along a filter surface. In addition, the cleaning robot may sterilize the filter using a sterilization lamp while cleaning the filter. The moving cleaner 700 may further include a position sensor to detect a position of the cleaning robot.

The humidifying assembly 800 may receive water from a water tank 810, may perform humidification to provide moisture, and may discharge humidified air to outside. The humidifying assembly 800 generates steam to humidify the air, and allows the humidified air to be discharged into the indoor space through the discharge outlet, together with the conditioned air.

The humidifying assembly 800 may use a vibrating method with vibration, a heating method, or a spraying method for spraying water and may use various other humidifying methods.

The controller 4240 may process input and output data, store data in the memory 4256, and control the communicator 4270 to transmit and receive the data.

The controller 4240 may control each of the display module 1500 and a manipulator 4230 to operate the air conditioner based on the input, transmit and receive the data to and from an indoor unit, and may control the driver 4280 to discharge, to the indoor space, cool and warm air conditioned by the refrigerant supplied from the outdoor unit.

The controller 4240 may control the fan housing assembly 3400 to discharge the air to the outside based on a set operation mode or data measured by the sensor portion 4215.

In addition, the controller 4240 may control the humidifying assembly 800 to discharge the humidified air and control the moving cleaner 700 to clean the filter.

The controller 4240 may control the sensor portion 4215 or a vision module 1900 to detect occupants and may control air flow based on the location information of the detected occupants.

The controller 4240 may monitor an operation state of each module and may control the display module 1500 to display the operation state based on the received data.

Referring to FIG. 32, an air conditioner according to one embodiment of the present disclosure may further include a power supply 4299, a vision module 1900, an audio input unit 4220 to receive a user's voice command, a display module 1500 to display predetermined information with an image, and an audio output unit 4291 to output predetermined information with audio.

The power supply 4299 may supply operating power to each unit of the air conditioner. The power supply 4299 rectifies and smoothes the connected power to generate and supply a voltage required by each unit. In addition, the power supply 4299 may prevent an inrush current and generate a constant voltage. In addition, the power supply 4299 may supply operating power to an outdoor unit (not shown).

The audio input unit 4220 may receive external audio signals and user voice commands. In this example, the audio input unit 4220 may include at least one microphone (MIC).

In addition, the audio input unit 4220 may include a plurality of MICs to accurately receive the user's voice command. The plurality of MICs may be spaced apart from one another and may obtain the external audio signal, and may process it as an electrical signal.

The audio input unit 4220 may include a processor for converting analog sound into digital data, or may be connected to the processor to convert the user input voice command into data to be recognized by the controller 4240 or the predetermined server.

For example, the audio input unit 4220 may use various noise removal algorithms for removing noise generated in the process of receiving the user's voice command.

In addition, the audio input unit 4220 may include audio signal processing components, such as a filter to remove noise from audio signals received at each microphone and an amplifier to amplify and output a signal output from the filter.

The display module 1500 may display, with an image, information on the user's command input, a processing result corresponding to the user's command input, an operation mode, an operation state, an error state, and the like.

According to one embodiment, the display module 1500 may be stacked with a touch pad to form a touch screen. In this case, the display 1500 may be used as an input device to input information by a user's touch in addition to the output device.

According to one embodiment, the display module 1500 may further include a lighting portion to output an operation state based on lighting or non-lighting, a lighting color, and flickering or non-flickering.

According to one embodiment, the air conditioner may further include an additional manipulator 4230. The manipulator 4230 may include at least one of a button, a switch, or a touch input means and may input user commands or predetermined data to the air conditioner.

In addition, the audio output unit 4291 may output, with an audio, a notification message notifying a warning sound, an operation mode, an operation state, and an error state, information on user's command input, and processing results corresponding to the user's command input, under the control of the controller 4240.

In some examples, the audio output unit 4291 may convert an electrical signal from the controller 4240 into an audio signal and output the electrical signal. In this example, the audio output unit 4291 may include a speaker.

The vision module 1900 may include at least one camera to shoot an indoor environment. The camera shoots the surroundings of the air conditioner, the external environment, and the like, and a plurality of cameras may be disposed for each portion for efficiency.

For example, the camera may include an image sensor (e.g., a complementary metal-oxide semiconductor (CMOS) image sensor) including at least one optical lens and a plurality of photodiodes (e.g., pixels) to focus an image based on a light passing through the optical lens, and a digital signal processor (DSP) to implement an image based on a signal output from the photo diodes. The digital signal processor may generate a still image and a video including frames with the still images.

In some examples, the memory 4256 may store the image shoot by the camera.

According to one embodiment, the user's location may be detected based on the image obtained by the vision module 1900.

The vision module 1900 is disposed in the door assembly 200 and, in some cases, may be disposed on an upper panel of the cabinet. In addition, the vision module 1900 may be accommodated inside the cabinet assembly 100 when not in operation, and may operate after moving up and down.

Figure 33:
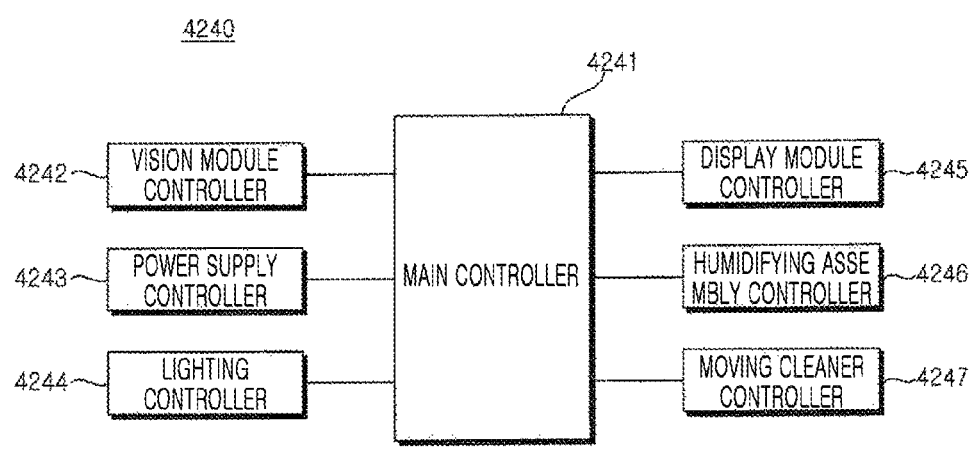
FIG. 33 shows internal components of a controller according to an embodiment of the present disclosure.

FIG. 33 shows internal configurations of a controller according to one embodiment of the present disclosure.

A controller 4240 may include one or a plurality of microprocessors.

Referring to FIG. 33, the controller 4240 may include a main controller 4241, a vision module controller 4242, a power supply controller 4243, a lighting controller 4244, a display module controller 4245, a humidifying assembly controller 4246, and a moving cleaner controller 4247 according to functions thereof.

Each of the controllers 4241 to 247 may each include one microprocessor and may be disposed in each of the modules. For example, one microprocessor may control the vision module 1900, the moving cleaner 700, and the humidifying assembly 800.

According to one embodiment, the main controller 4241 may apply control commands to the remaining controllers 4242 to 247 and receive data from each controller and may process the received data. The main controller 4241 and the remaining controllers 4242 to 247 may be connected in a bus form to transmit and receive the data.

According to one embodiment, each module includes the microprocessor to quickly process the operation thereof. For example, the display module 1500 includes the display module controller 4245 and the humidifying assembly 800 includes the humidifying assembly controller 4246 to control the operation thereof.

In some examples, the block diagram of the controller 4240 in FIG. 33 shows one embodiment of the present disclosure. The components in the block diagram may be integrated, added, or omitted depending on the specifications of actually implemented controller 4240 and the units of the air conditioner. For example, two or more components may be combined into one component, or one component may be divided into two or more sub-components as necessary. In addition, a function performed in each block is for explaining one embodiment of the present disclosure and the specific operation or device does not limit the scope of the present disclosure.

Figure 34:
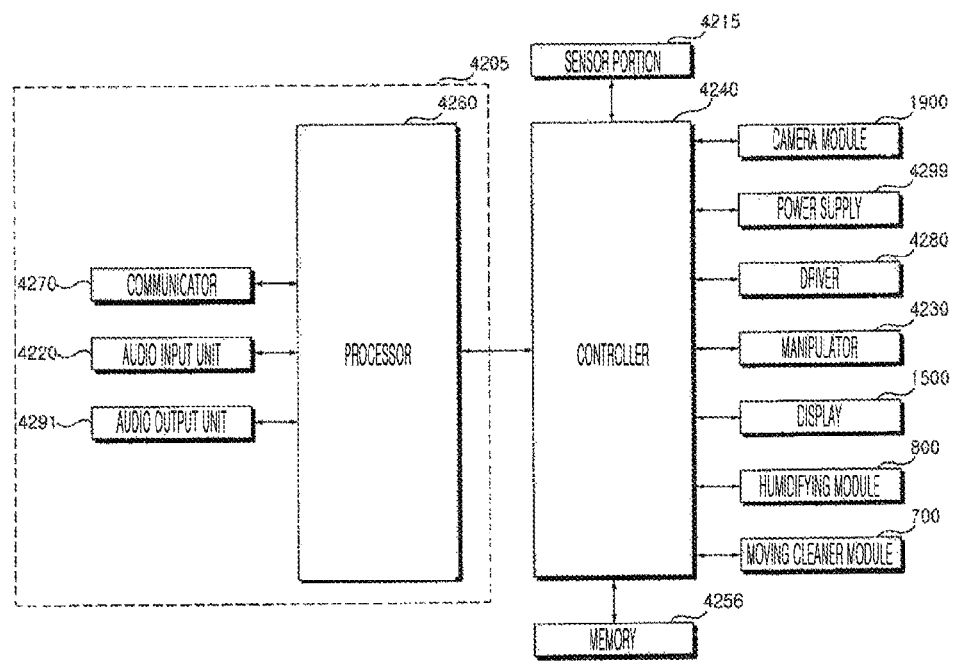
FIG. 34 is a block diagram showing control relation among main components of an air conditioner according to an embodiment of the present disclosure.

FIG. 34 is a block diagram showing a control relation among main components of an air conditioner according to one embodiment of the present disclosure.

Referring to FIG. 34, the air conditioner may include a vision module 1900, a sensor portion 4215 to sense various pieces of data, an audio input unit 4220 to receive a user's voice command, a manipulator 4230, a memory 4256 to store various pieces of data, a communicator 4270 to wirelessly communicate with other electronic devices, a driver 4280 to perform an operation of an air conditioner, a display module 1500 to display predetermined information with an image, an audio output unit 4291 to output predetermined information with an audio, a humidifying assembly 800, a moving cleaner 700, a controller 4240 to control an overall operation, and a processor 4260.

The internal block diagram of the air conditioner in FIG. 34 is similar to that in FIG. 32, but is different from that in FIG. 32 in that FIG. 34 shows that the air conditioner further includes the processor 4260 and the voice recognition module 4205, as a single module, includes the audio input unit 4220, the audio output unit 4291, the communicator 4270, and the processor 4260.

According to one embodiment, the voice recognition module 4205 may include a communicator 4270 and a processor 4260 and the audio input unit 4220 and the audio output unit 4291 may be separate integrated modules.

In some examples, the processor 4260 may control each of the audio input unit 4220, the audio output unit 4291, and the communicator 4270.

Hereinafter, a difference between configurations in FIG. 34 and those in FIG. 32 is described.

The processor 4260 may process a user's voice input signal received at the audio input unit 4220 and perform a voice recognition process.

For example, when a wake up voice signal including a preset call word is received, the processor 4260 may be changed to be in a state in which voice commands are received. In this case, the processor 4260 may perform a voice recognition process related to whether the call word voice is input, and subsequently, the voice recognition server system may perform voice recognition for the user's voice input.

The processor 4260 may control the communicator 4270 to transmit, to the voice recognition server system, the user's voice command input after the wake-up voice signal is recognized.

In addition, the processor 4260 may control the communicator 4270 to transmit, to the voice recognition server system, state information of the air conditioner, the user's voice command, and the like.

For example, when the communicator 4270 receives a control signal, the processor 4260 transmits the control signal to the controller 4240 and the controller 4240 may control the air conditioner to operate based on the received control signal.

Therefore, the voice recognition module 4205 performs voice data acquisition, communication with the server system, and the sound output.

For example, the voice recognition module 4205 may be attached to various types of electronic devices, in addition to the air conditioner. Alternatively, the voice recognition module 4205 may not be attached to other types of electronic devices, but may be used as a separate device.

According to one embodiment of the present disclosure, the air conditioner may receive the user's voice input and the voice recognition server system may control the air conditioner by recognizing and analyzing the user's voice input.

Therefore, the user may control the air conditioner without operating a portable terminal and a remote control device.

Figure 35:
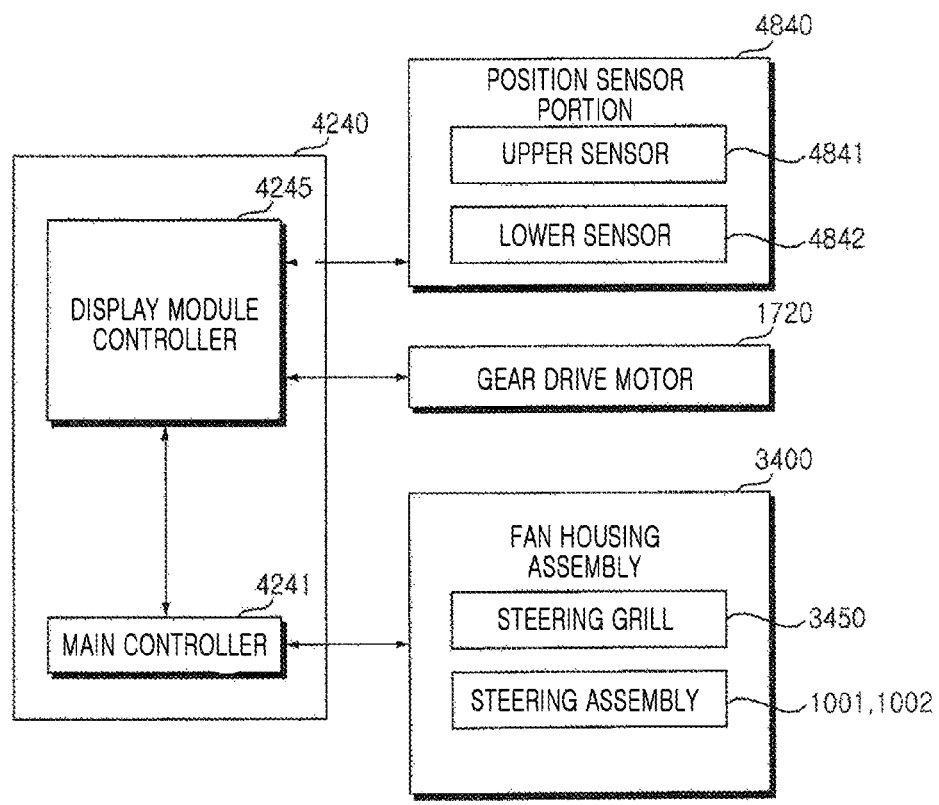
FIG. 35 is a block diagram showing control relation among main components of an air conditioner according to an embodiment of the present disclosure.

FIG. 35 is a block diagram showing a control relation among main components of an air conditioner according to one embodiment of the present disclosure.

According to one embodiment of the present disclosure, the air conditioner may include a door assembly 200 to define appearance of a front surface thereof, a door cover 1210 disposed in the door assembly 200 and to vertically move to be opened and closed, a gear drive motor 1720 to provide a power to the door cover 1210, a position sensor portion 4840 including an upper position sensor 4841 and a lower position sensor 4842 disposed on an inner surface of the door assembly 200 and to detect movement of the door cover 1210, and a controller 4240 to control rotation of the gear drive motor 1320 based on sensing data of each of the upper position sensor 4841 and the lower position sensor 4842.

The upper position sensor 4841 and the lower position sensor 4842 may each detect the door cover assembly 1200 (e.g., in one embodiment, the door cover 1210 or the door cover housing 1220). The upper position sensor 4841 and the lower position sensor 4842 may each use a limit switch, a Hall sensor, or a photo sensor.

Two upper position sensors 4841 may be vertically disposed.

The upper position sensor 4841 includes a first upper position sensor 4841*a* to detect the door cover assembly 1200 when the door cover assembly 1200 vertically moves and a second upper position sensor 4841*b* to detect the door cover assembly 1200 after the first upper position sensor 4841*a* performs the detection.

For the upper position sensor 4841, the first upper position sensor 4841*a* is disposed below the second upper position sensor 4841*b*.

As the first upper position sensor 4841*a* and the second upper position sensor 4841*b* have a vertical height difference, a movement speed of the door cover assembly 1200 may be slowed down or the door cover assembly 1200 may be stopped after the detection of the first upper position sensor 4841*a*.

After the first upper position sensor 4841*a* performs the detection, the rotation speed of the gear drive motor 1720 is slowed down, and after the second upper position sensor 4841*b* performs the detection, the gear drive motor 1720 may be stopped.

Two lower position sensors 4842 may also be vertically disposed.

The lower position sensor 4842 includes a first lower position sensor 4842*a* to detect the door cover assembly 1200 when the door cover assembly 1200 vertically moves and a second lower position sensor 4842*b* to detect the door cover assembly 1200 after the first lower position sensor 4842*a* performs the detection.

For the lower position sensor 4842, the first lower position sensor 4842*a* is disposed above the second lower position sensor 4842*b*.

As the first lower position sensor 4842*a* and the second lower position sensor 4842*b* have a vertical height difference, the movement speed of the door cover assembly 1200 may be slowed down or the door cover assembly 1200 may be stopped after the first lower position sensor 4842*a* performs the detection.

After the first lower position sensor 4842*a* performs the detection, the rotation speed of the gear drive motor 1720 is slowed down, and after the second lower position sensor 4842*b* performs the detection, the gear drive motor 1720 may be stopped.

According to one embodiment of the present disclosure, the air conditioner may include a moving means (not shown) for moving the door cover 1210. The door assembly 200 may include the moving means (not shown) on an inner surface thereof to move the door cover 1210.

According to one embodiment of the present disclosure, the air conditioner may move a mechanism structure using a step motor. The step motor rotates in proportion to a number of pulses and a rotation speed thereof changes in proportion to an input frequency. Therefore, there is an advantage in that, as a movement amount of the mechanism structure is proportional to the number of pulses, the mechanism structure is simply controlled and has low price.

For example, the step motor may be used as the gear drive motor 1720. In this case, the gear drive motor 1720 may be referred to as a door cover step motor 850.

In addition, the door assembly 200 may include the door cover step motor 850, a gear member and a rail member, to move the door cover 1210 upward or downward based on the rotation of the door cover step motor 850, and a stopper member, on the inner surface of the door assembly 200.

The controller 4240 may rotate the door cover step motor 850 to open or close the door cover 1210.

The controller 4240 may control the door cover 1210 to move downward to be opened based on a product-on command and move upward to be closed based on a product-off command.

In the present disclosure, the product-off command may be a power-off input for turning off the air conditioner. Alternatively, the product-off command may be a command corresponding to a specific mode in which the fan housing assembly 3400 is not operated and the door cover 1210 is closed.

In the present disclosure, the product-on command may be a power-on input for applying power to the air conditioner. Alternatively, the product-on command may be a command corresponding to a specific mode in which the door cover 1210 is opened and the fan housing assembly 3400 is operated.

In some examples, when the door cover 1210 is opened and closed by sliding in the vertical direction, noise may occur when the stopper overswings.

The noise generation may cause discomfort to the user and reduce product reliability. Accordingly, the present disclosure proposes a method for easily identifying and accurately controlling the position of the door cover 1210 when sliding in the vertical direction.

In this configuration, according to one embodiment of the present disclosure, the air conditioner may include a position sensor portion 4840. The position sensor portion 4840 is disposed on the inner surface of the door assembly 200 and includes the upper position sensor 4841 and the lower position sensor 4842 to detect the movement of the door cover 1210.

The present disclosure is not limited to the sensing method of the position sensor portion 4840, and various types of sensors may be used.

For example, the upper position sensor 4841 and the lower position sensor 4842 may include an infrared ray (IR) transmission/reception module. The infrared (IR) transmission/reception module is disposed at a movement start point (e.g., a highest point) and a movement end point (e.g., a lowest point) of the door cover 1210 to detect the position of the door cover 1210, and the controller 4240 may control the door cove step motor 850 based on the detected location information.

Alternatively, the position sensor portion 4840 may detect opening or closing of the door cover 1210 and/or the position using a Hall IC, a trigger switch, and a rotary switch.

The sensor portion 4215 may include a position sensor portion 4840 and the controller 4240 may control the air conditioner based on the sensing data of the position sensor portion 4840.

According to one embodiment, the controller 4240 may include a first controller 4245 to control the movement of each of the position sensor portion 4840 and the door cover 1210 and a second controller 4241 to control the fan housing assembly 3400.

According to one embodiment, the first controller 4245 may be a display module controller 4245 to control the display module 1500.

A board closest to the upper position sensor 4841, the lower position sensor 4842, and the door cover step motor 850 disposed on the inner surface of the door assembly 200 may be a board provided in the display module 1500.

The display module controller 4245 provided in the display module 1500 receives and processes data sensed by each of the upper position sensor 4841 and the lower position sensor 4842 and controls the rotation of the door cover step motor 850 to obtain a simplified connection structure and improve a processing speed.

For example, the second controller 4241 may be the main controller 4241. The main controller 4241 may control fan driving, movement, and rotation of the fan housing assembly 3400. According to one embodiment, the driver 4280 may control at least one of the fan driving, the movement, and the rotation of the fan housing assembly 3400 under the control of the main controller 4241.

The fan housing assembly 3400 may include a circulator fan 810, steering assemblies 1001 and 1002 to rotate the circulator fan 810 for changing a direction of the circular fan 810, and a circulator mover 830 to move the circular fan 810.

The steering assemblies 1001 and 1002 may include a two-shaft rotation structure using a double joint and a gear rack structure. In this configuration, the direction of the fan housing assembly 3400 or the circulator fan 810 may be freely rotated in various directions.

The circulator mover 830 may include a motor and a mechanism structure to move the fan housing assembly 3400 forward or rearward. For example, the circulator mover 830 may include a step motor, a gear member and a rail member to move the fan housing assembly 3400 based on the rotation of the step motor.

The fan housing assembly 3400 may operate under the control of the main controller 4241. The main controller 4241 may smartly control the fan housing assembly 3400 based on the user position detected by the upper proximity sensor and/or the vision module 1900.

For example, when the user is detected from a remote position, the fan housing assembly 3400 is rotated to face upward, and then the circulator fan 810 is controlled to be driven to send air closer to the user during cooling and air cleaning.

The fan housing assembly 3400 may move rearward based on the product-off command and move forward based on the product-on command.

The controller 4240 may control the door cover 1210 to move downward to be opened based on the product-on command and move upward to be closed based on the product-off command.

The display module controller 4245 may control the door cover 1210 to move downward to be opened based on the product-on command and move upward to be closed based on the product-off command.

According to one embodiment of the present disclosure, the air conditioner may be operated by moving the fan housing assembly 3400 forward after the door cover 1210 is opened.

When the user's product-off command is received by the voice input or a touch input through the display module 1500, the fan housing assembly 3400 may move rearward to be accommodated in the cabinet assembly 100.

For example, the controller 4240 may identify the current position of the door cover 1210 by identifying the sensing data of the position sensor portion 4840 before each of the door cover 1210 and the fan housing assembly 3400 is moved.

For example, when the upper position sensor 4841 disposed at the movement start point (e.g., the highest point) of the door cover 1210 only detects the door cover 1210 or the door cover housing 1220, the controller 4240 may determine that the door cover 1210 is closed.

In addition, the controller 4240 may determine how far the door cover 1210 is from the movement start point (e.g., the highest point) of the door cover 1210 based on the sensing value sensed by the upper position sensor 4841.

When only the lower position sensor 4842 disposed at the movement end point (e.g. the lowest point) of the door cover 1210 detects the door cover 1210 or the door cover housing 1220, the controller 4240 may determine that the door cover 1210 is open.

In addition, the controller 4240 may determine how far the door cover 1210 is from the movement end point (e.g., the lowest point) of the door cover 1210 based on the sensing value sensed by the lower position sensor 4842.

The controller 4240 may control the door cover 1210 to vertically slide based on the current position and the operation command of the door cover 1210.

For example, the display module controller 4245 may control the door cover 1210 to move downward to be opened according to the product-on touch command input to the display module 1500.

The display module controller 4245 may control the door cover 1210 to move upward to be closed according to the product-off-touch command input to the display module 1500.

In addition, the display module controller 4245 may control the movement of the door cover 1210 under the control of the main controller 4241.

For example, when the door cover 1210 is detected at a certain position based on the on/off operation, the controller 4240 reduces the rotation speed of the door cover step motor 850, and when the door cover 1210 reaches a preset start point (e.g., the highest point) or the end point (e.g., the lowest point), the controller 4240 may control the door cover step motor 850 to finally stop the rotation thereof.

The controller 4240 may control the door cover 1210 to move downward when the product-on command is received and the upper position sensor 4841 detects the door cover 1210.

For example, before the door cover 1210 is opened according to the product-on command, the controller 4240 may identify an initial position of the door cover 1210, and if there is no abnormality, the door cover 1210 may be operated.

The controller 4240 may control the door cover step motor 850 to rotate based on a predetermined maximum set value while moving from the initial position to the predetermined position thereof. The controller 4240 may drive the door cover step motor 850 to maximize an amount of movement of the door cover 1210. In addition, the controller 4240 may drive the door cover step motor 850 to maximize a movement speed and/or the movement amount thereof.

For example, after the door cover 1210 is opened according to the product-on command, if the lower position sensor 4842 detects the door cover 1210, the controller 4240 may control the door cover step motor 850 to reduce the rotation speed thereof.

In addition, when the lower position sensor 4842 detects that the door cover 1210 has reached the predetermined lowest point, the controller 4240 may control the door cover step motor 850 to be stopped.

When the door cover 1210 stops suddenly, noise may occur in the door cover step motor 850.

In addition, the door cover 1210 may continue to push the stopper by overswing, thereby generating the noise.

Therefore, the door cover 1210 may be slowed down before the door cover 1210 is fully opened, thereby further lowering a possibility of overswing and noise occurrence.

The controller 4240 may control the door cover 1210 to move upward when the off command is received and the lower position sensor 4842 detects the door cover 1210.

For example, before the door cover 1210 is closed according to the product-off command, the controller 4240 may identify the initial position of the door cover 1210, and if there is no abnormality, the controller 4240 may control to perform the closing operation.

Even in this case, the controller 4240 may control the door cover step motor 850 to rotate based on the preset maximum set value while moving from the initial position to the predetermined position thereof. The controller 4240 may control the door cover step motor 850 to be driven to maximize the movement amount of the door cover 1210. In addition, the controller 4240 may control the driving of the door cover step motor 850 to maximize the moving speed and/or the movement amount thereof.

For example, after the door cover 1210 is closed according to the product-off command, when the upper position sensor 4841 detects the door cover 1210, the controller 4240 may control the door cover step motor 850 to reduce the rotation speed thereof.

In addition, when the upper position sensor 4841 detects that the door cover 1210 has reached the predetermined highest point, the controller 4240 may control the door cover step motor 850 to be stopped.

The door cover 1210 may be slowed down before the door cover 1210 is completely closed to further lower the possibility of the overswing and the noise.

In addition, a time and an opportunity for a user to pull out a hand are further provided before the door cover 1210 is completely closed, thereby further lowering a possibility of safety accidents such as hand-jamming accidents.

When the lower position sensor 4842 detects the door cover 1210 while the door cover 1210 is opening, the display module controller 4245 may reduce revolutions per minute (RPM) of the door cover step motor 850. In addition, the display module controller 4245 may control the door cover 1210 to stop at the end point (e.g., the lowest point).

When the upper position sensor 4841 detects the door cover 1210 while the door cover 1210 is closing, the display module controller 4245 may reduce the RPM of the door cover step motor 850. In addition, the display module controller 4245 may control the door cover 1210 to stop at the start point (e.g., the highest point).

Therefore, the door cover 1210 may be accurately position-controlled and may be designed to prevent the overswing and the noise that may occur during opening and closing of the door cover 1210 may be prevented and reduced.

In addition, the door cover 1210 may be slowed down at a specific position during the opening and closing of the door cover 1210 to reduce the possibility of occurrence of safety accidents. For example, during the process of closing the door cover 1210, the RPM of the door cover step motor 850 is slowed down from a predetermined position spaced apart from the start point (e.g., the highest point), which is a final closed position, to reduce the possibility of occurrence of a hand-jamming safety accident.

An abnormal situation may occur in which the door cover 1210 is not detected during the identification of the initial position of the door cover 1210 according to the product on/off operation command. The abnormal situation may occur due to a power failure, initialization, and a mechanism jamming.

When the upper position sensor 4841 and the lower position sensor 4842 fail to detect the door cover 1210 during the initial position identification thereof, the controller 4240 may control the door cover 1210 to move upward.

When the upper position sensor 4841 and the lower position sensor 4842 that are spaced apart from each other fail to detect the door cover 1210, the controller 4240 may control the door cover 1210 to move upward and may determine whether the upper position sensor 4841 detects the door cover 1210.

In this case, the controller 4240 may control the door cover step motor 850 to rotate based on the preset maximum set value.

When the upper position sensor 4842 detects the door cover 1210 based on the upward movement of the door cover 1210, the controller 4240 may control the door cover step motor 850 to reduce the rotation speed of the door cover step motor 850, thereby reducing the overswing and the noise that may occur when coping with the abnormal situation.

Even in this case, when the upper position sensor 4841 detects that the door cover 1210 has reached the predetermined highest point, the controller 4240 may control the door cover step motor 850 to be stopped.

If the upper position sensor 4841 does not detect the door cover 1210 even when the door cover 1210 moves upward, the controller 4240 may control the door cover step motor 850 to be stopped.

Even though the door cover 1210 is moved upward at a maximum level to detect the door cover 1210 again, if the upper position sensor 4841 fails to detect the door cover 1210, the controller 4240 may not control to move the door cover 1210.

This situation may be determined as sensor failure. In this case, the audio output unit 4291 may output, with sound, failure information of the position sensor portion 4840. In addition, the display module 1500 may display the failure information of the position sensor portion 4840.

Accordingly, it is possible to flexibly respond to parameters such as the power failure, the initialization, and the mechanism jamming, and the noise occurring due to the device overswing may be improved.

In addition, if the position signals are not obtained even through the door cover step motor is operated with a max step, that is, the position sensors 4841 and 842 are malfunctioned, the controller 4240 may control the door cover step motor 850 to be stopped, thereby reducing additional noise and responding to the failure.

In addition, the user may be notified of sensor failure.

For example, safety accidents may occur in which the user's hand is caught between the discharge outlet and the closing door cover 1210 while the door cover 1210 is closing.

To prevent the above situation, the air conditioner according to one embodiment of the present disclosure may further include a proximity sensor (not shown) disposed in the door assembly 200 and to detect user's approach. Alternatively, the vision module 1900 including at least one camera may obtain user position information.

In this case, the controller 4240 may control the opening/closing operation of the door cover 1210 based on the data detected by the proximity sensor and/or the vision module 1900.

In addition, the controller 4240 may control the operation of the fan housing assembly 3400 based on data detected by the proximity sensor and/or the vision module 1900.

According to the present disclosure, the driving, the movement, and the rotation of the fan housing assembly 3400 may be controlled based on the user's position to control airflow optimized for the user's position.

Figure 36:
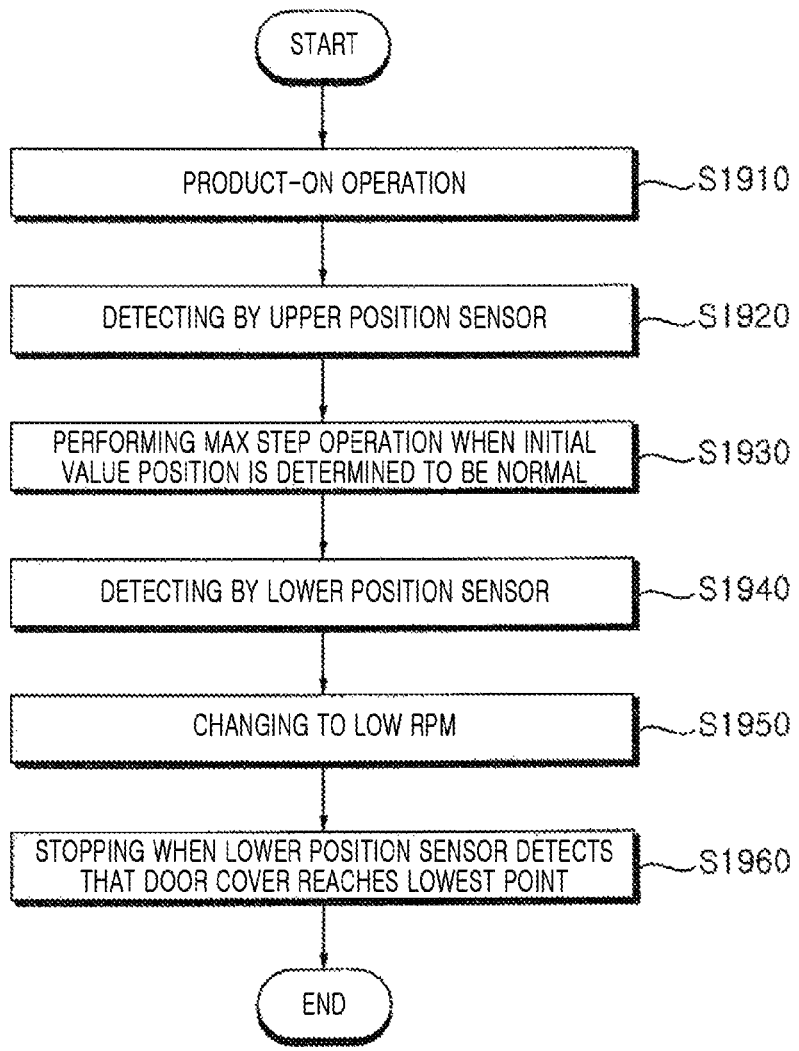
FIG. 36 is a flowchart showing a method for controlling an air conditioner according to an embodiment of the present disclosure.

FIG. 36 is a flowchart showing a method for controlling an air conditioner according to one embodiment of the present disclosure.

Referring to FIG. 36, the air conditioner may receive a product-on-operation command (S910).

A user may input the product-on-operation command through voice input or touch input through a display module 1500 or controlling of a remote controller.

According to the product-on-operation command, an upper position sensor 4841 may detect an initial position of the door cover 1210 (S920).

For example, according to the product-on-operation command, the controller 4240 may identify sensing data sensed by the upper position sensor 4841 (S920), and if there is no abnormality, the controller 4240 may control to a door cover to perform an opening operation (S930).

In this case, the controller 4240 may control the door cover step motor 850 to be driven in the max step while moving from an initial position to a predetermined position thereof (S930). For example, the controller 4240 may drive the door cove step motor 850 to maximize the movement amount of the door cover 1210.

Thereafter, when the lower position sensor 4842 detects the door cover 1210 (S940), the controller 4240 may control the door cover step motor 850 to reduce an RPM of the door cover step motor 850 (S950).

In addition, when the lower position sensor 4842 detects that the door cover 1210 has reached a predetermined lowest point, the controller 4240 may control the door cover step motor 850 to be stopped (S960).

Therefore, the overswing and the noise that may occur during opening of the door cover 1210 may be prevented.

Figure 30:
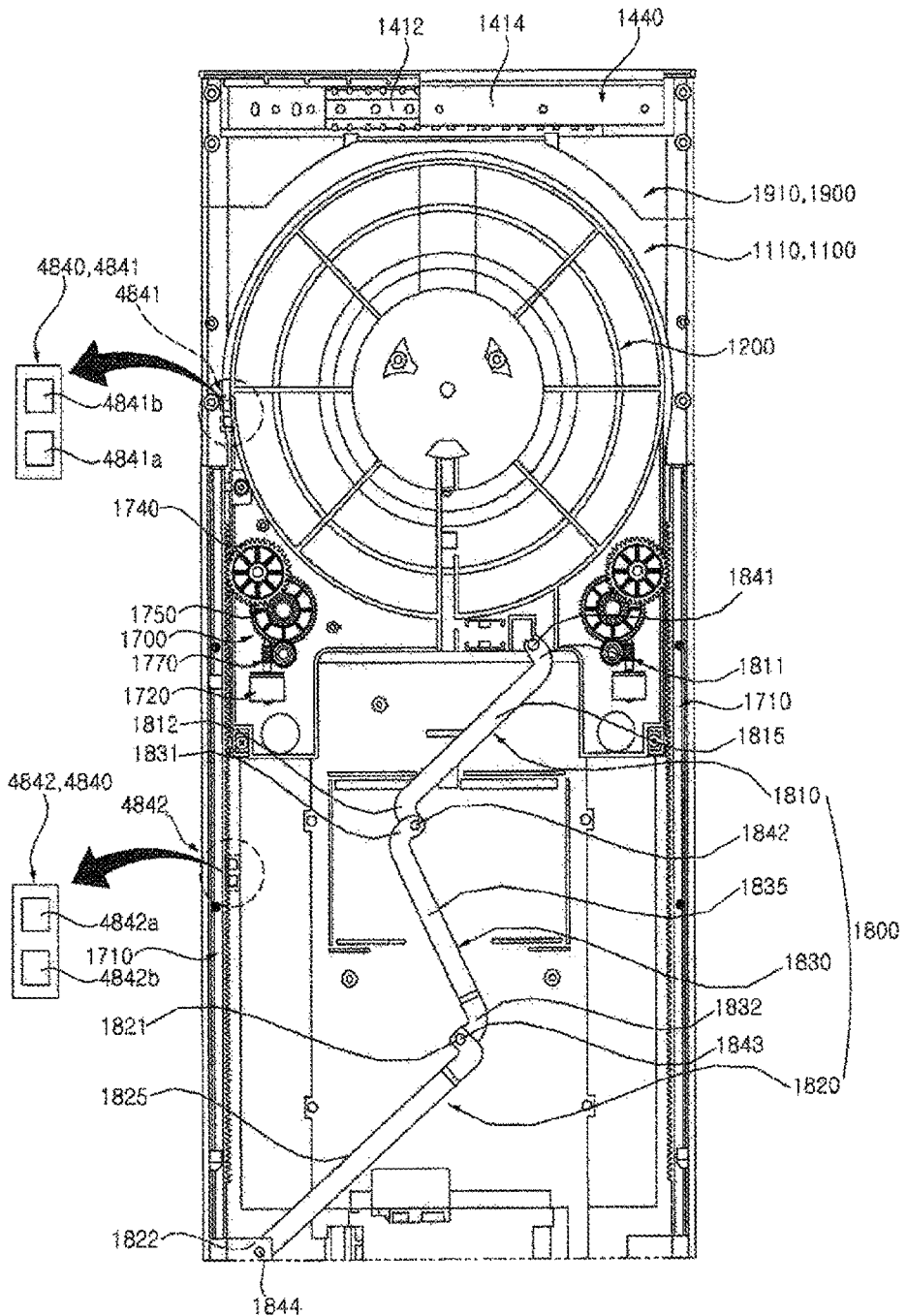
FIG. 30 is a rear view showing a door assembly including an upper position sensor and a lower position sensor according to an embodiment of the present disclosure.
Figure 31:
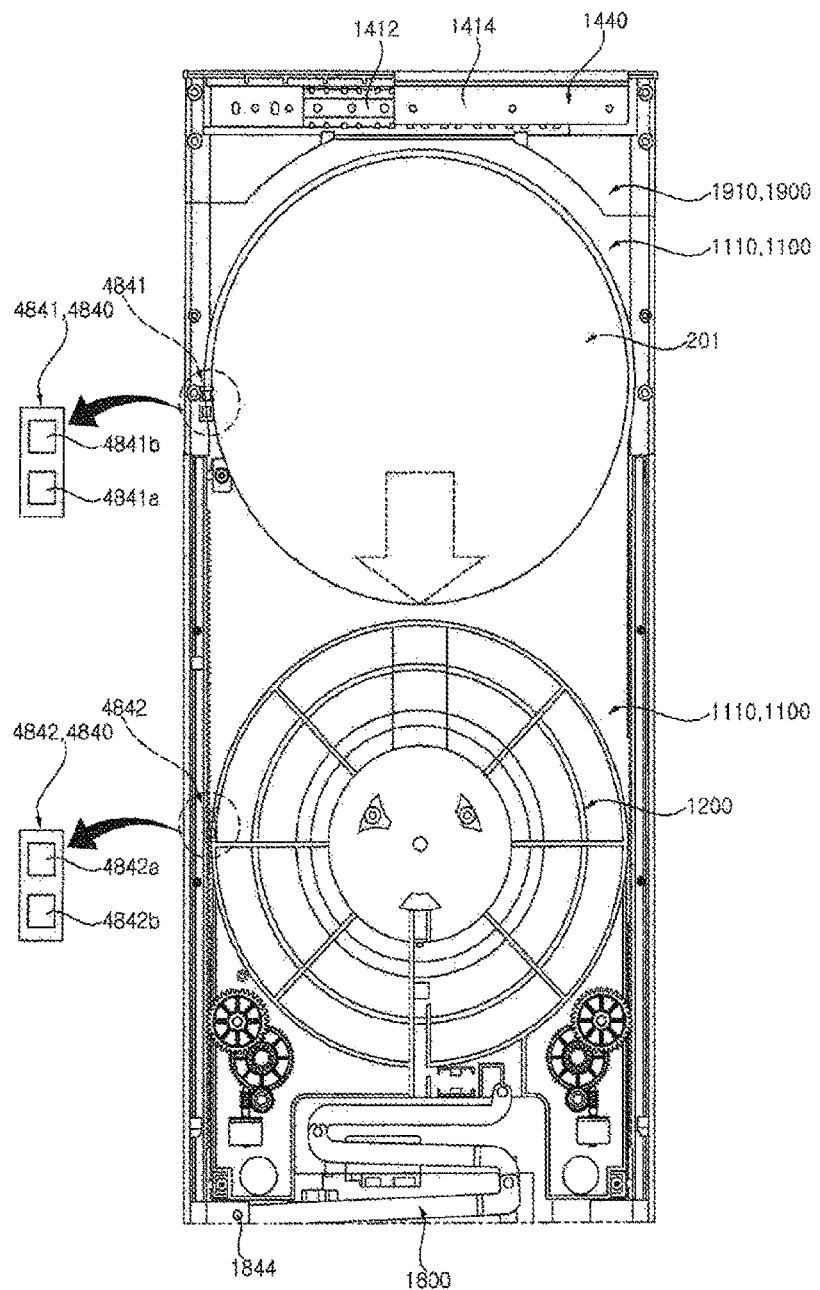
FIG. 31 is a rear view showing a door assembly when a door cover assembly in FIG. 30 is moved downward.

FIG. 30 shows a door cover 1210 of an air conditioner closed to a final closing position (e.g., a fully closed position), which is a start point (e.g., a highest point thereof), according to one embodiment of the present disclosure. FIG. 31 shows a door cover 1210 of an air conditioner opened to a final open position (e.g., a fully opened position) as an end point (e.g., a lowest point thereof) according to one embodiment of the present disclosure.

An upper proximity sensor 1010 and/or a vision module 1900 may detect user's approach.

According to one embodiment, the vision module 1900 may operate by moving upward only during the operation of the air conditioner. In some cases, the vision module 1900 may also move down and be accommodated inside the cabinet assembly 100 according to a product-off-operation command. In this case, the upper proximity sensor 1010 may preferably detect the human body to prevent safety accidents such as hand-jamming accidents.

The upper proximity sensor 1010 may include a human body sensing sensor, such as an optical sensor, a passive infrared (PIR) sensor, and a Doppler sensor.

The upper proximity sensor 1010 may be disposed in the display module 1500. The upper proximity sensor 1010 is disposed in the display module 1500 to accurately and quickly detect a case in which the user inputs a product-off command and does not move rearward.

In addition, a circuit element for the upper proximity sensor 1010 may be mounted on a board of the display module 1500 to simplify a circuit and a connection line.

The door cover 1210 may open and close a front discharge outlet 4201 to discharge, to outside, air processed by the air conditioner, e.g., heat-exchanged air and purified air.

The door cover 1210 is opened during the operation of the cabinet assembly, and the fan housing assembly 3400 is exposed to the outside to discharge the air through the front discharge outlet 4201, or the fan housing assembly 3400 moves forward through the front discharge outlet 4201, and when the operation thereof is finished, the door cover 1210 may be closed to block the front discharge outlet 4201. The door assembly 200 may provide a space for accommodating the door cover 1210 when the front discharge outlet 4201 is opened, at an inner side or a rear surface thereof.

The door assembly 200 may include a door housing moving module 1700 to move the door cover 1210 on an inner surface of the door assembly 200.

The door cover 1210 may be disposed in the cabinet assembly 100 and moves upward or downward to be opened. As the door cover 1210 is disposed at an upper portion of the door assembly 200 of the cabinet assembly 100, the door cover 1210 preferably moves downward to be opened in terms of space utilization.

Alternatively, the door cover 1210 may open by moving rearward and inward the cabinet assembly 100 and then moving upward or downward. Even in this case, the door cover 1210 preferably moves inward and rearward with respect to the cabinet assembly 100 and is moved downward to be opened terms of space utilization.

When the door cover 1210 is opened, the fan housing assembly 3400 may move forward toward the door assembly 200 to discharge air. At least a portion of the fan housing assembly 3400 may be exposed to the outside through the front discharge outlet 4201.

In addition, when the operation thereof ends, the fan housing assembly 3400 may move rearward and inward the cabinet assembly 100 and close the discharge outlet based on the movement of the door cover 1210.

Examples of the door housing moving module 1700 to move the door cover 1210 may include a gear drive motor 1320, a pinion to receive a rotational force from the gear drive motor 1320, a shaft on which a pair of pinions is disposed at both ends thereof, and a rack 1710.

A step motor may be used as the gear drive motor 1720. In this case, the gear drive motor 1720 may be a door cover step motor 850.

A rotation angle of the door cover step motor 850 may be determined based on a number of input pulses. The step motor that rotates for 360 input pulses may rotate about 1 degree each time one pulse is input.

The step motors have advantages of inexpensive cost and easy control of an exact angle (e.g. a position).

A step motor driving method may be classified into unipolar driving and bipolar driving according to a current direction. In addition, the step motor driving method may be classified into constant voltage driving, voltage conversion driving, and constant current driving based on a method for controlling excitation current.

The present disclosure is not limited to the step motor driving method. In addition, moving means for moving the door cover 1210 may also have a structure different from that of the above-described example.

The door cover step motor 850 may be disposed at both ends or one end of the shaft to provide the rotational force.

When the door cover step motor 850 rotates, the door cover 1210 may move along the rack 1710.

When the product-off-operation command is input, the controller 4240 may identify sensing data of the upper proximity sensor 1010 and/or the vision module 1900. If a user is not detected within a reference distance, the controller 4240 may control the door cover 1210 to move to be closed, thereby preventing safety accidents such as hand-jamming accidents occurring while the door cover 1210 is closing.

According to one embodiment of the present disclosure, an air conditioner may include an upper position sensor 4841 and a lower position sensor 4842 disposed on the inner surface of the door assembly 200 to detect movement of the door cover 1210.

For example, the upper position sensor 4841 and the lower position sensor 4842 may each include an infrared (IR) transmission/reception module at a movement start point (e.g., the highest point) and a movement end point (e.g., the lowest point) of the door cover 1210 to detect the position of the door cover 1210.

In the case of normal operation, at least one of the upper position sensor 4841 and the lower position sensor 4842 may detect the door cover 1210.

For example, the upper position sensor 4841 may detect the door cover 1210 in the closed state and the lower position sensor 4841 may detect the door cover 1210 in the opened state.

According to the product on/off operation command, the controller 4240 may identify the initial position of the door cover 1210 and move the door cover 1210 to an opposite position.

When the detection sensor disposed at the opposite position detects when the door cover 1210 moves from the initial position to the opposite position thereof, the controller 4240 may slow down the door cover step motor 850.

In addition, the controller 4240 may control the door cover 1210 to stop when the door cover 1210 reaches a target point (e.g., the highest point or the lowest point).

Even if the door cover 1210 is not at a correct initial position, when the upper position sensor 4841 or the lower position sensor 4842 detects the door cover 1210, the controller 4240 may control the movement of the door cover 1210 based on the position information of the door cover 1210.

An abnormal operation condition may occur in which the two sensors 4841 and 842 fail to detect the door cover 1210 disposed between the upper position sensor 4841 and the lower position sensor 4842.

For example, when the door cover 1210 is in an intermediate position region between the upper position sensor 4841 and the lower position sensor 4842, the abnormal operating condition may occur when a power cord is removed or the air conditioner is blacked out.

When the abnormal operation condition occurs, the controller 4240 may control to perform a compensation operation.

The controller 4240 may perform an initialization compensation operation by a closing operation for the upper position sensor 4841 to detect the door cover 1210.

In this case, the controller 4240 may control the door cover step motor 850 to operate in a Max step.

Subsequently, when the upper position sensor 4841 detects the door cover 1210, the controller 4240 may control the door cover 1210 based on detected position information.

Alternatively, if the upper position sensor 4841 fails to detect the door cover 1210, the controller 4240 may stop the door cover 1210 and be in a sensor failure mode to respond to the above situation. In the sensor failure mode, the controller 4240 may control the audio output unit 4291 and/or the display module 1500 to output a message informing the sensor failure.

Figure 37:
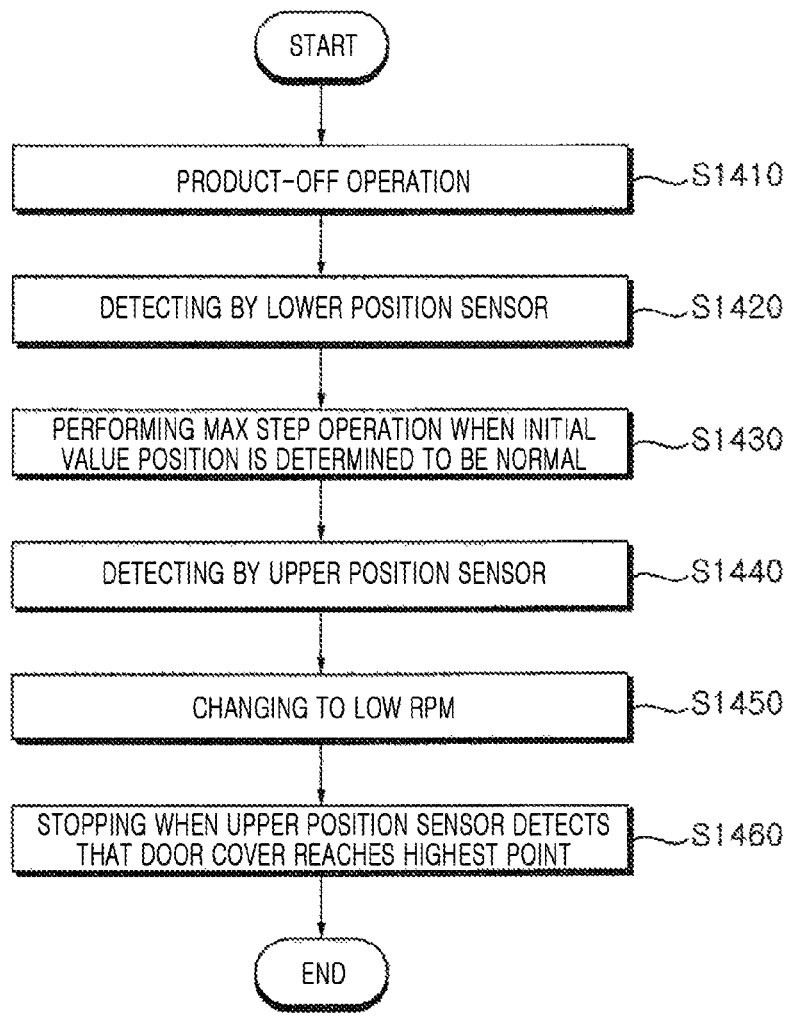
FIG. 37 is a flowchart showing a method for controlling an air conditioner according to an embodiment of the present disclosure.

FIG. 37 is a flowchart showing a method for controlling an air conditioner according to one embodiment of the present disclosure. Referring to FIG. 37, the air conditioner may receive a product-off-operation command (S1410).

A user may input the product-off-operation command by a method such as voice input or touch input through a display module 1500 or controlling of a remote controller.

A lower position sensor 4842 may detect an initial position of the door cover 1210 according to the product-off-operation command (S1420).

For example, according to the product-off-operation command, the controller 4240 may identify sensing data sensed by the lower position sensor 4842 (S1420), and if there is no abnormality, the controller 4240 may control to perform a closing operation (S1430).

In this case, the controller 4240 may control the door cover step motor 850 to be driven in a Max step while moving from an initial position to a predetermined position thereof (S1430). For example, the controller 4240 may drive the door cover step motor 850 to maximize the movement amount of the door cover 1210.

Thereafter, when the upper position sensor 4841 detects the door cover 1210 (S1240), the controller 4240 may control an RPM of the door cover step motor 850 to be reduced (S1450).

In addition, when the upper position sensor 4841 detects that the door cover 1210 has reached a predetermined highest point, the controller 4240 may control the door cover step motor 850 to be stopped (S1460).

Accordingly, overswing and noise that may occur during the closing of the door cover 1210 may be prevented.

Figure 38:
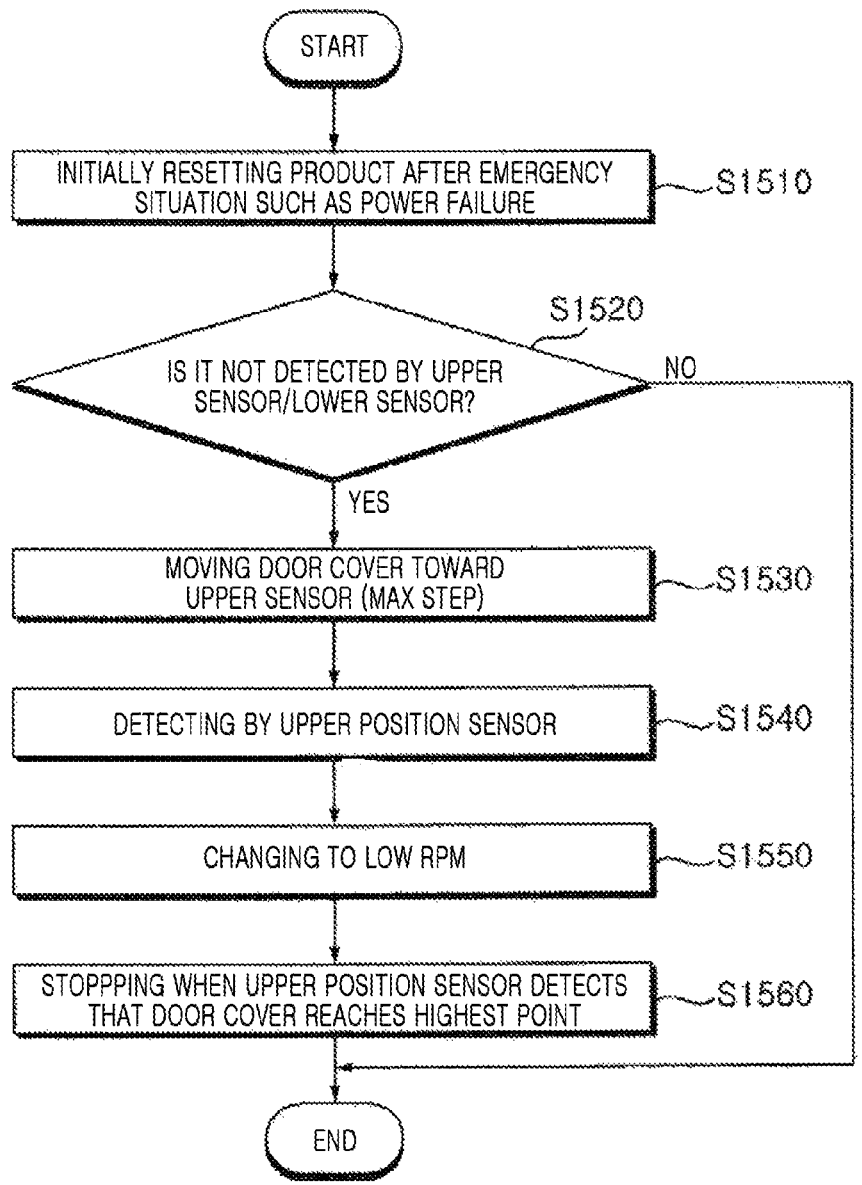
FIG. 38 is a flowchart showing a method for controlling an air conditioner according to an embodiment of the present disclosure.

FIG. 38 is a flowchart showing a method for controlling an air conditioner according to one embodiment of the present disclosure and a method for controlling an air conditioner in an emergency situation.

Referring to FIG. 38, when a door cover 1210 is disposed in an intermediate position region between an upper position sensor 4841 and a lower position sensor 4842, if an emergency situation occurs such as removal of the power cord or power failure or initialization reset, abnormal operating conditions may occur (S1510).

Under the abnormal operating conditions, the upper position sensor 4841 and the lower position sensor 4842 may not detect the door cover 1210 (S1520).

In this case, the controller 4240 may perform an initialization compensation operation by the closing operation for the upper position sensor 4841 to detect the door cover 1210. In this case, the controller 4240 may control the door cover step motor 850 to operate in the Max step (S1530).

When the upper position sensor 4841 detects the door cover 1210 (S1540), the controller 4240 may control the door cover step motor 850 to reduce the RPM thereof (S1550).

In addition, when the upper position sensor 4841 detects that the door cover 1210 has reached a predetermined highest point, the controller 4240 may control the door cover step motor 850 to be stopped (S1560).

If the upper position sensor 4841 fails to detect the door cover 1210, the controller 4240 may stop the door cover 1210 and may be in the sensor failure mode to respond to the above situation. In the sensor failure mode, the controller 4240 may control the audio output unit 4291 and/or the display module 1500 to output a message informing the sensor failure.

Accordingly, it is possible to effectively respond to emergency situations.

According to at least one of the embodiments of the present disclosure, there are provided an air conditioner capable of preventing noise and safety accidents and a control method thereof.

In addition, according to at least one of the embodiments of the present disclosure, when the product is turned on/off, the gear drive motor may be efficiently controlled based on sensing data sequentially sensed by the upper position sensor and the lower position sensor.

In addition, according to at least one of the embodiments of the present disclosure, it is possible to effectively cope with the abnormality situation in which the upper position sensor and the lower position sensor each fail to detect the door cover.

In addition, according to at least one of the embodiments of the present disclosure, the airflow may be effectively controlled in various manners.

Further, according to at least one of the embodiments of the present disclosure, various functions such as a voice recognition function and a humidification function may be performed.

In addition, according to at least one of the embodiments of the present disclosure, modules may be cleanly and safely accommodate and managed in the air conditioner when not in operation.

Further, according to at least one of the embodiments of the present disclosure, the air conditioner may operate based on the sensed user location information to improve user convenience.

The air conditioner of the present disclosure is not limited to the configuration and the method in the embodiments described above, all or a portion of the embodiments can be selectively combined so that various changes can be made for the embodiments.

According to one embodiment of the present disclosure, the method for controlling the air conditioner may be performed using a processor-readable recording medium storing a processor-readable code. The processor-readable recording medium includes all types of recording devices to store data that may be read by the processor. Examples of the processor-readable medium include the ROM, the RAM, the CD-ROM, the magnetic tape, the floppy disk, and the optical data storage device and also include a carrier wave recording medium to transmit through the Internet. In addition, the processor-readable recording medium may be distributed over a networked computer system to store and execute the processor-readable code in the distributed manner.

Embodiments of the present disclosure are described with reference to the accompanying drawings. The disclosure may, however, be embodied in many different manners and should not be construed as limited to the embodiments set forth herein. It is understood that a person having ordinary skill in the art to which the present disclosure art would implement this disclosure in other specific manners without changing the technical idea or necessary features of the present disclosure. For this reason, the disclosed embodiments are intended to be illustrative in all aspects, and not restrictive.

The invention claimed is:

1. An indoor unit of an air conditioner, comprising:
a cabinet including a suction inlet to communicate an inner portion on the indoor unit with an indoor space;
a front panel, disposed at a front side of the cabinet to communicate the inner portion with the indoor space, wherein the front panel comprises:
a front panel body defining a discharge outlet;
a first front panel side extending rearward from a first edge of the front panel body;
a second front panel side extending rearward from a second edge of the front panel body;
a first front panel end bending toward the second front panel side forms a rear end of the first front panel side;
a second front panel end bending toward the first front panel side forms a rear end of the second front panel side, facing the first front panel end, and configured to provide an opening distance with the first front panel end; and
a door cover assembly movable along the front panel and comprising a door cover to open and close the discharge outlet;
wherein the door cover assembly further comprises:
a door cover housing disposed at a rear side of the door cover, and comprising a door cover accommodator to accommodate the door cover and a moving module installation portion;
a door cover moving module, disposed between the door cover housing and the door cover, installed to the moving module installation portion, and coupled to a rear side of the door cover, to move the door cover forward inserting the door cover into the discharge outlet or to move the door cover rearward to accommodate the door cover in the door cover accommodator;
a door housing moving module to move the door cover housing downward with the door cover and to move the door cover housing out of the discharge outlet, when the door cover is accommodated in the door cover accommodator; and
a panel module, disposed between the front panel body and the door cover housing, and assembled to each of the first front panel end and the second front panel end;
a left rack assembled to a left side of the panel module and right rack assembled to a right side of the panel module,
wherein the door cover housing is disposed between the left rack and the right rack and is vertically moved along the left rack and the right rack.

2. The indoor unit of the air conditioner of claim 1, wherein the door housing moving module is configured to vertically move the door cover housing in a space formed by the front panel body, the first front panel side, and the second front panel side, and
wherein, when the discharge outlet is opened, the door cover moving module is configured to move the door cover rearward more than a thickness of the front panel body.

3. The indoor unit of the air conditioner of claim 1, wherein, when the discharge outlet is closed, the door cover moving module is configured to move the door cover forward to insert the door cover into the discharge outlet and provide a continuous surface with a front surface of the front panel.

4. The indoor unit of the air conditioner of claim 1, wherein the door cover moving module further comprises:
a door cover motor disposed at the rear side of the door cover, in the door cover housing, and including a door cover motor shaft disposed in a forward and rearward direction;
a sun gear coupled to the door cover motor shaft, disposed between the door cover and the door cover housing, and configured to rotate based on operation of the door cover motor;

a plurality of planetary gears engaged with the sun gear and radially disposed at an outer side of the sun gear; and a cover guide rotatably disposed between the door cover housing and the door cover, engaged with each of the plurality of planetary gears, in which the plurality of planetary gears are disposed therein, and configured to be rotated clockwise or counterclockwise when the planetary gears are rotated to move the door cover forward or rearward.

5. The indoor unit of the air conditioner of claim 4, wherein the door cover motor, the sun gear, and the plurality of planetary gears are each disposed in the cover guide.

6. The indoor unit of the air conditioner of claim 4, wherein the cover guide comprises a guide gear engaged with each of the planetary gears on an inner circumferential surface thereof.

7. The indoor unit of the air conditioner of claim 4, wherein the door cover further comprises:
   an outer door cover inserted into the discharge outlet when the discharge outlet is closed and configured to provide a continuous surface with the front panel;
   an inner door cover coupled to a rear surface of the outer door cover;
   a mover disposed on the inner door cover and configured to transmit a driving force to move the inner door cover forward or rearward by the engagement with the cover guide; and
   a core opening provided on the inner door cover and passing through the inner door cover in a forward and rearward direction,
   wherein, when the discharge outlet is opened, the door cover motor, the sun gear, and the plurality of planetary gears are each disposed in the core opening.

8. The indoor unit of the air conditioner of claim 4, wherein the moving module installation portion is concave rearward from the front, and disposed at a rear side of the door cover accommodator, and,
   wherein the cover guide is disposed in the moving module installation portion.

9. The indoor unit of the air conditioner of claim 8, wherein, the cover guide has a ring shape, comprises a guideway on an inner circumferential surface or an outer circumferential surface thereof, and the guideway extends in a circumferential direction of the cover guide and is disposed in the forward and rearward direction,
   wherein the mover comprises a mover guide movably inserted into the guideway, and
   wherein, when the cover guide is rotated, the mover guide interferes with the guideway and is moved along the guideway in the forward and rearward direction by the engagement.

10. The indoor unit of the air conditioner of claim 8, wherein, the cover guide has a ring shape and comprises a guideway passing through an inner portion and an outer portion of the cover guide, the guideway extends in a circumferential direction of the cover guide, and is disposed in the forward and rearward direction,
    wherein the mover comprises a mover guide movably inserted into the guideway, and
    wherein, when the cover guide is rotated, the mover guide interferes with the guideway and is moved along the guideway in the forward and rearward direction by the engagement.

11. The indoor unit of the air conditioner of claim 10, wherein the mover further comprises a mover body protruding rearward from the inner door cover and
    wherein the mover guide protrudes inward or outward from the mover body and is inserted into the guideway of the cover guide.

12. The indoor unit of the air conditioner of claim 10, wherein the mover has a ring shape, is disposed in the cover guide, and the mover guide radially protrudes outward from the mover body.

13. The indoor unit of the air conditioner of claim 10, wherein the mover has a ring shape, is disposed in the mover, and the mover guide radially protrudes inward from the mover body.

14. The indoor unit of the air conditioner of claim 1, wherein the door housing moving module further comprises:
    a rack disposed in the front panel and comprising rack teeth extending in a vertical direction;
    a gear assembly disposed in the door cover housing, engaged with the rack, and moving vertically along the rack; and
    a gear drive motor disposed in the door cover housing and configured to provide a driving force to the gear assembly.

15. The indoor unit of the air conditioner of claim 14, wherein the gear assembly comprises a plurality of gears, and
    wherein at least one of the plurality of gears is a worm gear coupled to a motor shaft of the gear drive motor.

16. The indoor unit of the air conditioner of claim 1, wherein the door housing moving module further comprises a left door housing moving module disposed at the left side of the door cover housing and a right door housing moving module disposed at the right side of the door cover housing,
    wherein the left door housing moving module is disposed within a length of the first front panel side in a forward and rearward direction and the right door housing moving module is disposed within a length of the second front panel side in a forward and rearward direction.

17. The indoor unit of the air conditioner of claim 1, wherein
    the left rack disposed on the first front panel side and facing a left surface of the door cover housing; and
    the right rack disposed on the second front panel side and facing a right surface of the door cover housing, and
    wherein the rack teeth of the left rack face the rack teeth of the right rack.

18. The indoor unit of the air conditioner of claim 1,
    the left rack disposed on the first front panel side and facing a left surface of the door cover housing; and
    the right rack disposed on the second front panel side and facing a right surface of the door cover housing,
    wherein the left rack is disposed between the front panel body and the first front panel end and the right rack is disposed between the front panel body and the second front panel end, and
    wherein the rack teeth of the left rack face the rack teeth of the right rack.

19. The indoor unit of the air conditioner of claim 1, further comprising:
    an upper position sensor, disposed on the panel module, to detect an upper position of the door cover housing when the door cover housing is moved vertically, and a lower position sensor, disposed on the panel module, to detect a lower position of the door cover housing when the door cover housing is moved vertically.

* * * * *